July 15, 1941.   B. W. WILLIAMS ET AL   2,249,370
PULSE COUNT AND BLOOD PRESSURE APPARATUS
Filed March 20, 1940   13 Sheets-Sheet 1
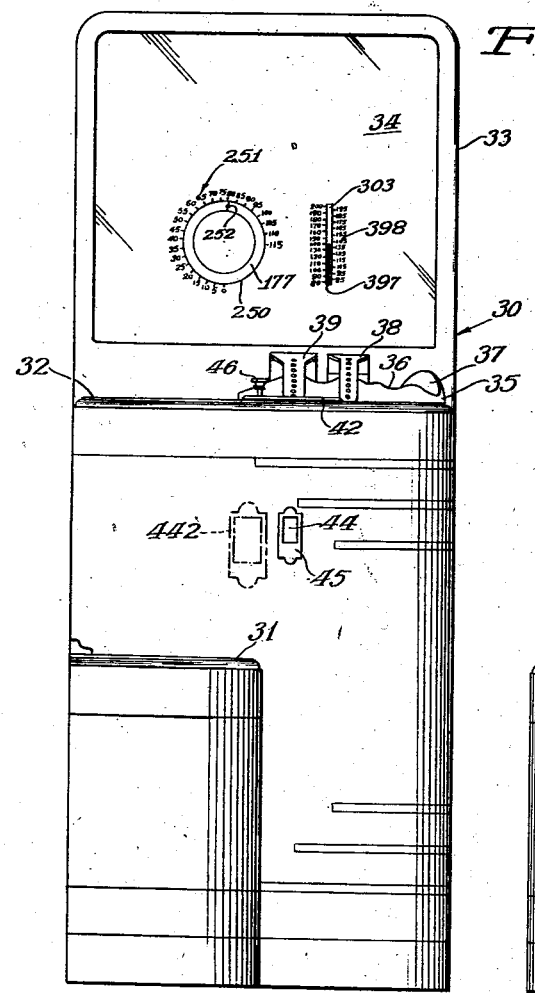
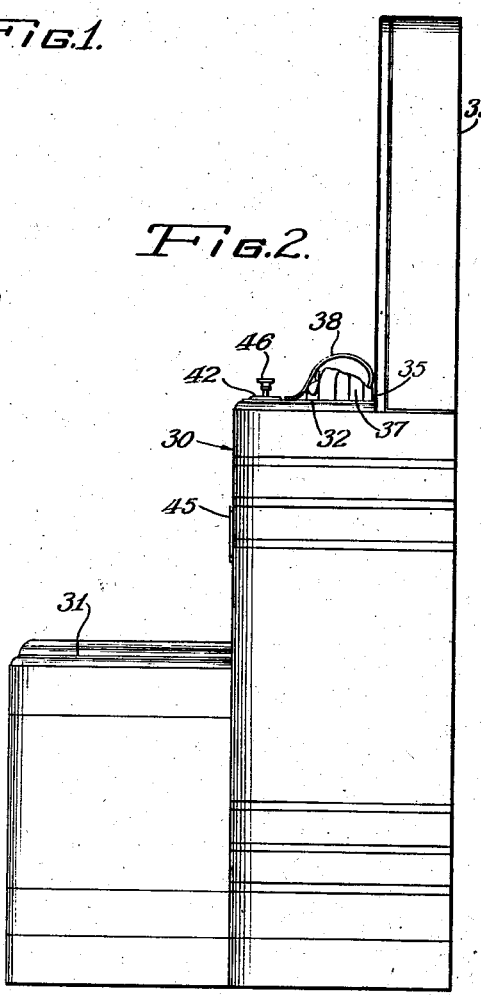
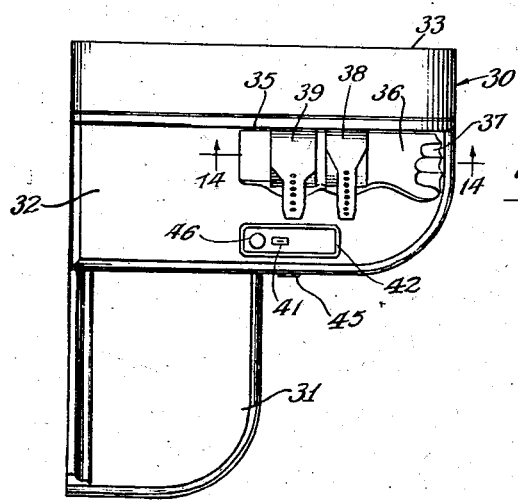
Inventors:
Bradlee W. Williams
Homer S. Williams
By Bell, Wallace and Cannon
Attorneys

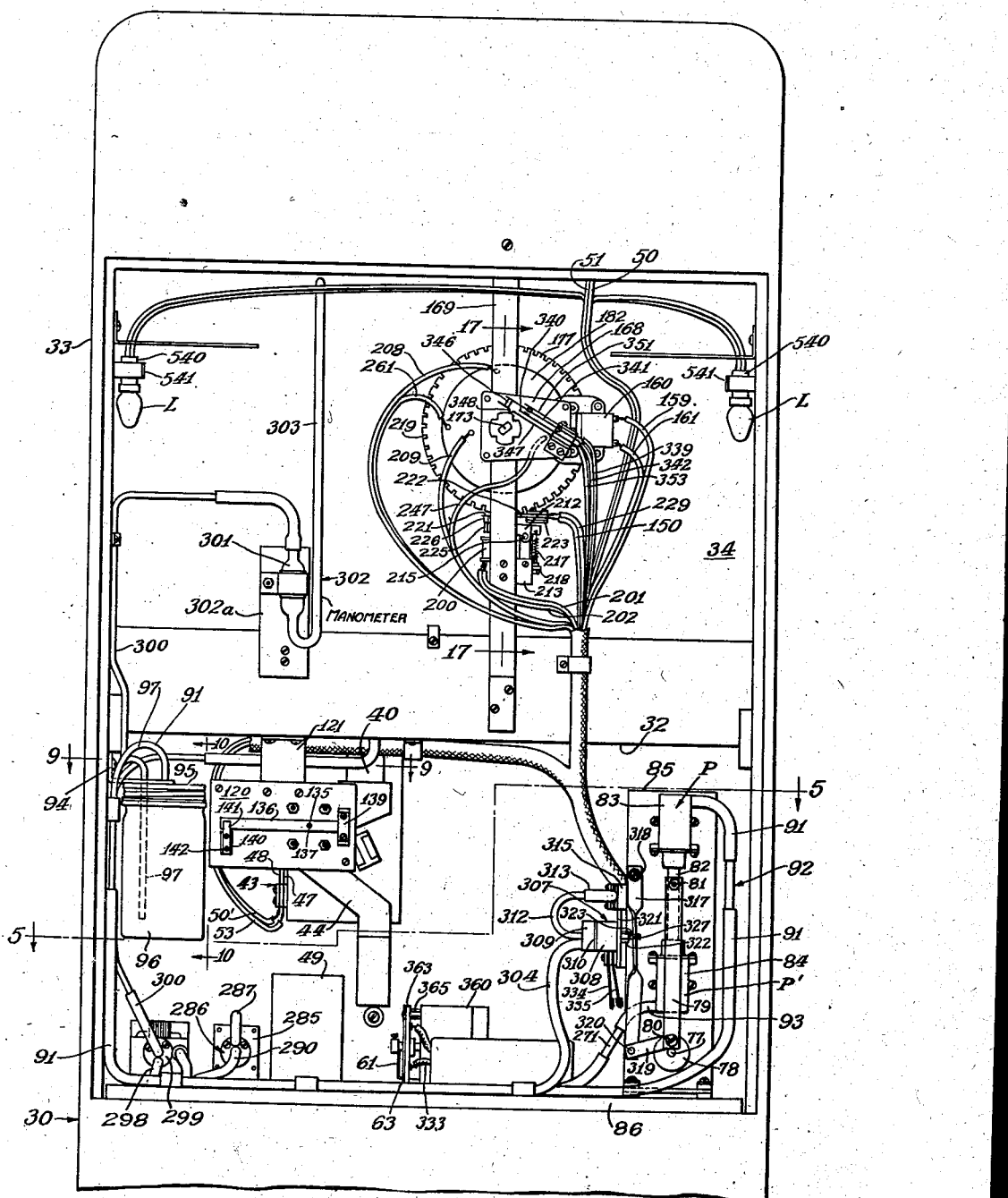

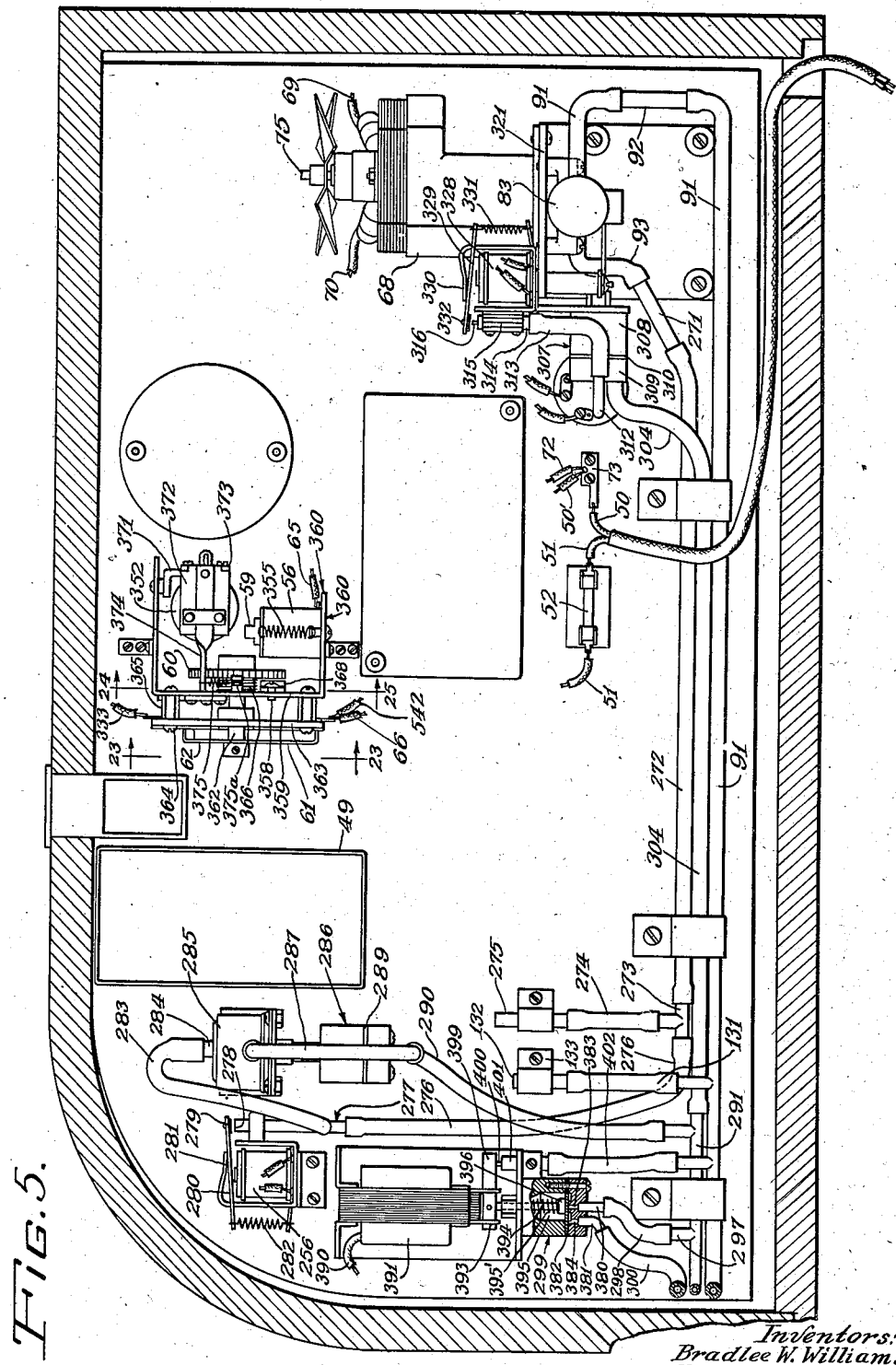

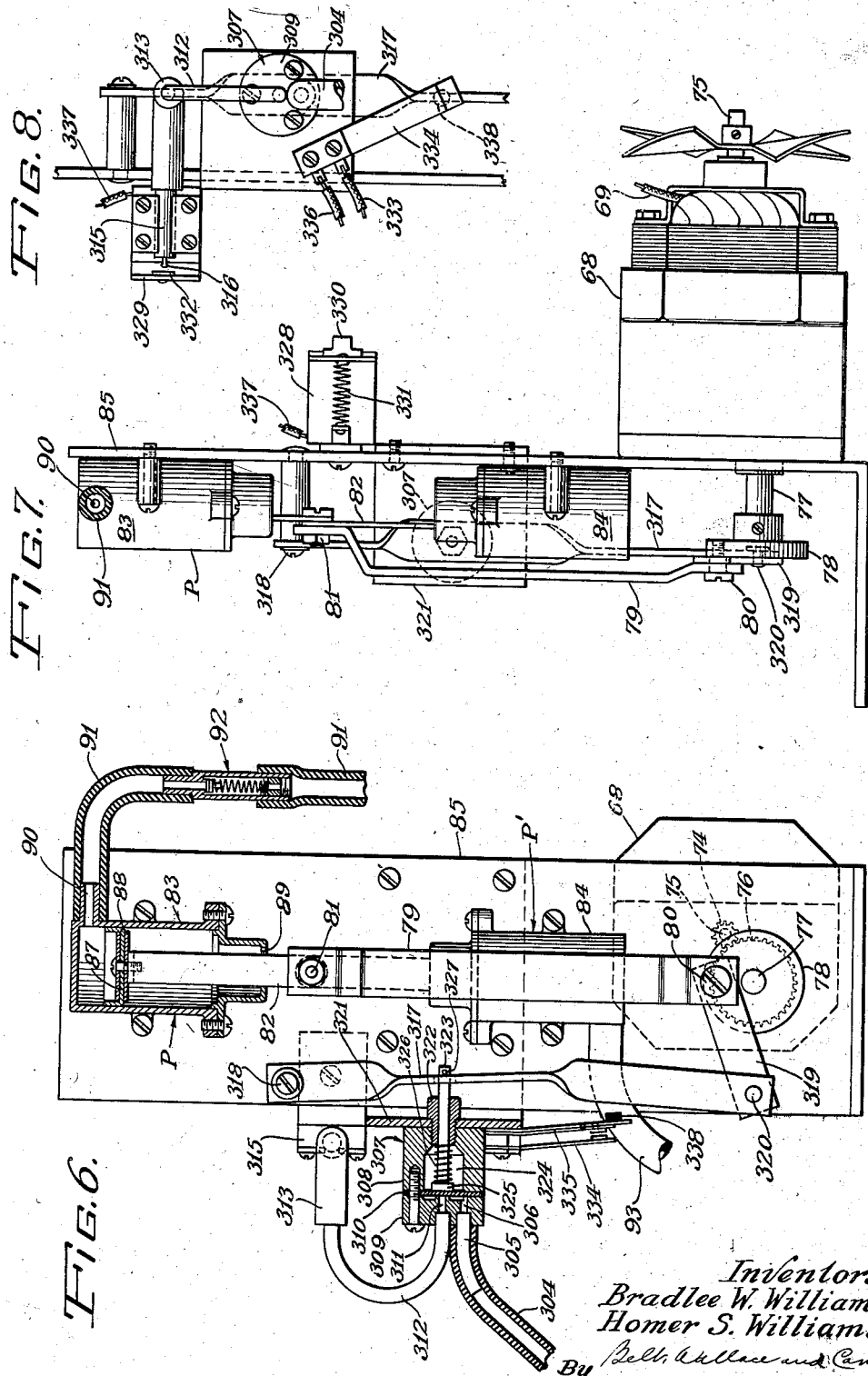

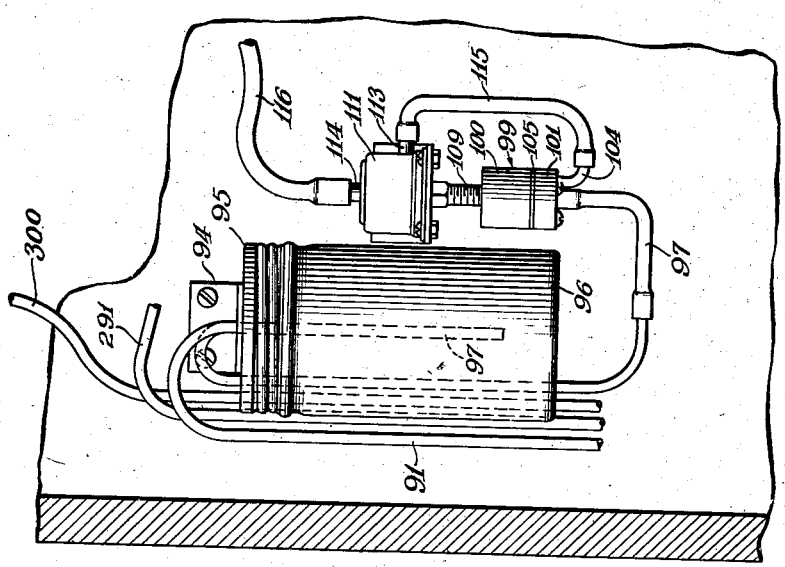
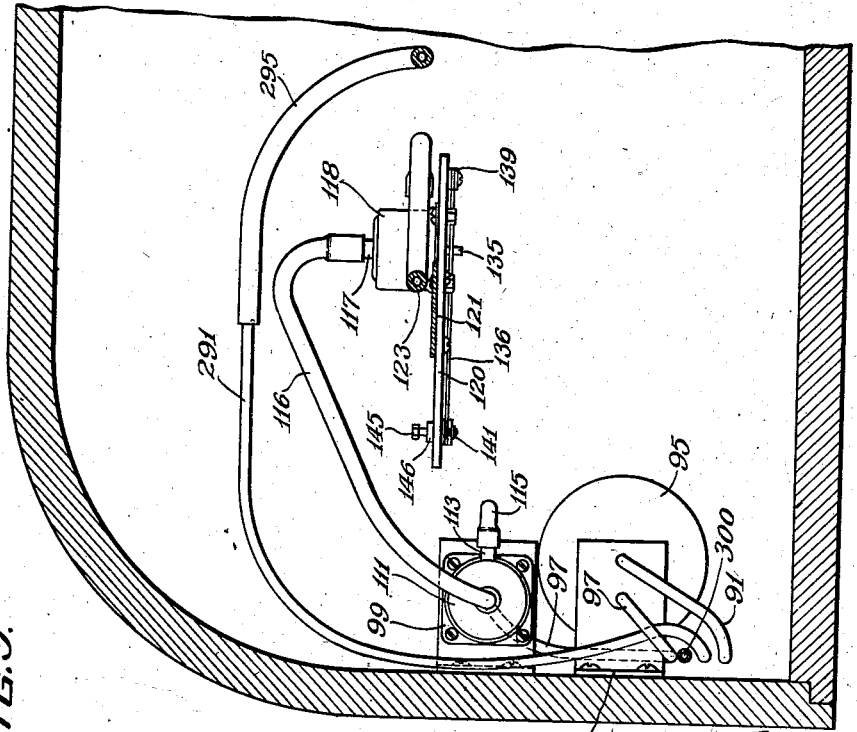

July 15, 1941.                B. W. WILLIAMS ET AL                2,249,370
PULSE COUNT AND BLOOD PRESSURE APPARATUS
Filed March 20, 1940            13 Sheets-Sheet 7
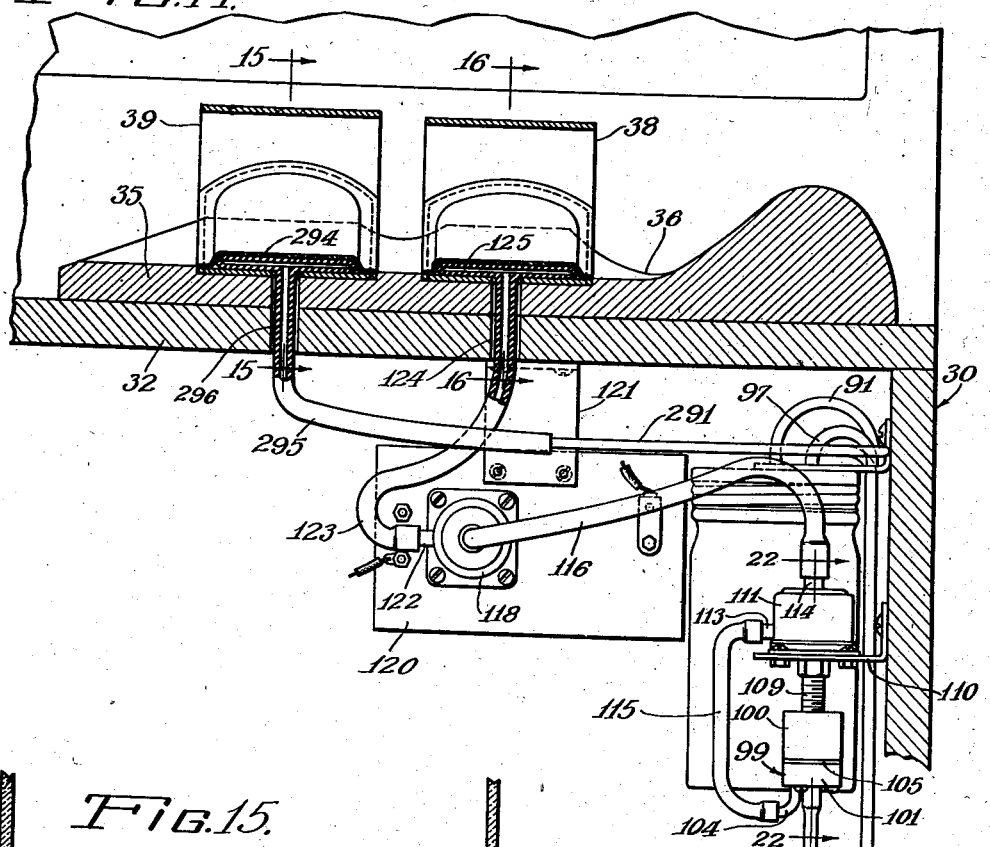
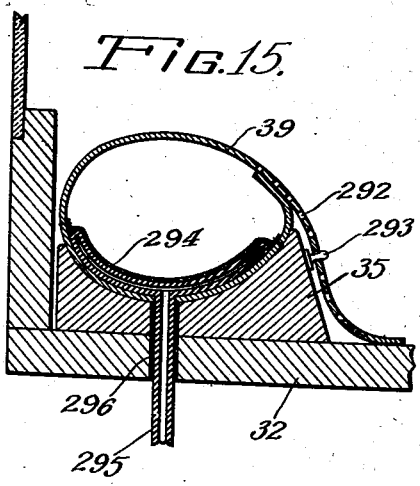
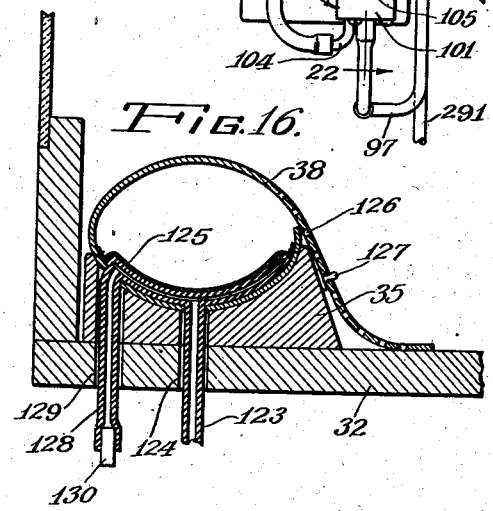
Inventors:
Bradlee W. Williams
Homer S. Williams
By Belt, Wallace and Cannon
Attorneys July 15, 1941.  B. W. WILLIAMS ET AL  2,249,370
PULSE COUNT AND BLOOD PRESSURE APPARATUS
Filed March 20, 1940  13 Sheets-Sheet 8
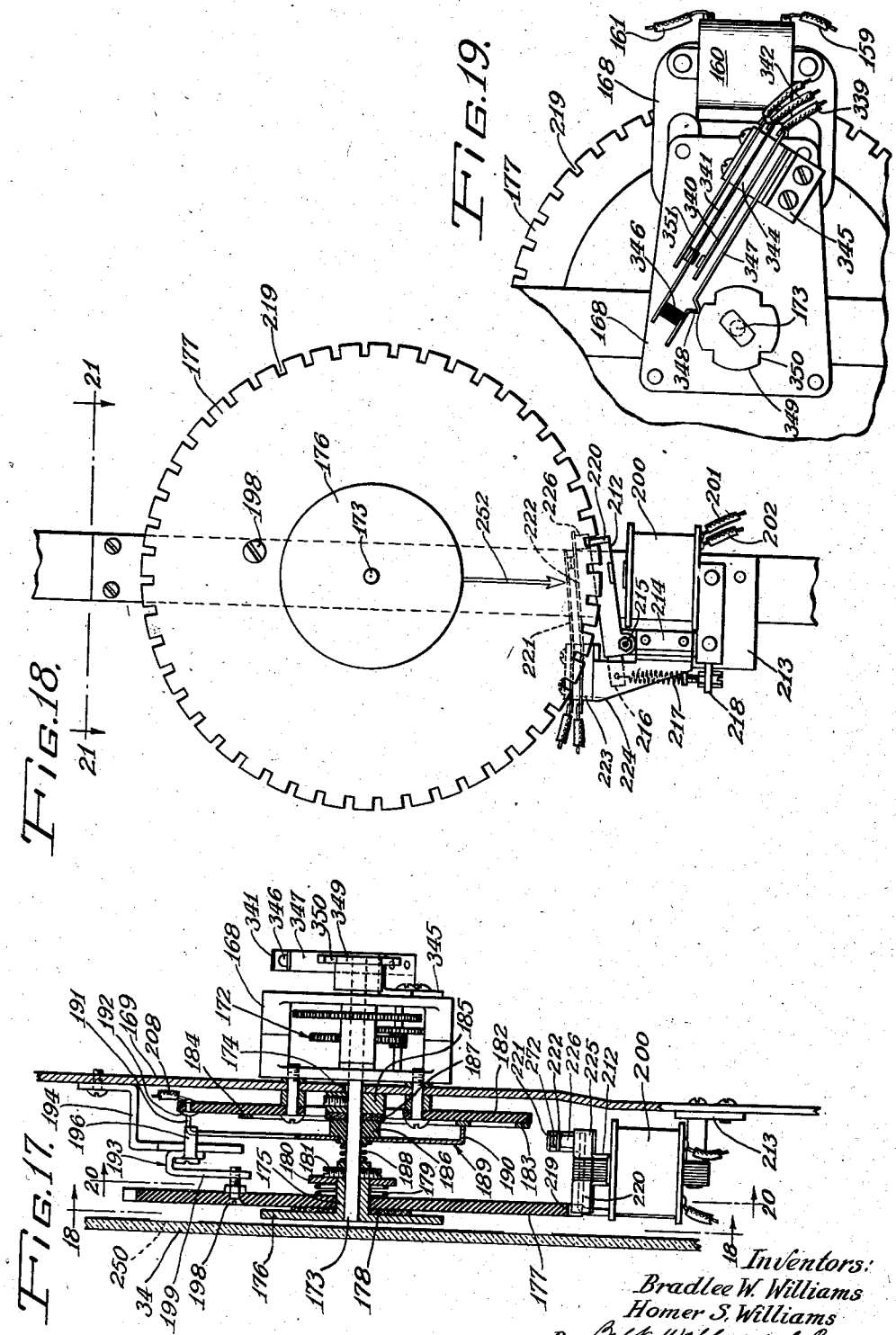
Inventors:
Bradlee W. Williams
Homer S. Williams
By Bell, Wallace and Cannon
Attorneys

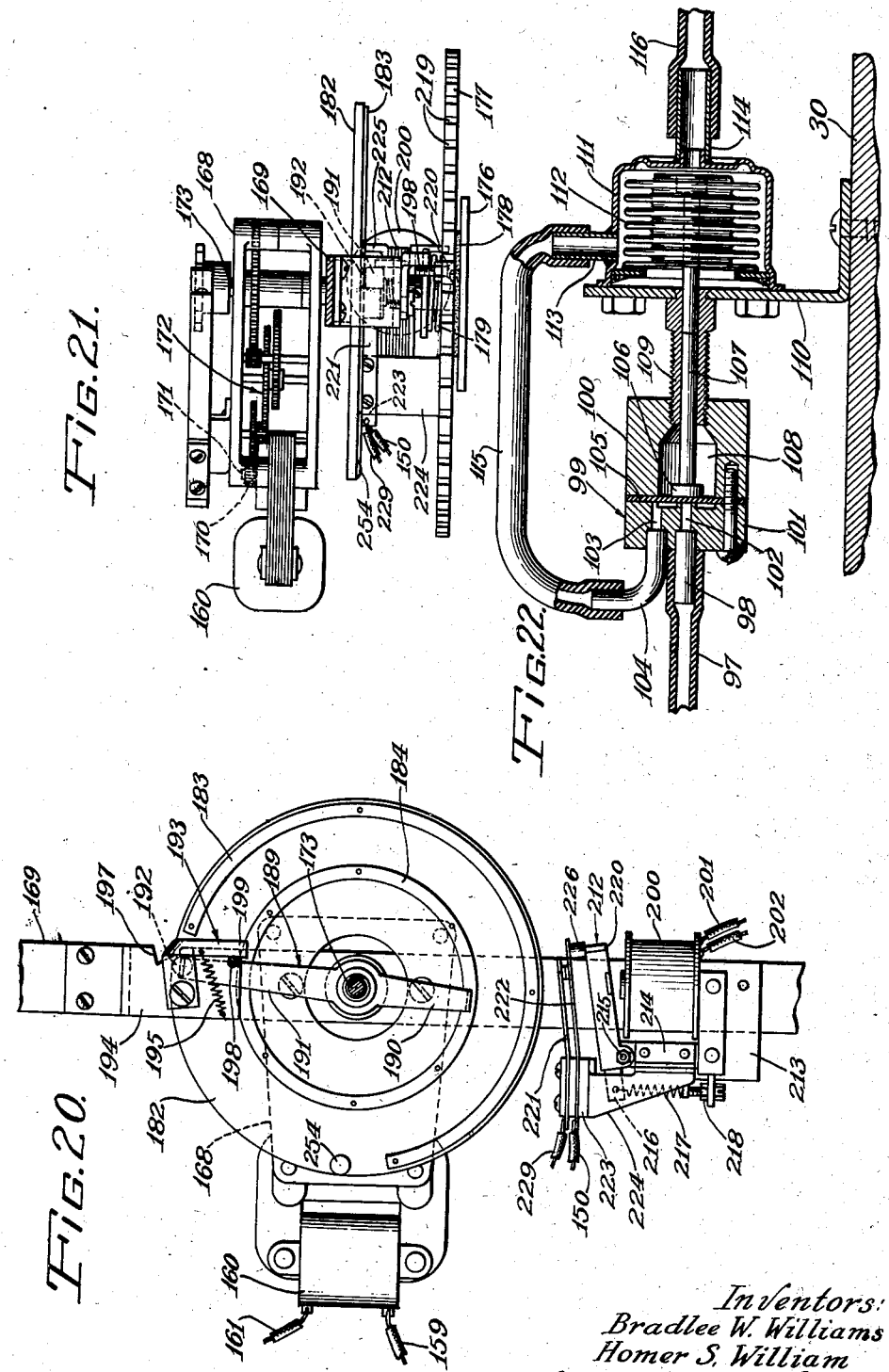

July 15, 1941.                B. W. WILLIAMS ET AL                2,249,370
                    PULSE COUNT AND BLOOD PRESSURE APPARATUS
                    Filed March 20, 1940        13 Sheets-Sheet 10
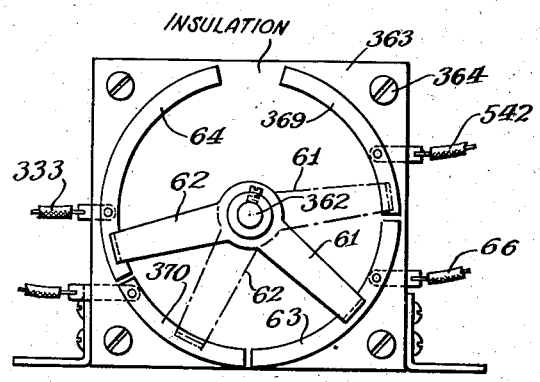
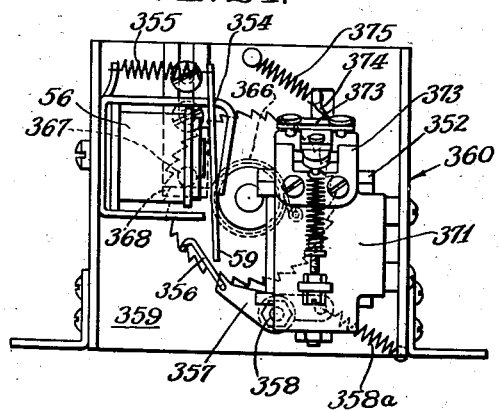 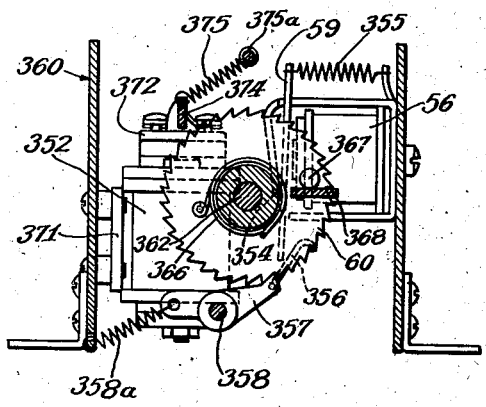
Inventors:
Bradlee W. Williams
Homer S. Williams
By Belt, Wallace and Cannon
Attorneys July 15, 1941.                B. W. WILLIAMS ET AL                2,249,370
                    PULSE COUNT AND BLOOD PRESSURE APPARATUS
                    Filed March 20, 1940        13 Sheets-Sheet 11

Inventors:
Bradlee W. Williams
Homer S. Williams
By Belt, Wallace
and Cannon
Attorneys July 15, 1941.　　　B. W. WILLIAMS ET AL　　　2,249,370
PULSE COUNT AND BLOOD PRESSURE APPARATUS
Filed March 20, 1940　　　13 Sheets-Sheet 12
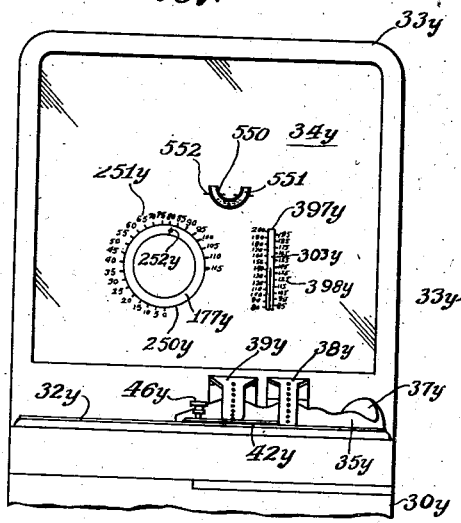
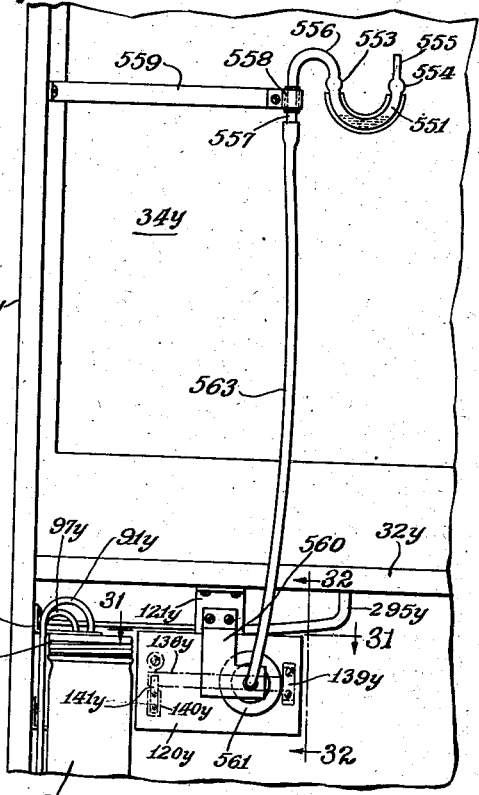
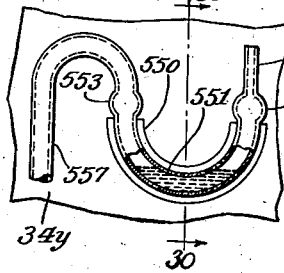
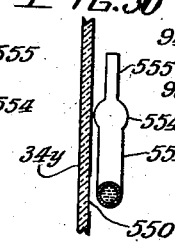
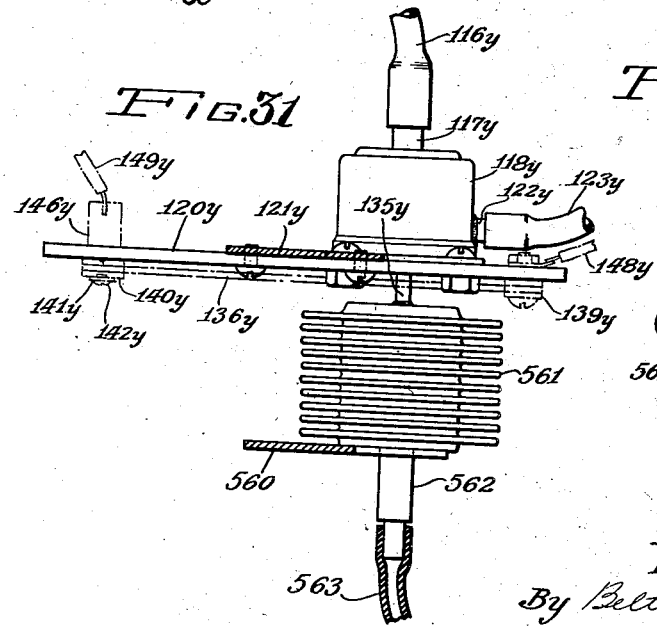
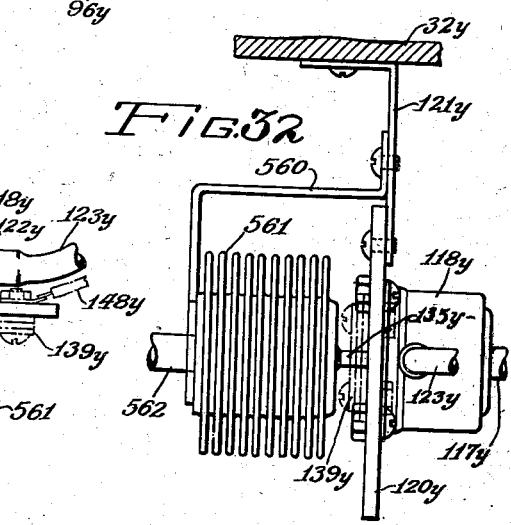
Inventors:
Bradlee W. Williams
Homer S. Williams
By Belt, Wallace and Cannon
Attorneys July 15, 1941.  B. W. WILLIAMS ET AL  2,249,370
PULSE COUNT AND BLOOD PRESSURE APPARATUS
Filed March 20, 1940  13 Sheets-Sheet 13
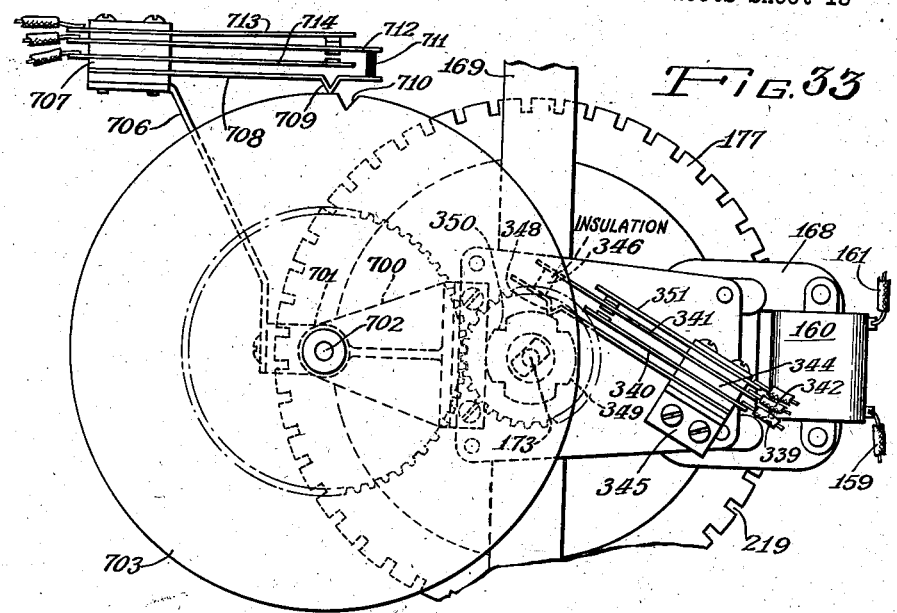
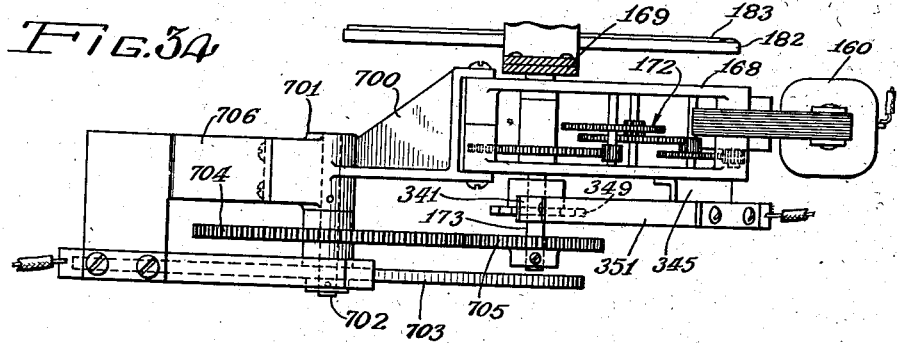
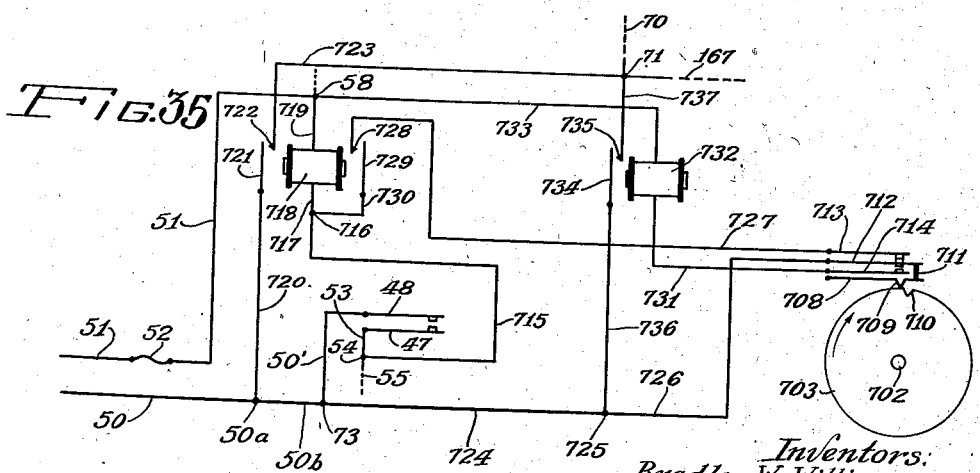
Inventors:
Bradlee W. Williams
Homer S. Williams
By Belt, Wallace and Cannon
Attorneys Patented July 15, 1941

2,249,370

UNITED STATES PATENT OFFICE 2,249,370

PULSE COUNT AND BLOOD PRESSURE APPARATUS

Bradlee W. Williams and Homer S. Williams, Chicago, Ill., assignors to Tech Equipment Company, Chicago, Ill., a corporation of Illinois Application March 20, 1940, Serial No. 325,017

56 Claims. (Cl. 128—2.05).

This invention pertains to ascertaining the frequency with which repetitious pulsations or the like are effected and also to the measuring of pressure; for example, that entailed in effecting the aforesaid pulsations or the like, the form of the invention herein disclosed being operative to ascertain the pulse and the systolic blood pressure in the human body.

The pulse of the human body is customarily expressed in terms of beats per minute, this referring to the number of systoles per minute. A systole or systolic heart beat is that period in the functioning of the heart when it is contracting and forcing blood through the arteries in the course of which the arteries expand, the periods of greatest expansion being those which are discerned and counted and being the peaks of the systoles, the periods of rest between the systoles being known as diastoles and in the course of which the arteries contract from the expanded state acquired thereby during the systoles whereby the flow of blood through the arteries is continued during the diastoles. Systoles, or rather the peaks of the systoles, are usually discerned and counted at the volar aspect of the wrist where the expansions of the radial artery in the forearm in response to systoles are discerned.

The systolic blood pressure of the human body, that is, the pressure in the arteries during systoles, is customarily expressed in terms of millimeters of mercury. This pressure is usually ascertained by applying sufficient extraneous pressure to the upper arm to collapse the brachial artery and thereby interrupt the flow of blood therethrough. Once the flow of blood through this artery has been interrupted, the extraneous pressure is gradually reduced and when the reduction is such that the extraneous pressure is equal to the systolic pressure in the brachial artery then, by reason of the tendency of the brachial artery to expand and the systolic pressure in such artery, the effect of the extraneous pressure is overcome and blood again courses through the brachial artery to the radial artery which leads therefrom. Such resumption of the flow of blood through the radial artery may be perceived either at the volar aspect of the wrist, by the sense of touch, or by the sense of hearing through the medium of a stethoscope applied to the volar aspect of the arm at the cubital fossa. The gradual reduction of the extraneous pressure is interrupted as soon as the resumption of the flow of blood through the radial artery is perceived for it is then equal to the systolic blood pressure. A manometer or the like, readable in terms of millimeters of mercury, is employed to measure the extraneous pressure applied to collapse the brachial artery and the reading thereof, when the aforesaid gradual reduction of such pressure is interrupted, is the systolic blood pressure in terms of millimeters of mercury.

From the foregoing it will be understood that the radial artery in the forearm is customarily entailed in the ascertainment of the pulse and systolic blood pressure of the human body, and among the objects of the present invention is to ascertain the pulse and systolic blood pressure in the human body from the radial artery in a novel and accurate manner.

In accordance with the present invention, the pulse, that is, the frequency of the systoles, is detected and ascertained at the volar aspect of the wrist and the systolic blood pressure is ascertained by first applying sufficient extraneous pressure to the forearm to collapse the radial artery and thereafter gradually reducing such pressure to enable the tendency of the artery to expand and the systolic pressure in the artery to overcome such extraneous pressure and restore the flow of blood through the artery past the volar aspect of the wrist, such gradual reduction of the extraneous pressure being interrupted when the resumption of blood flow through the radial artery past the volar aspect of the wrist is there detected, the degree of extraneous pressure remaining when the aforesaid reduction of such pressure is so interrupted being equal to the systolic blood pressure, and an important object of our invention is to effect the foregoing in a novel manner by the utilization of novel means.

Still another object is to count only those arterial expansions induced by systoles so as not to count the dicrotic phase of a pulse beat as a systolic effect, such dicrotic phase of a pulse beat being the result of a decrease in the blood pressure arising while the semilunar valves of the aorta are closing as an incident to the initiation of a diastole, there being an increase in the blood pressure, with an accompanying expansion of the arteries, for a brief period following such closing of the valves. This increase in blood pressure is in the nature of a systolic effect, but is, in reality, merely an attribute of the closing of the semilunar valves. In an abnormal condition, where the semilunar valves close quite slowly, the dicrotic phase of the pulse beat may be of such relatively substantial proportions that the effect thereof in the arteries will approach the effect of a systole and a diastole therein. Hence, an object ancillary to that last set forth is to insure that only true systolic effects in the arteries will be counted, and a related object is to effect advance to registering or recording position of suitable registering or recording means only in response to true systolic effects in the arteries and thereby insure accurate counting of the pulse.

More specific objects related to the foregoing are to initiate a predetermined operation in response to each true systolic effect in the arteries during an established time interval; and to prevent an initiation of such a predetermined operation, once such an operation has been initiated, during a period of time shorter than the period of time which will intervene between true systolic effects in the arteries whereby effects in the nature of systolic effects, such as may arise in the dicrotic phase of a pulse beat, will not be counted as systolic effects, the length of such period of time during which initiation of the aforesaid predetermined operation is prevented being dependent upon the maximum pulse to be counted by the machine. Thus, if the machine is to be operative to count pulses up to one hundred and five beats per minute, then the initiation of the aforesaid predetermined operation will be prevented for a period slightly less than about 0.571 second, the time intervening between true systolic effects in the arteries where the pulse is one hundred and five beats per minute.

Yet further objects are to interrupt the aforesaid predetermined operation in response to a diastolic effect in the arteries subsequent to a systolic effect initiating such an operation; to initiate a predetermined operation in response to a systolic effect in the arteries and to continue such operation in effect until a diastolic effect occurs in the arteries and to prevent re-initiation of such operation in response to a systolic effect until after the elapse of a predetermined period of time; and to utilize means for effecting the foregoing which will be capable of use in instances other than the counting of systolic effects in the arteries.

Still more specific objects ancillary to the foregoing are to effect energization of an electrically-operated device, such as a relay, in response to systolic effects in the arteries; to maintain such a device in operation once it is so set in operation, as by establishing a stick or holding circuit therefor, and to interrupt such operation in response to a diastolic effect in the arteries subsequent to the systolic effect initiating such operation, as by effecting energization of an electrically-operated device, such as a relay, and through which a stick or holding circuit, as aforesaid, is established, in response to a diastolic effect, as aforesaid; and to prevent energization of such an electrically-operated device in response to a systolic effect in the arteries until after the elapse of a predetermined period of time; whereby an electrically-operated device, such as a relay, may be rendered operative in response to a systolic effect in the arteries and may continue in operation until another electrically-operated device, such as a relay, is energized in response to a diastolic effect in the arteries and also whereby re-energization of the first-named electrically-operated device may be prevented, as by opening the energizing circuit thereto, for a predetermined period of time subsequent to the initiation of energization thereof; and a still further object is to enable such an arrangement to be utilized in instances other than those responsive to systolic and diastolic effects in the arteries.

Other objects of this invention are to apply fluid pressure in a closed system against the volar aspect of the wrist and to operate means included in such a closed system in response to the effect of systoles and diastoles impressed on the system at the volar aspect of the wrist; to retain the volar aspect of the wrist in engagement with a yieldable member and to force a fluid into such yieldable member until a predetermined pressure is built up therein and to thereafter releasably maintain such predetermined pressure in the yieldable member; and to force a liquid into the system including the yieldable member so that, when the system is closed after a predetermined pressure is established therein, a hydraulic system is afforded through which the effect of systoles and diastoles impressed on the system at the volar aspect of the wrist may be transmitted, whereby the effect of systoles and diastoles impressed on the system at the wrist may be utilized at a place or places in the system remote from the wrist.

The magnitude of systoles, and resultantly of diastoles, varies substantially from person to person which means that in one person the systoles will afford appreciable force while in another the force of the systoles will be little more than perceptible. Thus if a yieldable member is applied to the volar aspect of the wrist, to be responsive to the effect of systoles and diastoles in the radial artery leading past such aspect it will, in some instances, have appreciable force applied thereon and in others have but slight force applied and this would, of course, be true of any means that might be utilized to sense systolic and diastolic effects in the arteries. Thus in those instances where, as here, the sensed effects of the systolic and diastolic phases of the heart beat are to be utilized to initiate a predetermined operation and to interrupt such operation, and where this is to be effected through the intermediary of means responsive to variations in pressure, where the magnitude of such variations in pressure may vary from time to time as do the systolic and diastolic effects in the arteries of different persons, it is advantageous to take cognizance of slight as well as substantial variations, and so to do is still another object of our invention, and a related object is to insure accurate functioning of means responsive to systolic and diastolic effects irrespective of the force or magnitude of the systolic effects and, resultingly, of the diastolic effects, and a further object is to utilize the effect of systoles and diastoles in the radial artery of a person, irrespective of the magnitude thereof, to count the systolic heart beats of such person.

Objects related to the immediately foregoing objects are to afford relative movement between selected operative parts in an apparatus responsive to periodic variations in pressure or the like and thereby enable utilization of the apparatus in those instances where the magnitude of such periodic variations may vary from time to time; to effect movement of one of such relatively movable members from the other as an incident to the initiation of movement of such other member; to limit the movement of such one member with such other member and thereby enable the relative movement of which such members are capable to take place; and to enable a control operation or control operations to be effected in response to the movement of said one member with the other; and further objects related to that last set forth are to close and open one or more electrical circuits in response to movements of said one member with the other; and to effect energization and deenergization of one or more electrically-operated devices, such as relays, in response to the movement of said one member with the other.

Yet further objects pertaining to the immediately foregoing objects are to effect reciprocation of a member and to associate with such reciprocatory member another member which will move with the reciprocatory member only briefly during each phase of the reciprocation thereof; to initiate an operation in response to movement of such other member with the reciprocatory member when said reciprocatory member moves in one direction and to interrupt such operation upon movement of such other member with the reciprocatory member when the reciprocatory member moves in the opposite direction; to effect reciprocation of such reciprocatory member through the intermediary of means included in a closed system responsive to variations in pressure such as may be induced by systolic and diastolic effects in the arteries; and to attach a reciprocatory member to a bellows compressible and extendible in response to alternate phases of pulsations; and to establish a frictional interconnection between such reciprocatory member and said other member whereby the other member will move with the reciprocatory member in the course of opposite phases of reciprocation thereof until movement of such other member is interrupted, wherefore movement of the reciprocatory member in the direction in which it was moving when the movement of such other member was interrupted may continue without operative effect on such other member.

Further objects are to provide a system including a yieldable member that may be applied to the volar aspect of a wrist; to force a liquid under pressure into said system until a predetermined pressure is built up therein and to then close off said system so as to maintain such predetermined pressure therein whereby systolic and diastolic effects in the radial artery, leading past the volar aspect of the aforesaid wrist, impressed on such yieldable member engaged with such volar aspect will induce corresponding pulsations in said closed system; to include in said closed system a member movable in response to pulsations impressed thereon; to associate with such member a member movable therewith but to limit the movement of such other member with the first member in such a way that pulsations of slight or comparatively great magnitude in said closed system will effect corresponding movement of such other member in response to the pulsations; to initiate a period of operation under control of such movable member in response to one phase of a pulsation and to interrupt such period of operation upon movement of said member in response to another phase of such pulsation; to prevent initiation of such a period of operation for a predetermined time after the initiation of such a period of operation; to enable such periods of operation to be continued for another predetermined time once such periods of operation are initiated; and to ascertain the number of such periods of operation in such other predetermined time and thereby determine the pulse in the human body including the wrist against the volar aspect of which the aforesaid yieldable member is engaged; and an object related to the foregoing is to enable the utilization of an arrangement such as the foregoing in instances other than the ascertainment of the pulse in the human body, and a still further object related to the foregoing is to enable registering or recording of the aforesaid number of periods of operation in said other predetermined period of time to thereby facilitate ascertainment of the pulse of a human body or the like.

It is another important object of this invention to ascertain the degree of pressure entailed in producing a pressure-effected function discernible at a particular place by first applying sufficient extraneous pressure to overcome the pressure entailed in effecting the function and thereby interrupt the function, at least at the place where it is discernible, and to thereafter reduce the extraneous pressure until the entailed pressure overcomes the extraneous pressure and causes the function to be resumed at least at the place where it is discernible and to interrupt reduction of the extraneous pressure, when the function has been so resumed, to bring about predetermined effects and to thereupon ascertain the degree of extraneous pressure when the reduction thereof is interrupted under the aforesaid conditions whereby, since the entailed and extraneous pressures will be equal when the entailed pressure overcomes the extraneous pressure, the degree of entailed pressure may be ascertained.

An object related to the foregoing is to so apply extraneous pressure that the flow of blood through the radial artery of an arm of a human body may be interrupted and to thereafter reduce the extraneous pressure so applied until the tendency of the artery so collapsed to expand, and the systolic blood pressure therein, overcomes the extraneous pressure; and to thereupon suspend reduction of the extraneous pressure if predetermined effects in the radial artery, by reason of the resumption of the flow of blood therethrough, are disposed at the volar aspect of the wrist past which such artery leads, whereby the systolic blood pressure in the human body may be ascertained by determining the degree of extraneous pressure when the reduction thereof is suspended, since the extraneous pressure and systolic blood pressure will be equal when the effect of the extraneous pressure is overcome as aforesaid.

Further objects related to the foregoing are to apply such pressure to the volar aspect of an arm of the human body that the flow of blood through the radial artery leading past such volar aspect will be interrupted; to thereafter gradually reduce such pressure until the tendency of the collapsed radial artery to expand, and the systolic blood pressure therein, overcomes the extraneous pressure so applied thereto and the flow of blood through the radial artery past the volar aspect of the wrist of the arm through which such artery leads is resumed; to effect such reduction of the extraneous pressure applied to the volar aspect of the arm as aforesaid in a step by step manner; to suspend the gradual reduction in pressure when effects such as may be attendant to the resumption of the flow of blood in the radial artery past the volar aspect of the wrist are discerned at such volar aspect of the wrist; to interrupt further reduction of the extraneous pressure applied to the volar aspect of the arm as aforesaid when predetermined systolic and intervening diastolic effects are discerned at the volar aspect of the wrist subsequent to a suspension of the reduction of the extraneous pressure as aforesaid; to resume gradual reduction of the extraneous pressure when predetermined systolic and attendant diastolic effects are not discerned at the volar aspect of the wrist subsequent to the suspension of a reduction of such pressure as aforesaid, but to interrupt such further reduction of the extraneous pressure when the aforesaid predetermined systolic and related diastolic effects are discerned at the volar aspect of the wrist; to enable the degree of extraneous pressure to be ascertained when the gradual reduction of such pressure is interrupted as aforesaid; and to utilize means for effecting the foregoing which will be capable of use in instances other than the ascertaining of the systolic blood pressure in the human body as instances entailing pressure-induced pulsations.

Yet further objects of our invention are to apply sufficient extraneous pressure of the volar aspect of an arm of the human body to collapse the radial artery leading past the volar aspect of such arm and thereby interrupt the flow of blood therethrough as by establishing such pressure under the influence of the height of a mercury column in a manometer or in response to other equivalent pressure measuring means; to gradually reduce the pressure so induced in a step by step manner and to interrupt such reduction when predetermined effects are discerned at the volar aspect of the wrist past which the aforesaid radial artery leads and which effects are set up by the coursing of blood through the radial artery when the tendency of such artery to expand, and the systolic blood pressure therein, overcomes the effect of the extraneous pressure, at which time the systolic blood pressure and the extraneous pressure will be equal; to establish a column of mercury as aforesaid or the like through the intermediary of fluid pressure established in a closed system; to establish and maintain such a closed system when predetermined fluid pressure is built up therein; to bring about the aforesaid step by step reduction by intermittently releasing predetermined quantities of fluid from the aforesaid closed system; to suspend the release of fluid from the aforesaid closed system in response to predetermined conditions and to fully interrupt such release of fluid from the closed system under further predetermined conditions related to the last-mentioned predetermined conditions; to enable the height of the mercury column or the condition of other pressure-measuring means to be ascertained when further release of fluid from the aforesaid closed system is interrupted; and to maintain the mercury column or the like at whatever condition is assumed thereby when the release of fluid from the aforesaid closed system is interrupted in response to the aforesaid predetermined conditions.

Objects ancillary to the immediately foregoing objects are to release fluid from the aforesaid closed system into a system of predetermined capacity and to thereafter close off communication between such systems; to release fluid from the system of predetermined capacity when this system is out of communication with the aforesaid closed system; to prevent the release of fluid from the system of predetermined capacity upon predetermined conditions; to electrically operate the means for effecting release of fluid from the aforesaid system of predetermined capacity and to effect operation of such electrically-operated means under predetermined conditions; to establish pressure in another system including pressure-measuring means in response to the pressure in the aforesaid closed system; to interrupt communication between such other system and the closed system in response to predetermined conditions and subsequent to the time when operation of the means controlling the release of fluid from the system of predetermined capacity is prevented; and to electrically operate the means which closes off communication between such other system and the aforesaid closed system and to effect operation of such electrically-operated means to close off communication between such systems under predetermined conditions and subsequent to the time when operation of the electrically-operated means controlling the release of fluid from the aforesaid system of predetermined capacity is effected; a further and related object to the immediately foregoing being to afford independent circuits to the aforesaid two electrically-operated devices and to utilize switch means constructed and arranged to open one of said circuits in response to predetermined conditions and also constructed and arranged to break the other of said circuits in response to predetermined conditions and subsequent to the time the first of said circuits is broken.

Still further objects of this invention are to cause contact fingers to assume predetermined positions with respect to contact strips when an apparatus of the kind to which this invention pertains is initially set in operation; to retract such contact fingers away from the aforesaid positions assumed thereby in a step by step manner; and to establish such relation between the respective contact fingers and contact strips engageable thereby that one of such contact fingers will move from engagement with one of such contact strips in the course of the step by step retraction thereof prior to the time the other of such contact fingers moves from engagement with the contact strip engaged thereby in the course of the step by step retraction of such contact fingers; and an object related to the foregoing is to effect the step by step retraction of the contact fingers in response to systolic and diastolic effects in a radial artery leading past the volar aspect of the wrist of an arm of a human body, and a yet further related object is to insure that full disengagement of the contact fingers from the contact strips cooperating therewith will not be effected until a predetermined number of systolic and diastolic effects have been discerned at the aforesaid volar aspect of a wrist.

Still other important objects of this invention are to first ascertain the pulse in a human body and to thereafter ascertain the systolic blood pressure therein; to suspend the operation of ascertaining the systolic blood pressure until the operation of ascertaining the pulse has been completed; to initiate the operation of ascertaining the systolic blood pressure subsequent to the completion of the operation of ascertaining the pulse and to prevent the initiation of an operation of ascertaining the pulse until the completion of an operation for ascertaining the systolic blood pressure; to suspend an operation for ascertaining the pulse until predetermined conditions prevail and to thereafter carry out the operation of ascertaining the pulse for a predetermined period of time; and to enable an operation for determining the systolic blood pressure to be carried out independently of a time factor in so far as the length of such operation is concerned.

Yet further important objects of our invention are to determine the systolic blood pressure under control of systolic and diastolic effects in the radial artery discerned at the volar aspect of the wrist past which such artery leads; to insure that only systolic and diastolic effects discerned at the volar aspect of the wrist will be effective to determine the systolic blood pressure; to utilize fluid pressure in a closed system to discern systolic and diastolic effects at the volar aspect of the wrist and to so arrange the means under control of the fluid pressure in such system that only predetermined repetitious pulsations will bring about operation of the means for registering or recording the systolic blood pressure, whereby other effects on such system will be prevented from operating such registering or recording means so as to thereby prevent the registering or recording of an incorrect systolic blood pressure.

Yet further objects are to enable fluid pressure to be established and maintained in a closed system in response to the fluid pressure therein; to enable a predetermined fluid pressure to be built up in a closed system and to thereafter effect reduction in the fluid pressure in such system; to establish fluid pressure in a system including pressure registering or recording means from a closed system in which a fluid pressure is established but which may be reduced in a step by step manner; and to enable the fluid pressure to be relieved from the aforesaid closed systems when so desired but at the same time to prevent the relief of fluid pressure from the system including the pressure registering or recording means.

Still further objects of this invention are to insure operation of various operative mechanisms included in the apparatus in predetermined timed relation one with the other; to utilize a common timing means to insure that the foregoing may be brought about; to include switching means in the common timing means through which electrical circuits may be established at predetermined times and for predetermined periods of time; and to utilize said timing means to suspend the initiation of the operations to be controlled thereby until predetermined conditions prevail so as to thereby insure proper timed relation among the various operative mechanisms controlled by said timing means.

Further objects are to enable a record to be made of the results of operations of the apparatus; to utilize suitable printing means to produce such record on a ticket or the like; to enable such a ticket or the like to be cut from a web or strip of material which may be conveniently stored in the machine; to sever such ticket from the web or strip of material after the results of operation of the machine have been recorded thereon; and to thereafter so advance the strip that another ticket may be cut therefrom in an operation of the machine subsequent to that in which a particular ticket is so cut from the strip.

Yet further objects are to manifest the force and magnitude of systolic, and resultingly diastolic, effects sensed in the course of operation of the apparatus; to sense systolic and diastolic effects in the radial artery of a user of the apparatus at the volar aspect of the wrist of a user and to effect movement of a liquid in response of such sensed effects; to operate a pump in response to sensed systolic and diastolic effects to thereby effect fluid movement in response to such effects; and to utilize a U-tube having liquid in the bight thereof and to set such liquid in motion in response to systolic and resultantly diastolic effects sensed in the course of operation of the apparatus.

Still further objects are to electrically manifest the force and magnitude of systolic and diastolic effects sensed in the course of operation of the apparatus; to enable relatively weak and limited movements induced in the course of operation of the apparatus to be utilized for effecting selected operations therein; to enable relatively weak and limited movements induced in the course of operation of the apparatus to be so amplified that power-entailing operations may be effected therefrom; to enable such operations to be effected by the utilization of electronic tubes; to utilize pressure responsive means for effecting variations in electrical circuits and to bring about predetermined operations under control of such pressure responsive means; to produce a graphic illustration of functions sensed in the course of operation of the apparatus; and to produce a graph illustrative of the force and magnitude and other aspects of systolic and diastolic effects sensed in the course of operation of the apparatus.

Among further objects of this invention are to enable an operation of the apparatus to ensue for but a predetermined period of time; to maintain a predetermined operative condition in the machine for a predetermined period of time and to thereafter interrupt such predetermined condition and prevent reestablishment thereof until a new cycle of operation is to proceed; to afford alternate electrical paths and to establish one of said paths before the other is broken and thereafter to break the other of said paths and thereby prevent further operation of the machine until the first of said paths is again reestablished; and to utilize make-before-break contacts so as to enable the interruption of one electrical circuit and the establishment of another electrical circuit in such manner that desired operation of the apparatus will be insured.

Other and further objects of the present invention will be apparent from the following description and claims and are illustrated in the accompanying drawings which, by way of illustration, show preferred embodiments and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a front elevation of a machine embodying our invention;

Fig. 2 is a side elevational view looking in at the right-hand side of Fig. 1;

Fig. 3 is a plan view of the machine shown in Fig. 1;

Fig. 4 is a rear elevational view of the upper portion of the machine shown in Fig. 1 with the back wall of the machine removed;

Fig. 5 is a plan view partly in section taken substantially on the line 5—5 on Fig. 4;

Fig. 6 is a detail elevational view, in which certain parts are broken away, of a pump and allied apparatus appearing in the lower right-hand corner of Fig. 4;

Fig. 7 is a view looking in at the right-hand side of the apparatus illustrated in Fig. 6;

Fig. 8 is a plan view of the apparatus illustrated in Figs. 6 and 7;

Figure 11:
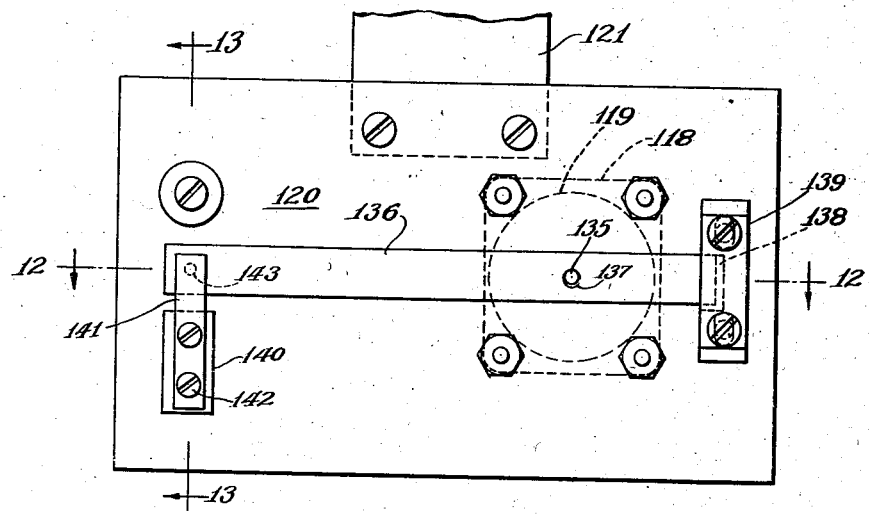
Figure 12:
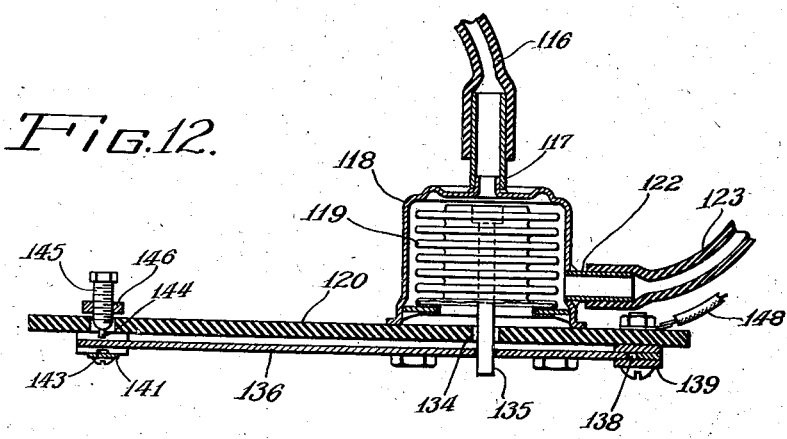
Figure 13:
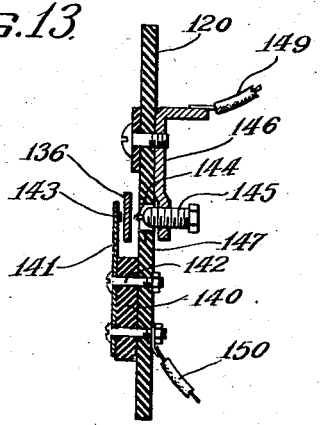

Figs. 9 and 10 are views taken substantially and respectively on the lines 9—9 and 10—10 on Fig. 4;

Fig. 11 is an elevation of a switch employed in the apparatus;

Figs. 12 and 13 are sectional detail views taken substantially and respectively on the lines 12—12 and 13—13 on Fig. 11;

Fig. 14 is a sectional detail view taken substantially on the line 14—14 on Fig. 3;

Figs. 15 and 16 are transverse sectional detail views taken substantially and respectively on the lines 15—15 and 16—16 on Fig. 14;

Fig. 17 is a sectional detail view taken substantially on the line 17—17 on Fig. 4;

Fig. 18 is an elevation of the device of Fig. 17 looking from left to right thereof and in the direction of lines 18—18;

Fig. 19 is a detail view, drawn to an enlarged scale, of a portion of the apparatus shown in Fig. 18 but looking in the opposite direction from Fig. 18;

Fig. 20 is a sectional detail view taken substantially on the line 20—20 on Fig. 17;

Fig. 21 is a view taken substantially on the line 21—21 on Fig. 18;

Fig. 22 is a sectional detail view taken substantially on the line 22—22 on Fig. 14;

Fig. 23 is an elevational view taken substantially on the line 23—23 on Fig. 5;

Fig. 24 is an elevational view of the apparatus shown in Fig. 23 but looking in the opposite direction from Fig. 23;

Fig. 25 is a view taken substantially on the line 25—25 on Fig. 5;

Fig. 26 is a schematic view showing the operative parts in the apparatus and the connections therebetween;

Fig. 27 is a fragmentary front elevational view, similar to Fig. 1, showing another form of the apparatus;

Fig. 28 is a fragmentary rear view, similar to Fig. 4, of the form of the apparatus shown in Fig. 27;

Fig. 29 is a fragmentary rear view, drawn to an enlarged scale, of a portion of the apparatus shown in Fig. 28;

Fig. 30 is a detail view taken substantially on the line 30—30 on Fig. 29;

Figs. 31 and 32 are views taken substantially and respectively on the lines 31—31 and 32—32 on Fig. 33;

Fig. 33 is an elevational view looking in the same direction as Fig. 19, but showing a modified form of the apparatus;

Fig. 34 is a side view of the apparatus shown in Fig. 33; and

Fig. 35 is a wiring diagram in which the apparatus shown in Figs. 33 and 34 is utilized.

The machine shown in the accompanying drawings embodies a casing 30 that has a seat 31 preferably permanently attached thereto and arranged to rest on the same support as that on which the casing 30 is rested, the seat 31 being disposed, in the present instance, at the front of the casing 30 near the left-hand side thereof as viewed in Fig. 1. With the seat 31 arranged in this manner the left arm of a person seated thereon may be conveniently rested on the shelf 32 afforded by the casing 30, this shelf being disposed forwardly of an upright housing 33 in which certain operative parts of the machine illustrated in the accompanying drawings are mounted, the front wall of this housing 33 preferably being afforded by a translucent panel 34 on which certain indicia are arranged, as will be explained more fully hereinafter.

An arm rest 35 is mounted on the shelf 32, preferably near the right-hand end thereof as viewed in Fig. 3, and this arm rest includes at the right-hand end thereof, in the present instance, a formed portion 36 in which the palm of the left hand of a user of the machine may be rested, and suitable recesses as 37 are associated with this portion 36 to receive the fingers of such left hand. The arm rest 35 is preferably so formed and of such a length that, when the palm of the left hand of a user is disposed in the formed portion 36, the volar aspect of the left arm of the user may rest in a trough-like portion formed in the upper surface of the arm rest 35 with the dorsal aspect of the arm in position to be engaged by the wrist and arm straps 38 and 39, as described more fully hereinafter.

The machine also includes a coin chute 40, Fig. 4, which leads from a coin slot 41, Fig. 3, in a bezel 42 mounted on the shelf 32, to a coin-operated switch, generally indicated by 43, Fig. 4. The coin chute 40 and switch 43 are of conventional form and include the usual coin-return duct 44, Fig. 4, that leads to an opening in the bezel 45, Fig. 1, through which a returned coin may be removed from the coin-return duct, the usual knob 46 being provided and which, when grasped, is operable to cause return of a coin through the return duct 44.

The apparatus in the illustrated form of the machine first operates, in the first described form of the apparatus, to register the pulse and thereafter to register the systolic blood pressure and, while the machine is shown as being coin-controlled, it will be understood that other means could be substituted for the coin control for initiating machine operation.

In the present instance, however, a coin inserted into the coin slot 41 causes engagement of the contacts 47 and 48, Figs. 4 and 26, this arrangement being one which is common in the art and, since a wide variety of arrangements may be resorted to, it is not illustrated or described in detail herein. After so engaging the contacts 47 and 48, the inserted coin passes to the coin box 49, Figs. 4 and 5, where it is collected along with similarly inserted coins.

A pair of line wires 50 and 51, Fig. 26, lead from a suitable source of electric current, a fuse 52 preferably being included in one such line wire, the line wire 51 in this instance, for a purpose well understood in the art. As shown in Fig. 26, the conductor 50 leads to a terminal 50a, while a conductor 50b leads to a terminal 73 from which a conductor 50' leads to the contact 48. A conductor 53 leads from the contact 47 to a terminal 54 and a conductor 55 leads from the terminal 54 to one end of the winding of the coil of an electromagnet or relay 56. A conductor 57 leads from the other end of this winding to a terminal 58 to which the line wire 51 is led. It will therefore be seen that engagement of the contacts 47 and 48 closes circuit through the coil of the electromagnet 56 whereupon the armature 59 thereof is attracted and this, in a manner explained hereinafter, withdraws the retaining pawl 357, Figs. 25 and 26, from engagement with the ratchet wheel 60 whereupon this wheel and the parts associated therewith are freed to the action of the spring 366, Figs. 5, 24 and 25, and thereupon the contact fingers 61 and 62, connected to the ratchet 60, move from the normal at rest position thereof, shown in broken lines in Fig. 23, into the position thereof shown in full lines in Fig. 23 where these fingers respectively come to rest in engagement with the contact strips 63 and 64 and these contact fingers remain in such position until near the end of a cycle of operation of the machine, as described in detail hereinafter, the contact fingers 61 and 62 being shown in such advanced position in Fig. 26.

By referring to Fig. 26 it will be seen that a conductor 65 leads from the terminal 58 to the contact fingers 61 and 62. Thus when the contact finger 61 is in engagement with the contact strip 63, as shown in Fig. 26, circuit is closed from the line wire 51 through conductor 65, contact finger 61, conductor strip 63 and conductor 66 to terminal 67, wherefore circuit is closed to the pump motor 68 in the following manner: From terminal 67, through conductor 69, to the motor 68 and thence through conductor 70 to terminal 71 and then through conductor 72, terminal 73, conductor 50b and terminal 50a to line wire 50. Thus it will be seen that when a coin is passed through the machine, the motor 68 is set in operation whereby air pumps included in the machine are set in operation.

Thus by referring to Fig. 6 it will be seen that a pinion 74 is provided on the shaft 75 of the motor 68 and that this pinion meshes with a gear 76 fast on the shaft 77, Figs. 6 and 7, that is suitably journaled in the housing of the motor 68. The shaft 77 has a disc 78 mounted at the free end thereof and one end of a crank 79 is eccentrically connected to the disc 78 as indicated at 80. The other end of the crank 79 (see Figs. 6 and 7) is pivotally connected as indicated at 81 to a piston rod 82 which extends into oppositely disposed pump cylinders 83 and 84 fast to a bracket 85 mounted on a shelf 86, Fig. 4, carried by the casing 30. A conventional piston 87, Fig. 6, is provided at one end of the piston rod 82 and has a conventional leather valve 88 or the like thereon. It will be understood that, in the course of rotation of the disc 78, the crank 79 moves downwardly from the position in which it is shown in Figs. 6 and 7 and in so doing draws the piston 87 downwardly whereby air is drawn into the cylinder 83 of the pump P past the valve 88, air entering the cylinder 83 past the piston rod 82 and the orifice 89 in the present instance. Then as the crank 79 and piston rod 82 return to the position in which they are shown in Fig. 6, air is forced out through the outlet port 90 into the tube 91 past the conventional check valve, generally indicated by 92, which is operative to prevent air flow into the cylinder 83 during the movement of the piston 87 downwardly from the position in which it is shown in Fig. 6 in the course of reciprocation of the piston rod 82. A piston and valve arrangement similar to that included in the cylinder 83 is included in the cylinder 84 of the pump P′, which pump serves to force air into the air line 93 for a purpose explained hereinafter. It will be understood that the pistons in the cylinders 83 and 84 and their associated valves work in opposition, which is to say, air is being drawn into the cylinder 84 while it is being forced from the cylinder 83 and vice versa.

Air under pressure supplied by the pump P is utilized, in the present apparatus, in ascertaining the pulse, and to this end a bracket 94, Figs. 4, 9, 10 and 14, is secured to one side wall of the casing 30 interiorly thereof and in the present instance the lid 95 of a container 96 is carried by this bracket 94, the lid 95 being screw-threadedly attached to the container 96 whereby said container is supported from said bracket. The tube 91 leads from the pump P and is passed through the cover 95 into the container 96 which is preferably, at least, partially filled with a suitable liquid such as water. Air under pressure from the pump P is therefore supplied to the container 96 and the pressure thus built up in said container is effective to force the liquid therefrom through the tube 97 leading to the inlet 98 of a valve housing 99, Figs. 9, 10, 14 and 22.

By referring to Fig. 22 it will be seen that the valve housing 99 includes a main body 100 having a head 101 fast thereto. The inlet 98 leads to an inlet port 102 in the head 101. An outlet port 103 is also formed in the head 101 and an outlet 104 leads therefrom. A diaphragm 105 is clamped between the head 101 and the main body 100 and is medially acted upon by the head 106 on a pin 107, said head 106 being disposed in a chamber 108 formed in the main body 100 and the pin 107 being extended through this chamber and through a stem 109, that is screw-threaded into the end of the body 100 opposite that at which the diaphragm 105 is arranged. The opposite end of the stem 109 is fast in a bracket 110, secured to the casing 30, and the arrangement is such that the valve housing 99 is supported from the bracket 110 through the stem 109. A bellows casing 111 is carried by the bracket 110 on the side thereof opposite that from which the stem 109 projects and a corrugated sheet metal extendible expansion vessel or metallic bellows 112 is confined in the bellows housing 111, the open end of such bellows being disposed toward the bracket 110 and this end of this bellows is suitably secured to said bracket. The end of the pin 107 opposite that carrying the head 106 is suitably fast to the closed end of the bellows 112. The bellows housing 111 includes an inlet 113 and an outlet 114, a tube 115 interconnecting the outlet 104 and the inlet 113, a tube 116 being connected to the outlet 114.

Liquid under pressure from the container 96 flowing through the tube 97, inlet 98 and inlet port 102 is effective on the diaphragm 105 to unseat it from port-closing position in which it is shown in Fig. 22, and when the diaphragm is thus unseated liquid flows to the outlet port 103 and thence through the outlet 104, tube 115 and inlet 113 into the bellows housing 111 and then out through the outlet 114 and tube 116 to the inlet 117 of the bellows housing 118, Figs. 9, 12 and 14, in which a bellows 119, similar to the bellows 112, is confined. The bellows housing 118 is secured to and carried by a plate 120, Fig. 14, that is supported from the shelf 32 by a bracket 121, Fig. 4. The bellows housing 118, the bellows 119, the plate 120 and parts associated therewith will be described in further detail hereinafter. The bellows housing 118 includes an outlet 122 to which one end of a tube 123 is connected, and this tube is led through an opening 124, Figs. 14 and 16, that extends through the shelf 32 and the arm rest 35, and this tube is united with and opens into a bulb 125.

The strap or wrist band 38, Figs. 1, 3, 14 and 16, is so located along the extent of the arm rest 35 that when the palm of the left hand of a user of the apparatus is disposed in the formed portion 36, the band 38 will be in position to be passed over the dorsal aspect of the left wrist of such user. As best shown in Fig. 16, the portion of the band 38 adjacent one end thereof extends transversely across and is fast to the upper surface of that part of the arm rest 35 that is convex in cross section to receive the volar aspect of the left arm of a user of the apparatus. The bulb 125 is rested on the portion of the band 38 that extends transversely across and is secured to the arm rest 35. It will be understood that in assembling the apparatus the band 38 is first secured to the arm rest 35 and thereafter the bulb 125 is disposed therein, the tube 123 being passed through an opening in the band 38, aligned with the opening 124, and then through the opening 124, the free end of this tube then being connected to the outlet 122. The band 38 is of sufficient length to permit it to be conveniently passed over the dorsal aspect of the left arm of the user of the apparatus and that portion thereof adjacent the free end thereof is provided with a plurality of spaced openings as 126 through which the post 127, Fig. 16, may be selectively passed, whereby the volar aspect of the left wrist of a user may be clamped down tight on the bulb 125 when the band or strap 38 is tightened on the dorsal aspect of the wrist, the spacing of the openings as 126 being such as to enable wrists of different sizes to be so clamped.

The bulb 125 has a relief tube 128, Fig. 16, extended therefrom through an opening in the band 38 and an opening 129 in the arm rest 35 and the shelf 32. The tube 128 is of sufficient length to extend slightly below the inner surface of the shelf 32. A plug 130 is inserted into the free end of the tube 128, and this arrangement affords a pressure relief apparatus, described more fully hereinafter.

By referring to Fig. 5 it will be seen that a tube 131 leads from the tube 91 at a point between the check valve 92 and the end of said tube passed through the lid 95 of the container 96. The tube 131 leads to a relief valve 132 fast to the upper surface of the shelf 32 by a bracket 133. The purpose of this valve 132 is to prevent an excessive air pressure being built up in the container 96 by the action of the pump P, the relief valve 132 being set to permit the escape of air when predetermined pressure is built up in the tube 91 and connected parts.

When the apparatus is set in operation and the pump P operates to build up air pressure in the container 96 and the liquid in this container is resultingly forced through the tube 97 and inlet port 102, Fig. 22, to unseat the diaphragm 105, and then out through the outlet port 103, outlet 104, tube 115, inlet 113, housing 111, outlet 114, tube 116, thence through bellows housing 118, Fig. 12, and out through outlet 122 and tube 123, liquid under pressure flows into the bulb 125, Figs. 14 and 16. The first time liquid is so pumped through the just-described system the plug 130, Fig. 16, is removed from the end of the tube 128 and therefore air in the just-described system is exhausted therefrom so as to insure that in subsequent fillings of the bulb 125 an air pocket will not be formed. In such initial filling of the bulb 125 the plug 130 is reinstalled in the free end of the tube 128 as soon as liquid starts to flow therefrom. This insures that a hydraulic system is afforded so that when pressure incident to systolic effects is impressed on the bulb 125, the bellows 119 will be compressed, as will be explained more fully hereinafter.

Prior to the time liquid is pumped into the bulb 125 in an operation of the apparatus, the user thereof will have been seated on the seat 31 and the volar aspect of the left arm of a user will have been disposed in the arm rest 35 with the palm of the left hand rested in the formed portion 36, and the band 38 will have been arranged to have clamped the volar aspect of the left wrist against the bulb 125. Therefore, as fluid under pressure is forced into the bulb 125, this bulb expands against the volar aspect of the wrist. Preferably the bellows 112, Fig. 22, is so arranged that when liquid has been pumped into the bulb 125, Fig. 16, so as to expand the same and a pressure of approximately two and one-fourth pounds has been built up in this bellows, and in the tube 123, bellows housing 118 (Fig. 12), tube 116, bellows housing 111, tube 115, outlet 104 and outlet port 103, such pressure will be effective on the bellows 112 to collapse the same whereupon the pin 107 and the head 106 thereon are forced toward the diaphragm 105 which is thereupon seated over the inlet 102 to close the same, and this closes off that part of the system from the inlet 103 to the bulb 125.

The pump P will continue in operation but inasmuch as the inlet 102 into the valve housing 99 is closed by the diaphragm 105, the air pressure effective in the container 96 is prevented from forcing further liquid from this container, and as the pump P continues to operate air escapes through the relief valve 132, Fig. 5, this relief valve being set so that it will open under these conditions.

Furthermore, the tube 128 and the plug 130 afford an additional pressure relief device, for the plug 130 is so seated in the free end of the tube 128 that if a pressure of say greater than three and one-half pounds is built up in the bulb 125, then the plug 130 will unseat from the free end of the tube 128 and thereupon liquid forced into the bulb 125 may freely flow therefrom. This arrangement prevents an excessive pressure from being built up in the bulb 125 and applied on the volar aspect of a wrist retained thereagainst by the strap 38.

Once the system between the outlet 103, Fig. 22, and the bulb 125, Fig. 16, shown diagrammatically in Fig. 26, has been isolated by the seating of the diaphragm 105 over the outlet 103 by reason of the pressure impressed on the bellows 112, then the closed system thus afforded will be responsive to variations in pressure impressed on the bulb 125, and since this now expanded bulb will at this time be forced against the volar aspect of the wrist whereat the pulse in the radial artery in the left forearm of a user may be detected, each systolic effect in such artery will be effective on the hydraulic system afforded by seating of the diaphragm 105, in which hydraulic system the bellows 119 in the bellows housing 118 is included. Each systolic effect thus impressed on the system at the bulb 125 is effective through the aforesaid hydraulic system on the bellows 119, Fig. 12, in the bellows housing 118 to collapse the bellows 119. Furthermore, each diastolic effect in the aforesaid radial artery is effective to relieve the bulb 125, and therefore the aforesaid hydraulic system, of the pressure impressed thereon, which is effective to collapse the bellows 119, and as pressure is thus relieved in the system the bellows 119 expands. The result of this arrangement is that the bellows 119 is collapsed in response to each systolic effect in the aforesaid radial artery that is impressed on the bulb 125 and also that the bellows expands in response to each diastolic effect in the aforesaid artery to which the bulb 125 responds, and therefore the bellows 119 is directly responsive to the systolic and diastolic effects in the radial artery in the left arm of a user of the apparatus.

As has been explained hereinabove, the bellows housing 118, Fig. 12, is secured to one face of a plate 120. The plate 120 has an opening 134 therein through which one end of a pin 135 is extended, the opposite end of this pin being secured to the head of the bellows 119 interiorly thereof. The plate 120, bellows 119 and the pin 135 are part of a switch structure responsive to the aforesaid systolic and diastolic effects. As has been explained, the force and magnitude of systolic effects, and, resultingly, of diastolic effects, in the arteries, vary substantially from person to person, and it is therefore essential that any apparatus which is responsive to such effects must be such as to compensate for such differences in the force and magnitude of such effects. The arrangement afforded by the bellows 119 and the pin 135 connected thereto and the devices carried by the plate 120, which is of insulating material in the illustrated form of the invention, are of such nature, as will now be described.

Thus, a bar 136, Figs. 11 and 12, of conductive material is mounted on the face of the plate 120 opposite the face on which the bellows housing 118 is mounted and this bar 136 has an opening 137 therein of a diameter slightly greater than the diameter of the pin 135, said opening 137 being located in the bar 136 near one end thereof. This end of the bar 136 is inserted into a socket 138 formed in the clamp plate 139 of conductive material and which is secured to the same face of the plate 120 as that on which the bar 136 is mounted. The vertical extent of the socket 138, as viewed in Fig. 11, is slightly greater than the width of the bar 136 but preferably the socket 138 is so sized that the bar 136 is snugly embraced therein. The result of this arrangement is that the bar 136 is supported by the pin 135, a frictional engagement being thus established between the pin 135 and the bar 136.

Near the edge of the plate 120 opposite that along which the clamp plate 139 is arranged, a block 140 of insulating material is provided and a plate 141 of conductive material is disposed over the exposed face of this block, bolts as 142 being employed to secure both the plate 141 and the block 140 to the plate 120. The plate 141 projects above the upper edge of the block 140 and thus a space is afforded between this arm and the plate 120, the end of the bar 136 opposite that disposed in the socket 138 being arranged in the space. A contact point 143, Fig. 13, is provided on the plate 140 in position to be engaged by the bar 136 and another contact point 144 is provided on a screw 145 mounted in the plate 146 that is fast to the same side of the plate 120 as that on which the bellows housing 118 is secured, the screw 145 being arranged to extend through an opening 147 in the plate 120 whereby the contact points 143 and 144 are disposed on opposite sides of the bar 136.

The just described arrangement is such that the bar 136 is reciprocated to alternately engage the contact points 143 and 144 in response to the systolic and diastolic effects in the radial artery in the left arm of a user of the apparatus for, as explained hereinabove, the bellows 119 is responsive to such systolic and diastolic effects. As is also explained hereinabove, the force and magnitude of such systolic effects, and resultingly of such diastolic effects, vary substantially from person to person. However, the present arrangement is fully responsive to such effects irrespective of the force and magnitude thereof so long as the force and magnitude is sufficient to bring about the alternate collapse and expansion of the bellows 119. If such alternate collapses and expansions of the bellows are slight, the effect will nevertheless be sufficient to cause the bar 136 to alternately engage the contacts 143 and 144, for the spacing between the bar 136 and the respective contacts 143 and 144 is slight and therefore slight movement of the pin 135 will move the bar 136 from one contact to the other. On the other hand, if the alternate collapses and expansions of the bellows 119 are appreciable because such are brought about by systolic effects and, resultingly, diastolic effects, of relatively great force and magnitude, then as the bellows 119 collapses and the pin 135 moves downwardly, as viewed in Fig. 12, the bar 136 will move with the pin 135 during the initial part of such movement, but when this bar engages the contact 143 it will be arrested from further movement with the pin and thereafter the pin will move relatively to the bar. However, as soon as the pin 135 starts to move upwardly, as viewed in Fig. 12, upon expansion of the bellows 119, then by reason of the frictional engagement between the bar and the pin, the bar will move with the pin until it engages the contact 144 and after such engagement is established the pin 135 will again move relative to the bar 136. It will therefore be seen that the bar 136 moves incidental to the initiation of movement of the pin 135 in either direction and thereby alternately engages the contacts 143 and 144 in direct response to systolic and diastolic effects impressed upon the bulb 125 irrespective of the force and magnitude thereof. The bar 136 engages the contact 143 in response to systolic effects and engages the contact 144 in response to diastolic effects.

As best shown in Figs. 12, 13 and 26, a conductor 148 is electrically connected to the clamp plate 139 while a conductor 149 is electrically connected to the contact 144 and a conductor 150 is electrically connected to the contact 143. Thus in response to the reciprocation of the bar 136 circuit is alternately established from the conductor 148 to the conductors 150 and 149 and such alternate establishing of circuit to the conductors 149 and 150 is utilized to operate means, in the present form of the apparatus, which register the pulse in terms of beats per minute and the manner in which this is brought about will now be explained.

As described hereinabove, during the passage of a coin inserted through the coin slot 41, Fig. 3, through the coin-controlled switch 43, Fig. 4, to the coin box 49, the contacts 47 and 48, Figs. 4 and 26, are closed and thereupon the contact fingers 61 and 62 are advanced into engagement with the contact strips 63 and 64 and the result of this is that circuit from the line wire 51 is completed to the terminals 67 and 71, Fig. 26, so that power is available across the terminals 67 and 71.

A conductor 151 leads from the terminal 67 to a terminal 152 and a conductor 153 leads from the terminal 152 to a terminal 154 while a conductor 155 leads from terminal 154 to a terminal 156 and from this terminal a conductor 157 leads to a terminal 158, a conductor 159 leading from terminal 158 to the timing motor 160. A conductor 161 leads from motor 160 to a terminal 162 while a conductor 163 leads from terminal 162 to a terminal 164, from which a conductor 165 leads to a terminal 166, and a conductor 167 leads from terminal 166 to terminal 71. It will therefore be seen that when power is available at the terminals 67 and 71, as aforesaid, the timing motor 160 is set in operation and therefore this timing motor is set in operation at the same time as that at which the pump motor 68 is set in operation. The timing motor 160 operates, among other things, devices determinative of the time of operation of certain of the mechanisms included in the apparatus, as will be explained.

Thus by referring to Figs. 4, 17 and 21 it will be seen that the motor 160 is carried by a gear housing 168 which, in turn, is secured to a bracket 169 carried by the casing 30. A pinion 170, Fig. 21, is fast on a shaft 171 of the motor 160 and through the gear train, generally indicated by 172 and which is mounted in the housing 168, the shaft 173, journaled in the gear housing 168, is set in operation. The shaft 173 projects from the gear housing 168 through an opening 174, Fig. 17, in the bracket 169 and terminates in close proximity to the panel 34 at the front of the housing 33. A hub 175 having a flange 176 thereon is fast to the shaft 173 at the free end thereof and a disc 177, explained in further detail hereinafter, is rotatably mounted on the hub 175. A washer 178 of fibrous material is disposed between the flange 176 and the disc 177 and a spring 179 bears on the face of the disc 177 opposite that engaged by the washer 178, said spring 179 also bearing against an abutment washer 180 retained on the hub 175 by the screw 181 through the medium of which, in the present instance, the hub 175 is fast to the shaft 173. The effect of the spring 179 urging the disc 177 toward the washer 178 and the flange 176 is to establish a frictional interconnection between the shaft 173 and the disc 177 for a purpose that will be made apparent hereinafter.

A stationary circular plate 182 of insulating material is secured to the bracket 169 in spaced relation therewith, as can best be seen by reference to Fig. 17, and this plate has a discontinuous contact strip 183, Figs. 17, 20 and 26, mounted on the face thereof disposed away from the bracket 169, this contact strip 183, as is best shown in Fig. 20, being mounted on the plate 182 near and parallel with the periphery thereof. A continuous circular contact strip 184 is mounted on the plate 182 inwardly of the contact strip 183 and is arranged concentrically with respect to the shaft 173 as is the contact strip 183. A collar 185, Fig. 17, is fast on the shaft 173 adjacent the bracket 169, and a hub 186 of insulating material is rotatably mounted on the shaft 173 adjacent the collar 185, a washer 187 of fibrous material being interposed between the collar 185 and the hub 186. A spring 188 is disposed about the shaft 173 and extends between the inner end of the hub 175 and the adjacent end of the hub 186. The effect of this spring is to urge the hub 186 toward the washer 187 and the result of this is that a frictional interconnection between hub 186 and the shaft 173 is afforded for a purpose explained hereinafter.

A contact arm, generally indicated by 189, Figs. 17 and 20, of conductive material is fast to the hub 186 and includes a relatively short contact finger 190, the terminal portion of which is formed to ride on the circular and continuous contact strip 184. The somewhat longer contact finger 191 of the contact arm 189 extends in diametrical relation with the finger 190 thereof and the terminal portion thereof is formed to ride on the contact strip 183, this finger also being engageable with a contact 192 mounted in the disc 182 in spaced relation with what is the leading end of the contact strip 183, as will be explained presently, said contact being located in position to be engaged by the contact finger 191 when the arm 189 is in its normal at rest position. The arm 189 is retained in its at rest position by the spring-pressed latch, generally indicated by 193, pivotally mounted on a bracket 194, Figs. 17 and 20, carried by the bracket 169, a spring 195 acting on the latch 193 to urge it into the position in which it is shown in Fig. 20, in which position the stop finger 196 thereon, Fig. 17, engages the finger 191, said latch 193 being held in this position against the action of the spring 195 by engagement thereof with an edge of the recess 197 in the bracket 194. The finger 196 is made of insulating material since the finger 191 is an electrical conductor.

As will be explained more fully hereinafter, the disc 177 is advanced into a selected position in the course of each operation of the apparatus, such position always being other than what will be referred to herein as the zero position thereof, and the disc 177 remains in any such position into which it is advanced in a given operation of the machine until the succeeding operation of the machine when, as will be explained hereinafter, the latch effective on the disc is released and the disc thereupon starts to rotate with the shaft 173. In the course of such rotation of the disc 177, the pin 198 therein, Figs. 17, 18 and 20, which in the present instance is in the form of a machine screw, engages the depending arm 199 on the latch 193 and pivots this latch from the position in which it is shown in Fig. 20 into such position that the stop finger 196 is disengaged from the finger 191 and, when the finger 191 is freed from the stop finger 196, the contact arm 189 starts to rotate with the shaft 173, and in so doing the finger 191 moves from engagement with the contact 192 with which it is engaged so long as the arm 189 is in its normal at rest position, that is to say, so long as the finger 191 is engaged with the stop finger 196.

It is to be understood that, at the time the motors 68 and 160 are set in operation in the manner hereinabove explained, the finger 191 is resting on the contact 192, and by reason of this, when circuit is closed to the motors 68 and 160 subsequent to the engagement of the contacts 47 and 48, the following circuit is also established: From terminal 67, through conductor 151, terminal 152, conductor 153, to terminal 154, and thence through conductor 201 to one end of the winding of the electromagnet 200, and from the other end of this winding through conductor 202, to terminal 203, and thence through conductor 204 to contact 205 of relay 206, which contact will at this time be engaging contact 207 inasmuch as relay 206 at this time is deenergized. From contact 207 circuit is extended through conductor 208 to contact 192, and thence through the contact fingers 191 and 190 of contact arm 189 to the contact strip 184, and thence through conductor 209 to terminal 210, and through conductor 211, terminal 162, conductor 163, terminal 164, conductor 165, terminal 166, to terminal 71. Thus at the time the motors 68 and 160 are set in operation the electromagnet 200 is energized whereupon the armature 212 thereof is attracted with the effect now to be described.

By referring to Figs. 4, 17, 18 and 20 it will be seen that the electromagnet 200 is supported from the bracket 169 by a bracket 213 and that a standard 214, Figs. 18 and 20, extends upwardly from this bracket. The armature 212 of the electromagnet 200 is pivotally mounted on this standard, as indicated at 215, an extension 216 on the armature 212 extending beyond the pivotal mounting 215 and being acted on by a spring 217 extended between the extension 216 and an adjustable spring anchor 218 on the bracket 213, the spring 217 normally urging the armature 212 upwardly away from the core of the electromagnet 200.

As will be explained more fully hereinafter, a plurality of uniformly spaced apart notches as 219, Figs. 4, 17 and 18, are provided in the periphery of the disc 177. The armature 212 has an ear 220, Figs. 17, 18, 20 and 21, formed at the free end thereof which, under the influence of the spring 217, is urged toward the periphery of the disc 177 and which, therefore, seats in a notch 219 when a notch is aligned therewith. Seating of the ear 220 in a notch as 219 is effective to hold the disc 177 against rotation with the shaft 173 when the shaft is in operation.

As has been explained, circuit is closed to the motor 160 and to the electromagnet 200 simultaneously when the machine is initially set in operation and therefore when the motor 160 sets the shaft 173 in rotation, at the initiation of operation of the apparatus, the electromagnet 200 attracts the armature 212 whereupon the ear 220 is withdrawn from a notch 219 in which it has been seated and thereupon the disc 177 is free to rotate with the shaft 173. For a reason which will be explained more fully presently, at the initiation of an operation of the apparatus subsequent to the preceding operation thereof, the disc 177 is disposed in a position other than its zero position, wherefore the pin 198 will be out of engagement with the latch 193. However, as the disc rotates clockwise, as viewed in Fig. 18, when freed to rotate with the shaft 173, as just explained, the pin 198 eventually moves into position to engage the depending arm 199, Fig. 17, and thereupon the latch 193 is so operated that the stop finger 196 thereon is retracted from engagement with the finger 191 of the contact arm 189, and when this occurs the contact arm 189 is free to rotate with the shaft 173. As an incident to the initiation of such movement of the contact arm 189 with the shaft 173, the finger 191 is moved from engagement with the contact 192, and in so doing the above described energizing circuit to the electromagnet 200 is broken, whereupon the spring 217 is effective to urge the ear 220 on the armature 212 toward the periphery of the disc 177, and as a result of this the ear 220 seats in a notch 219 and interrupts rotation of the disc 177 with the shaft 173.

It has been explained that the disc 177 is in a position other than its zero position at the initiation of a cycle of operation of the apparatus subsequent to a preceding cycle of operation, and such position of the disc 177 will always be such that the disc 177 will rotate at least ninety degrees subsequent to the initial energization of the electromagnet 200 and the consequent initial retraction of the ear 220 from a notch 219. Furthermore, the gear train in the gear housing 168 and the speed of operation of the motor 160 are such that the shaft 173 rotates rather slowly as, for example, at a speed of approximately two revolutions per minute. By reason of this arrangement the time interval between the initial energization of the electromagnet 200 and the time when the finger 191 moves from engagement with the contact 192 in the manner above described, to thereby break the above described circuit to the electromagnet, is of sufficient duration so that the pump P will have been effective to build up pressure in the container 96 and to have forced sufficient liquid into the bulb 125 so that a sufficient pressure will have been built up to close off the inlet port 102, Fig. 22, and thereby isolate the hydraulic system between the outlet port 103 and the bulb 125. Furthermore, this time interval is such that by the time the contact finger 191 disengages the contact 192 the aforesaid closed system will be responsive to the systolic and diastolic effects in the radial artery leading past the volar aspect of the left wrist of a user of the apparatus, which at this time will be clamped against the bulb 125. Therefore, the bellows 119, Fig. 12, will by this time be undergoing the alternate compression and expansion hereinabove explained, wherefore the bar 136 will be alternately engaging the contacts 143 and 144. Engagement of the bar 136 with the contact 143 is effective, as will be explained presently, to close circuit through contacts as 221 and 222, Figs. 17, 18, 20 and 26, when such contacts are closed.

The contacts 221 and 222, Figs. 4, 18, 20, 21 and 26, are clamped between blocks 223 of insulating material carried by an arm 224 on the bracket 213, and these contacts are disposed upwardly and to one side of the armature 212. An ear 225 extends from the armature 212 in the direction opposite to the direction of the ear 220 and a block 226 of insulating material is mounted on this ear in position to engage the contact 222 which is mounted below the contact 221. This arrangement is such that when the electromagnet 200 is deenergized and the armature 212 is freed to the effect of the spring 217, the contact 222 is engaged with the contact 221 and thus each time the ear 220 is seated in a notch 219 the contacts 221 and 222 are engaged, but when the electromagnet 200 is energized or when the ear 220 is riding on the periphery of the disc 177 these contacts are separated.

When the bar 136 engages the contact 143 in response to the first systolic effect in the radial artery leading past the volar aspect of the wrist, which at this time is clamped against the bulb 125, and subsequent to the time the stop finger 196 is retracted from engagement with the contact finger 191, at which time the disc 177 is in its zero position (this having been the effect of the deenergization of the electromagnet 200 when the contact finger 191 disengaged the contact 192 subsequent to retraction of the stop finger 196 from stopping position) the contacts 221 and 222 are engaged and resultingly, when the contact finger 191 engages the leading end of the contact strip 183, while the bar 136 is so engaged with the contact 143, the following circuit is established:

From contact 67, Fig. 26, through conductor 151, terminal 152, conductor 153, terminal 154, conductor 155, terminal 156, conductor 157, terminal 158, conductor 227, terminal 228, conductor 148, contact plate 139, bar 136, contact 143, conductor 150, contact 222, contact 221, conductor 229, terminal 230, conductor 231 to one end of the winding of the relay 232 and from the other end of the winding of relay 232, through the conductor 233 to contact 234 of the relay 236, which contact at this time will be engaging contact 235 of relay 236, since this relay is deenergized at this time, and from contact 235, through conductor 237, terminal 238, conductor 239, terminal 164, conductor 165, terminal 166 and conductor 167 to terminal 71. Thus circuit is established through the winding of relay 232 whereupon this relay becomes energized and in so doing the contact 240 thereof is attracted into engagement with the contact 241 thereof, whereupon a stick or holding circuit for the relay 232 is established as follows:

From terminal 67, through conductor 151, terminal 152, conductor 242, terminal 262, conductor 354, contact 240, contact 241, conductor 243, terminal 230 and conductor 231 to one end of the winding of the relay 232 and from the other end of the winding of this relay through the circuit hereinabove traced to the terminal 71. By reason of the stick or holding circuit thus established, the relay 232 does not become deenergized when the electromagnet 200 is energized in the manner now to be explained.

The above described energization of the relay 232 in response to the aforesaid first systolic effect that brings about the first engagement of the bar 136 with the contact 143 engages the contact 244 thereof with the contact 245 thereof to thereupon close the following circuit:

From contact 67, through conductor 151, terminal 152, conductor 153, terminal 154, conductor 201 to one end of the winding of the electromagnet 200, and from the other end of the winding of this electromagnet, through the conductor 202, terminal 203, conductor 246, contact 245, contact 244 and conductor 247 to contact strip 183, which is now engaged by the contact finger 191, wherefore circuit is extended between the contact strips 183 and 184 through the contact finger 189, and the circuit is continued from conductor strip 184, through conductor 209, terminal 210, conductor 211, terminal 162, conductor 163, terminal 164, conductor 165, terminal 166, and conductor 167, to terminal 71, wherefore the electromagnet 200 becomes energized. It will therefore be seen that the electromagnet 200, as well as the relay 232, is energized in response to the engagement of the bar 136 with the contact 143 as a result of the aforesaid first systolic effect impressed upon the bulb 125 and therefore the bellows 119.

When the electromagnet 200 is energized as a result of the aforesaid engagement of the bar 136 with the contact 143, the armature 212 thereof is attracted whereupon the ear 220 is withdrawn from the notch 219 in which it has been seated and thereupon the disc 177 takes motion with the shaft 173. As an incident to such energization of the electromagnet 200, the contacts 221 and 222 are separated to break the circuit through which the aforesaid energization of the relay 232 was effected, but such separation of the contacts 221 and 222 does not result in deenergization of the relay 232 for by this time the above-traced stick or holding circuit for this relay, through the contacts 234 and 235 of this relay 236, is established, and since the relay 232 is thus maintained energized the contact 244 thereof is held in engagement with the contact 245 thereof whereby the last traced circuit to the electromagnet 200 is maintained. The relay 232 therefore remains energized, as does the electromagnet 200, and the ear 220 is maintained in retracted position and the contacts 221 and 222 remain separated.

The bar 136 moves with the pin 135 as an incident to the initiation of movement of this pin in either direction in response to either the effect of a systolic or diastolic effect on the bellows 119, it being this that renders the apparatus responsive to the effects of systoles and diastoles in the radial artery without regard to the force and magnitude of such effects. Hence, since a diastolic effect in the radial artery leading past the volar aspect of the wrist with which the bulb 125 is now engaged follows the systolic effect which resulted in engagement of the bar 136 with the contact 143, and irrespective of whether such diastolic effect is a true diastolic effect or one in the nature of a diastolic effect, such as may accrue during the dicrotic phase of a pulse beat as an incident to the flow of blood back through the semilunar valves in the aorta while such valves are closing, the pin 135 starts to move upwardly, as viewed in Fig 12, for the bellows 119 expands in response to a diastolic effect following a systolic effect that results in engagement of the bar 136 with the contact 143 to effect energization of the relay 232. Hence as the bellows 119 so expands and as the pin 135 moves as aforesaid the bar 136 is withdrawn from engagement with the contact 143 and moved into engagement with the contact 144 and thereupon the following circuit is established:

From contact 67, through conductor 151, terminal 152, conductor 153, terminal 154, conductor 155, terminal 156, conductor 157, terminal 158, conductor 227, terminal 228, conductor 148, contact plate 139, bar 136, contact 144, conductor 149 to one end of the winding of relay 236 and from the other end of the winding of the relay 236 through conductor 236', terminal 238, conductor 239, terminal 164, conductor 165, terminal 166 and conductor 167 to terminal 71. Thus an energizing circuit is established for the relay 236 which thereupon becomes energized and retracts the contact 235 thereof from engagement with the contact 234 thereof whereupon the stick or holding circuit now effective on the relay 232 is broken and, resultingly, this relay 232 becomes deenergized whereupon the contact 244 thereof disengages the contact 245 thereof. Thus, circuit to the electromagnet 200 is broken and consequently the armature 212 thereof is freed to the effect of the spring 217 with the result that the ear 220 is urged into engagement with that portion of the periphery of the disc 177 intermediate the notch 219 in which the ear 220 has been seated and the next succeeding notch 219 in the direction of rotation of the disc 177. Such engagement of the ear 220 with the periphery of the disc 177 maintains the contacts 221 and 222 separated for these contacts are not engaged unless and until the ear 220 is seated in a notch 219. Therefore the above described energizing circuit from the bar 136 and contact 143 for the relay 232 remains open at the contacts 221 and 222.

As has been explained, there may be an effect in the arteries in the nature of a systolic effect as an incident to the closing of the semilunar valves in the aorta, and such effect in the nature of a systolic effect may be impressed upon the bellows 119 subsequent to the expansion thereof in response to a diastolic effect in the arteries subsequent to a systolic effect which brings about engagement of the bar 136 with the contact 143 and the resultant energization of the relay 232. However, if such an effect in the nature of a systolic effect is impressed on the bellows 119 subsequent to an expansion of the bellows 119 which results in engagement of the bar 136 with the contact 144 and energization of the relay 236, circuit is not again closed to the relay 22 by the resulting engagement of the bar 136 with the contact 143 if the ear 220 is in engagement with the periphery of the disc 177, which will be the circumstance when expansion of the bellows 119 accrues by reason of an effect in the nature of a systolic effect that arises in the dicrotic phase of a pulse beat, the aforesaid effect in the nature of a diastolic effect also being an attribute of such dicrotic phase of the pulse beat. Such engagement of the bar 136 with the contact 143 is ineffective to cause energization of the relay 232 for the reason that the contacts 221 and 222 are separated so long as the ear 220 is not seated in a notch 219. However, the ear 220 will seat in the succeeding notch 219 and engage the contacts 221 and 222 prior to the time the effect of a true systolic effect is again impressed on the bellows 119.

Thus it will be seen that it is important that the ear 220 be held against seating in a notch 219 for a predetermined period of time and the duration of such period of time is determined by the spacing of the notches 219 about the periphery of the disc 177 and the speed of rotation of said disc. The duration of such period of time is more or less arbitrarily selected but is a corollary of the maximum number of heart beats per minute it is desired to count, for if the energizing circuit to the relay 232, and resultingly to the electromagnet 200, is held open for a longer period of time than that which will elapse between the peaks of systolic effects occuring at a particular frequency, then there will be instances where a true systolic effect will not cause the desired and intended energization of the relay 232 and the resultant energization of the electromagnet 200 and retraction of the ear 220 from a notch 219 to enable the disc 177 to take motion.

Therefore we have elected, in the illustrated form of the apparatus, to count only those true systolic effects in the artery which occur at frequencies of one hundred and five per minute or less and to this end we have so correlated the speed of the disc 177 and the spacing between the notches 219 about the periphery of said disc that about 0.571 second will intervene intermediate the retraction of the ear 220 from a notch 219 and the seating of said ear in the succeeding notch 219. It will be understood that spacing of the notches 219 and the speed of the disc 177 may well be other than to afford a time interval of about 0.571 second, this being a matter of choice and being dependent upon the highest frequency it is desired to count, the frequency of one hundred and five per minute that we have selected being merely arbitrary, as we have stated, and being suited to the present contemplated usages of the machine.

From what has been described thus far it will be seen that when the apparatus is initially set in operation the electromagnet 200 is energized and the armature 212 thereof is attracted whereupon the ear 220 is withdrawn from the notch 219 in which it has been seated and thereupon the disc 177 starts to rotate with the shaft 173 toward its zero position and, as explained hereinabove, this will entail rotation of the disc 177 through at least ninety degrees.

Prior to the time the machine is so set in operation the volar aspect of the wrist of the user will have been clamped against the bulb 125 and during the time interval afforded by the aforesaid rotation of the disc 177 toward its zero position, the pump P is effective to force liquid into the bulb 125 and thereby establish the hereinabove described closed hydraulic system so that by the time the disc 177 attains its zero position pulsations in response to systolic and diastolic effects, in the radial artery leading past the volar aspect of the wrist firmly held in engagement with the bulb 125, will be effective on the bellows 119 to bring about reciprocations of the pin 135.

Moreover, as an incident to the passing of the disc 177 to zero position the contact finger 191 of the contact arm 189 moves from engagement with the contact 192 and thereupon the initial energizing circuit to the electromagnet 200 is broken. The resulting deenergization of this electromagnet frees the armature 212 thereof to the effect of the spring 217 which causes the ear 220 to seat in the next notch 219 to move into association therewith, and the apparatus is so timed and arranged that such notch will be the one which will cause the disc 177 to be stopped in its zero position.

The contact arm 189 is at this time rotating with the shaft 173 and subsequent to the time contact finger 191 thereof disengages the contact 192 it moves into engagement with the contact strip 183, and it is during the time interval entailed in the movement of the contact finger 191 from the contact 192 to the contact strip 183 that the disc 177 is brought to rest in its zero position that is to say, with the pointer 252 opposite its zero position as viewed in Fig. 18 or 26.

The first systolic effect, in the radial artery leading past the volar aspect of the wrist held against the bulb 125, subsequent to the engagement of the contact finger 191 with the contact strip 183, compresses the bellows 119 wherefore the pin 135 moves the bar 136 into engagement with the contact 143 and thereupon the above described energizing circuit through the bar 136, contact 143 and contacts 221 and 222 is established, whereupon the relay 232 is energized to engage its contacts 244 and 245 whereby energization of the electromagnet 200 is effected. Such energization of the electromagnet 200 retracts the ear 220 on the armature 212 thereof from the notch 219 in the disc 177 in which it has been seated, and this frees the disc 177 to rotation with the shaft 173. Thereupon the disc rotates in an amount equal to the spacing between the notches 219, the ear 220 seating in the notch next succeeding the notch which positioned the disc 177 in its zero position as a result of such first energization of the electromagnet 200 effected by the aforesaid first engagement of the bar 136 with the contact 143.

As an incident to the energization of the electromagnet 200 and the retraction of the armature 212 thereof in the just described manner, the energizing circuit to the relay 232 through the contacts 221 and 222 is broken, but this relay remains energized through the stick or holding circuit therefor including the contacts 234 and 235 of the relay 236.

However, in response to the first diastolic effect subsequent to the systolic effect that resulted in the aforesaid engagement of the bar 136 with the contact 143 to bring about energization of the relay 232, the bar 136 is moved into engagement with the contact 144 and thereupon an energizing circuit to the relay 236 is established, and as such relay becomes energized, the contact 235 thereof is disengaged from the contact 234 thereof whereupon the stick circuit for the relay 232 is opened. Such opening of the stick circuit for the relay 232 results in deenergization thereof with the consequent separation of the contact 244 thereof from the contact 245 thereof, and this breaks the circuit to the electromagnet 200 which thereupon becomes deenergized and frees the armature 212 thereof to the effect of the spring 217 whereupon the ear 220 is urged into engagement with that portion of the periphery of the disc 177 between the notch in which the ear seated to arrest the disc 177 in its zero position and the next succeeding notch in the direction of rotation of said disc.

The disc 177 continues rotation and after the elapse of a predetermined period of time, about 0.571 second in the present instance, from the time the ear 220 was withdrawn from the notch 219 in which it was seated, said ear seats in the aforesaid next succeeding notch and stops rotation of the disc 177 with the shaft 173 and thereupon the contacts 221 and 222 are reengaged. The first systolic effect following such closing of the contacts 221 and 222 will be effective to again energize the relay 232 to again energize the electromagnet 200 whereupon the disc 177 may again take motion with the shaft 173 to again advance in an amount equal to the spacing between the succeeding notches 219. Also again in response to a diastolic effect immediately following the systolic effect, which results in the last-mentioned reenergization of the relay 232, and resultingly of the electromagnet 200, the relay 236 is energized which, as explained, results in deenergization of the relay 232 and the electromagnet 200. Such deenergization of the electromagnet 200 frees the armature 212 thereof to the effect of the spring 217 wherefore the ear 220 is urged into engagement with the periphery of the disc 177 and it will consequently seat in the succeeding notch 219 when such notch moves into alignment with said ear. Even though effects in the nature of systolic effects are impressed on the bellows 119 during the time the disc 177 is advancing, there is no energization of the relay 232 and consequently of the electromagnet 200. Thus in response to only true systolic effects in the radial artery leading past the volar aspect of the wrist engaged with the bulb 125, the disc 177 is advanced in a step by step manner.

In the present apparatus such step by step advancing of the disc 177 continues for a predetermined period of time governed by the length of the contact strip 183 and the speed of movement of the contact finger 191 thereover. The contact strip 183 is discontinuous and it should be noted that during the aforesaid step by step advance of the disc 177, the contact finger 191 of the contact arm 189 is riding on the contact strip 183 to establish a circuit through which the electromagnet 200 is energized upon energization of the relay 232. Thus when the contact finger 191 rides off of the end of the contact strip 183 remote from the end of such strip first engaged thereby, further energizations of the electromagnet 200, in response to systolic effects, as above described, is interrupted.

However, during the time the contact finger 191 is riding along the contact strip 183, the disc 177 is advanced one step in response to each true systolic effect impressed on the bulb 125 and consequently the bellows 119. Thus the number of steps advanced by the disc 177 will be equal to the number of true systolic effects sensed in a given period of time predicated upon the speed of rotation of the shaft 173, with which the contact finger 191 moves, and the length of the contact strip 183 or, in other words, the length of time the finger 191 remains in engagement with the contact strip 183.

In the present instance the contact finger 191 remains in engagement with the contact strip 183 for a period of twenty seconds or one-third of a minute. Thus, since the disc 177 is advanced a step in response to each sensed true systolic effect, it will be seen that in this instance where such advancing is carried out for a period of twenty seconds, the degree of advancement of the disc 177 will correspond to the number of true systolic effects sensed in one-third of a minute.

Therefore by providing suitable indicating means on the disc 177 and by associating a scale with such indicating means, the degree of advancement of the disc 177 in such time interval may be registered on such scale, it being understood of course that any such indicating means provided on the disc 177 would be located to register with zero position on the scale when the disc 177 is stopped in its zero position as aforesaid.

By associating suitable indicia with the aforesaid scale, the degree of advancement of the disc 177 may be ascertained by comparing the location of the aforesaid indicating means on the disc 177 with respect to the scale and indicia associated therewith. Any such indicia associated with such a scale should, in the present instance, be in multiples of three so that the frequency of sensed systolic effects may be expressed in terms of a minute since, as explained above, in the illustrated apparatus the advancing of the disc 177 is carried out only for one-third of a minute.

Thus, a scale 251 of the aforesaid character is etched or otherwise provided on the glass panel 34, Fig. 1, which, in the illustrated form of the apparatus, is rendered translucent by being silvered or being otherwise arranged to afford a mirror, but it will be understood that resort might be had to other ways of rendering this panel translucent or it might be otherwise arranged without departing from the purview of our invention. That portion of the panel 34 forwardly of the flange 176 and aligned with that portion of the face of the disc 177 immediately inwardly of the bottoms of the notches 219 has omitted therefrom whatever arrangement is utilized to render the panel 34 translucent so that, in effect, a circular sight opening as 250 is afforded in association with the scale 251, the indicating means on the disc 177 to which reference has been made hereinabove being afforded, in the present instance, by a pointer 252 positioned on the disc 177 to be visible through the opening 250 and which therefore is located to cooperate with the scale 251. It will of course be understood that resort might be had to other arrangements for registering the degree of advancement of the disc 177 and furthermore, as will be explained more fully hereinafter, suitable recording means may be provided to afford a record of the degree of advancement of the disc 177.

Thus it will be seen that in the present instance the disc 177 is advanced for a predetermined time from a zero position thereof into an advanced position in an amount dependent upon the number of systolic effects sensed in the radial artery leading past the volar aspect of a wrist engaged with the bulb 125, and thus since the number of such true systolic effects in such given period of time may be so ascertained, the pulse of a user of the apparatus is ascertained.

Once the disc 177 has been advanced in the above described manner into a position such as that which represents the pulse in terms of heart beats per minute, our apparatus is then rendered operative, in the present form, to register the systolic blood pressure and this is initiated by the advance of the contact finger 191 into engagement with the contact 254, Figs. 20 and 26, in the plate 182, shortly after it passes from the aforesaid remote end of the contact strip 183 and the apparatus which is thus rendered effective will now be described.

Upon engagement of the contact finger 191 with the contact 254, circuit is closed from contact 67, through conductor 151, terminal 152, conductor 153, terminal 154, conductor 155, terminal 156, and conductor 255 to one end of the winding of the electromagnet 256, and from the other end of this winding through conductor 257 to terminal 258 and thence through conductor 259, terminal 260, conductor 261, contact 254, contact arm 189, contact strip 184, conductor 209, terminal 210, conductor 211, terminal 162, conductor 163, terminal 164, conductor 165, terminal 166, conductor 167 to terminal 71. Thereupon the electromagnet 256 is energized with an effect that will be described presently.

The engagement of contact arm 191 with conductor 254 establishes still another circuit as follows: From terminal 67, conductor 151, terminal 152, conductor 242, terminal 262, conductor 263 to one end of the winding of the relay 206 and through conductor 264, that leads from the other end of the winding of this relay, to terminal 265 and through conductor 266, terminal 260, conductor 261, contact 254, contact arm 189, conductor strip 184, conductor 209, terminal 210, conductor 211, terminal 162, conductor 163, terminal 164, conductor 165, terminal 166 and conductor 167 to terminal 71, and thereupon the relay 206 is energized.

Energization of the relay 206 engages the contact 267 thereof with the contact 268 thereof whereby the following stick or holding circuit for this relay 206 is established: From terminal 67, through conductor 151, terminal 152, conductor 242, terminal 262, conductor 263, winding of relay 206, conductor 264, terminal 265, conductor 269, contact 268, contact 267, conductor 270, terminal 166 and conductor 167 to terminal 71. The holding circuit for the relay 206 thus established is maintained until the end of an operation of the apparatus, as will be explained, for the relay 206 is energized and maintained energized through the operation in which the systolic blood pressure of a user of the apparatus is determined, such operation therefore, in effect, proceeding under control of the relay 206.

Among the effects of energization of the relay 206 is the establishment of a holding circuit for the relay 256, the need for which is explained presently. The stick circuit for the relay or electromagnet 256 which is thus established is as follows: From terminal 156, to which circuit is established from line wire 51 in the manner hereinabove traced, through conductor 255, winding of relay 256, conductor 257, terminal 258, conductor 259, terminal 260, conductor 266, terminal 265, conductor 269, contact 268, now engaged by contact 267 since relay 206 is now energized, and from contact 267 through conductor 270, terminal 166, and conductor 167 to terminal 71, circuit is established to line wire 50 in the manner hereinabove traced. Thus the relay 256 is held energized throughout the operation of ascertaining the blood pressure with the result of rendering the pump P' effective, as will now be explained.

The pump motor 68, which is set in operation at the initiation of an operation of the apparatus, as hereinabove described, has been and is still operating at the time the electromagnet 256 and relay 206 are energized, in the manner and at the time just explained, and is therefore effective to pump air through the outlet 93 of the pump P' past the check valve 271, Figs. 4, 5 and 26, and thence through the tube 272 which leads to the inlet of the T-fitting 273, Fig. 5. A tube 274 leads from one outlet of the T-fitting 273 to a safety or relief valve 275 secured to the shelf 32 adjacent the safety or relief valve 132.

Another tube 276 leads from the other outlet of the T-fitting 273 to a T-fitting 277 which has a valve or outlet opening 278 at the end of one of the branches thereof. A valve member 279 on the armature 280 of the electromagnet or relay 256 is adapted to seat over the outlet opening 278 to close the same upon energization of the relay 256 which, as explained hereinabove, is brought about as an incident to the engagement of the contact finger 191 with the contact 254 and which is thereafter maintained energized, until the end of a cycle of operation, through the holding circuit hereinabove traced whereby the valve member 279 is retained in closing relation with the opening 278.

As best shown in Fig. 5, the armature 280 is mounted on an arm 281 and a spring 282 is effective on one end thereof to hold the valve member 279 from closing position with respect to the opening 278 so long as the relay 256 is deenergized, but upon energization of the relay 256 the valve member 279 seats over and closes the opening 278 and thereupon the escape of air pumped by the pump P' through the opening 278 is prevented and which, until the relay 256 is energized, takes place, this being effective to keep certain of the devices entailed in ascertaining the systolic blood pressure inoperative until the operation in which such pressure is to be ascertained is to proceed.

Closing of the opening 278 by the just described seating of the valve member 279 thereover has the effect of causing air under pressure supplied by the pump P' to the fitting 277 to flow out through the tube 283, Fig. 5, that leads from another outlet of the T-fitting 277 to the inlet 284 of a bellows housing 285 that corresponds to the bellows housing 111, Fig. 22. In this connection, however, it is to be noted that the inlet 284 is similar to the outlet 114 of the bellows housing 111 for in this instance air is first pumped into the bellows housing 285 and then into the valve housing 286 rather than first into the valve housing, and then into the bellows housing, as in the case of the bellows housing 111 and valve housing 99.

A tube 287, that corresponds to the tube 115 leads from an outlet from the bellows housing 285, that corresponds to the inlet 113 of the bellows housing 111, to an inlet that corresponds to the outlet 104 of the valve housing 99, this inlet to the valve housing 286 leading to an inlet port in the valve housing 286 that corresponds to the outlet port 103, this inlet being closable by a diaphragm 289 that corresponds to the diaphragm 105. An outlet port is provided in the valve housing 286 and corresponds to the inlet port 102, and this outlet port, which is also closable by the diaphragm 289, leads to an outlet that corresponds to the inlet 98, and a tube 290 is connected to the outlet from the valve housing 286 that corresponds to the inlet 98 of the valve housing 99.

Thus, once the opening 278 is closed, the pump P' is effective to force air through the outlet 93 past the check valve 271 and through the tube 272, T-fitting 273, tube 276, T-fitting 277, tube 283, bellows housing 285, tube 287 and thence through the tube 290 to the T-fitting 291 which includes an elongated branch, as best shown in Figs. 5 and 14.

As has been explained hereinabove, the left arm of a user of the apparatus is rested on the arm rest 35 prior to the time the machine is set in operation as by inserting a coin into the coin slot 41 and, as has also been explained hereinabove, an opening 126 in the wrist band 38 has the pin 127 passed therethrough prior to the time the machine is set in operation to thereby firmly retain the volar aspect of the left wrist of a user of the apparatus in engagement with the bulb 125 which, as explained hereinabove, is thereby engaged with that part of the wrist whereat the pulse may be detected.

The arm band 39, Figs. 3, 14 and 15, is disposed along the arm rest 35 in such position that it may be passed over the dorsal aspect of the left forearm of a user of the apparatus between the user's wrist and elbow. This arm band 39 has a series of openings 292, Fig. 15, therein, which may selectively have the pin 293 passed therethrough so that the volar aspect of the left forearm of a user of the apparatus may be clamped against the bulb 294. By referring to Figs. 15 and 16 it will be seen that the arm band 39 is secured to the arm rest 35 similarly to the manner in which the wrist band 38 is secured thereto, and thus the band 39 is disposed between the bulb 294 and the upper convex surface of arm rest 35. A tube 295, Figs. 14 and 15, leads from the bulb 294 through an opening in the band 39 and an aligned opening 296 in the arm rest 35 and shelf 32 to the free end of the elongated outlet of the T-fitting 291. Thus when air under pressure is supplied to the T-fitting 291, in the manner above described, it flows through the tube 295 into the bulb 294, which thereupon expands against the volar aspect of the left arm of the user of the apparatus with an effect presently to be described.

A branch 297, Figs. 5 and 26, leads from the T-fitting 291 and a tube 298 leads from this branch to the linet 380 of a valve housing 299 that is described more fully hereinafter. A tube 300, Figs. 4 and 5, leads from the outlet 381 of the valve housing 299 to the reservoir 301, Fig. 4, of a manometer, generally indicated by 302, that is secured to a bracket 302a carried by a cross member of the housing 33. It will be understood that the tube 300 might be led to any suitable pressure registering or indicating device but since a manometer is customarily employed for registering the systolic blood pressure it is expedient to lead the tube 300 to the reservoir of such a device.

In so far as the valve housing 299 is concerned, the diaphragm 382 therein, Fig. 5, is unseated from the inlet and outlet ports 383 and 384, respectively, in the valve housing and to and from which the inlet 380 and the outlet 381 respectively lead, when the operation of ascertaining the systolic blood pressure is to proceed whereby free communication is established between the tubes 298 and 300. Thus when air under pressure is supplied to the T-fitting, as above described, it flows through the branch 297, tube 298, inlet 380, port 383 and out through port 384, outlet 381 and tube 300 to the reservoir 301 where, in the present instance, it is effective on a supply of mercury stored in this reservoir to force the mercury upwardly in the vertically extending tube 303, Fig. 4, of the manometer 302.

In the present instance air is so supplied to the reservoir 301 until a column of mercury of approximately two hundred millimeters is established in the tube 302 and, when the air pressure established by the pump P' is sufficient to establish such column of mercury of approximately two hundred millimeters in the tube 303, such pressure is effective on the bellows 285a, Fig. 26, in the bellows housing 285 to cause the diaphragm 289, Figs. 5 and 26, to be so seated that communication is closed off between the tubes 287 and 290 and thereby a closed system is established that includes the T-fitting 291 and the portions of the apparatus connected thereto, the pressure in such closed system being directly proportionate to the height of the mercury column in the tube 303 of the manometer 302. After the air pressure is sufficient to act on the bellows 285a with the effect just described, further operation of the pump P' will tend to build up additional pressure effective on this bellows 285a, but under such circumstances the relief valve 275, Figs. 5 and 26, becomes effective to enable a predetermined pressure to be maintained on the bellows 285a so as to insure that communication between the tubes 287 and 290 is maintained closed off and thereby insure that pressure maintained in the closed system including the T-fitting 291 will be solely dependent upon the height of the mercury in the tube 303.

The bulb 294 is included in the closed system which includes the T-fitting 291 and therefore the pressure established in the bulb 294 is responsive to the height of the mercury column in the tube 303. The pressure incident to the building up of a mercury column of approximately two hundred millimeters in the tube 303 is sufficient to collapse the radial artery leading past the volar aspect of the arm retained in engagement with the bulb 294 by the strap 39 at the time pressure is established in the foregoing manner in such bulb.

Thus, subsequent to the engagement of the contact finger 191 with the contact 254, pressure is built up in the bulb 294 in response to the height of a mercury column established in the tube 303 of the manometer 302, and such pressure is sufficient to collapse the radial artery leading past the volar aspect of the arm against which the bulb 294 is applied. Subsequent to the time the contact finger 191 engaged the contact 254 and until sufficient pressure is established in the bulb 294 to effect collapse of the radial artery as aforesaid, systolic and diastolic effects in this artery sensed by the bulb 125 will have been effective to have caused energization and deenergization of the relays 232 and 236 but without effect in so far as the ascertainment of the systolic blood pressure is concerned, for reasons that will be explained presently, and also without effect on the position of the disc 177, for circuit to the electromagnet 200 will by this time be broken because of the disengagement of the contact finger 191 from the contact strip 183, as above described.

In this connection it is to be noted that the disc 177 remains in the position into which it has been advanced in the manner above described until the initiation of a succeeding cycle of operation of the apparatus, for the electromagnet 200 is not again energized, after the contact finger 191 rides off of the contact strip 183, until a new cycle of operation is instituted, at which time the electromagnet 200 is energized through the initial energizing circuit therefor, established through the contact 192, in the manner hereinabove described.

When in the manner above explained, sufficient pressure is built up in the bulb 294 to collapse the radial artery, the flow of blood past the volar aspect of the wrist of a user of the apparatus is interrupted and therefore the effect of systoles and diastoles is no longer perceptible at the volar aspect of the wrist. This condition prevails until the flow of blood through the radial artery past the volar aspect of the wrist engaged with the bulb 125 is resumed, and this does not occur until the pressure in the bulb 294 has been reduced to be equal to the systolic blood pressure in the radial artery for, when the pressure in the bulb 294 is equal to the systolic blood pressure in the radial artery, then, by reason of such pressure and the tendency of such artery to expand, flow of blood through the radial artery past the volar aspect of the wrist is resumed and, as will be explained hereinafter, when the resumption of flow of blood past the volar aspect of the wrist is sensed, the gradual reduction of pressure in the bulb 294 is interrupted.

The advance of the contact finger 191 from engagement with the contact strip 183 into engagement with the contact 254 is such that this finger remains in engagement with this contact for a period of time sufficient to insure energization of the relay 206, for as soon as the relay 206 is energized the holding circuit therefor, hereinabove described, is established. Thus shortly after the energization of the relay 206 the contact finger 191 advances from engagement with the contact 254 and continues its movement toward the normal at rest position thereof in engagement with the stop finger 196, Figs. 17 and 20, which stop finger is returned to stopping position under the influence of the spring 195 as soon as the pin 198, Figs. 17 and 18, moves from engagement with the depending arm 199 on the latch 193 in the course of advance of the disc 177 in the manner hereinabove explained, such return of the stop finger 196 to stopping position being effected long prior to the time the contact finger 191 moves from engagement with the contact strip 183.

Thus, subsequent to the time the contact finger 191 disengages the contact finger 254 and well prior to the end of an operation of the machine, the stop finger 191 will return to its normal at rest position in engagement with the contact 192, but such engagement of this contact finger with the contact 192 is without effect on the electromagnet 200 until the initiation of a new cycle of operation of the machine for the reason that the circuit established to this electromagnet by the engagement of the contact finger 191 with the contact 192 is opened so long as the relay 206 is energized, energization of the relay 206 separating the contact 207 from the contact 205 and thereby breaking the energizing circuit for the electromagnet 200 established through the contact finger 191 and contact 192. As will be explained presently, the contact 207 is so held from engagement with the contact 205 until deenergization of the relay 206 at the end of a cycle of operation of the machine.

As has been explained, it is the effect in the bulb 294 of the pressure of the two hundred millimeters of mercury established in the tube 303 of the manometer 302 that collapses the radial artery in the left forearm of a user of the apparatus that is at this time engaged with the bulb 294. However, when the pressure thus established in the bulb 294 is so reduced that blood can again flow through the radial artery, such resumption of the flow will be in the nature of a systolic effect in the artery and it will therefore be effective on the bulb 125 to effect collapsing of the bellows 119 to thereby effect energization of the relay 232 with an effect that will be described presently.

Pressure in the bulb 294 is preferably reduced in a step by step manner in predetermined amounts at intervals of a predetermined time length. The present arrangement is such that pressure is so reduced in the above described closed system, including the T-fitting 291, through the tube 304, Figs. 4, 5, 6 and 26, and the mechanisms associated with the valve housing 307 as will now be described.

The valve housing 307, Figs. 4, 5, 6, 7 and 8, includes a main body 308 and a head 309 between which a diaphragm 310 is clamped. The inlet port 306, Fig. 6, and an outlet port 311 are provided in the head 309 and communication therebetween is interrupted by seating of the diaphragm 310 in closing position, in a manner explained presently.

An outlet 312, Figs. 5, 6 and 8, leads from the outlet port 311 to one end of a tube 313, which, in turn, leads into the inlet 314, Fig. 5, of a valve housing 315. A normally closed valve including a stem 316, which projects from the valve housing 315, is provided at the free end of the valve housing 315. The capacity of the outlet port 311, outlet 312, tube 313, inlet 314 and valve housing 315 is predetermined and may be, for example, such as to receive sufficient air from the aforesaid closed system including the T-fitting 291 so that when this volume of air is permitted to escape, the column of mercury in the tube 303 of the manometer 302 will be reduced approximately two millimeters. Air is admitted into this system of predetermined capacity from the aforesaid closed system including the T-fitting 291 in the following manner:

A rocker 317, Fig. 6, has one end thereof pivotally mounted, as indicated at 318, on the bracket 85 and a crank 319 is pivotally connected, as indicated at 320, to the other end of this rocker, the crank 319 being eccentrically connected to the disc 78, as indicated at 80, and in the present instance along with the crank 79. The valve housing 307 is carried by a bracket 321 from the bracket 85 and a screw plug 322 passes through this bracket and the adjacent end of the body 308 of the valve housing 307. A plunger 323 passes through the screw plug 322 into the chamber 324 and the head 325 thereon is urged toward the diaphragm 310 by a spring 326 extended between the head 325 and the inner end of the screw plug 322. A pin 327 is provided on the outwardly disposed end of the plunger 323 to lie in the path of travel of the rocker 317 in the course of reciprocation of the rocker, induced by rotation of the disc 78. Upon engagement of the rocker 317 with the pin 327, as the rocker moves to the right from the position in which it is shown in Fig. 6, the head 325 is retracted, against the effect of the spring 326, away from the diaphragm 310 whereupon air under pressure from the tube 304, which, as explained, is part of the closed system including the T-fitting 291, flows through the inlet 305, inlet port 306, to outlet port 311, and thence into the closed system of predetermined capacity of which the outlet port 311 is a part. Upon movement of the rocker 317 back into the position in which it is shown in Fig. 6, the spring 326 reseats the diaphragm 310 in port-closing position. Thus, as the rocker 317 reciprocates, air is admitted into the system of predetermined capacity until the pressure therein equals that in the tube 304, and therefore the closed system of which the T-fitting is a part. Air is discharged from the aforesaid system of predetermined capacity at a time when the diaphragm 310 is in port-closing position, as will now be explained.

As best shown in Fig. 5, a relay 328 is mounted on the bracket 321 that carries the valve housing 315. This relay includes an armature 329 yieldingly supported, as indicated at 330, and having one end thereof acted on by a spring 331 which normally urges the pad 332 on the opposite end of the armature away from the stem 316 of the valve in the housing 315. The relay 328 is energized at predetermined time intervals, as will be explained presently, and when energized, the armature 329 thereof is attracted against the action of the spring 331, and the pad 332 thereof thereupon engages and depresses the stem 316. When the stem 316 is so depressed, the valve of which it is a part is opened and thereupon air retained in the aforesaid system of predetermined capacity may escape. The result of an operation in which air is admitted into the aforesaid system of predetermined capacity to thereafter be released from this system, in the manner just described, is that the column of mercury in the tube 303 of the manometer 302 is lowered in a predetermined amount as, for example, two millimeters.

It will be understood that air from the tube 304 flows into the aforesaid system of predetermined capacity only when the pressure in said system is lower than that in the tube 304, irrespective of unseating and seating of the diaphragm 310. Pressure in the aforesaid system of predetermined capacity is only relieved when the relay 328 is energized to depress the stem 316, the valve of which this stem is a part being closed at all other times. Thus, energization of the relay 328 at predetermined time intervals controls the escape of air from the closed system of which the T-fitting 291 is a part, and this is effected in the manner now to be described.

It will be recalled that at the time the electromagnet 56 was energized at the initiation of an operation of the machine, the contact finger 62 came to rest in engagement with the contact strip 64 and thus potential was applied on the conductor strip 64 from line wire 51 through terminal 58, conductor 65 and contact finger 62. Thus since the contact finger 62 is at this time in engagement with the contact strip 64, circuit is extended from this contact strip through conductor 333 to contact 334, Figs. 4, 6 and 26, which, as will be explained presently, is at predetermined times engaged by the contact 335. A conductor 336, Fig. 26, leads from contact 335 to one end of the winding of relay 328 while a conductor 337 leads from the other end of the winding of this relay to terminal 258, from whence circuit is extended through conductor 259, terminal 260, conductor 266, terminal 265, conductor 269, contact 268, contact 267, which contacts are engaged at this time by reason of the energization of relay 206, and thence through conductor 270, terminal 166 and conductor 167 to terminal 71 which, as hereinabove explained, through conductor 72, terminal 73, conductor 50b and terminal 50a, is connected to line wire 50. Thus, it will be seen that each time the contacts 334 and 335 are engaged, when relay 206 is energized, which is only during the time the systolic blood pressure of a user of the apparatus is to be ascertained in the present form of the apparatus, the relay 328 will be energized.

As best shown in Figs. 5, 6, 8 and 26, a pad 338 of insulating material is provided on the contact 335 to lie in the path of reciprocation of the rocker 317. By referring to Fig. 6 it will be seen that the pin 327 is arranged to be engaged by the rocker 317 during reciprocation of the rocker 317 to the right, as viewed in Fig. 6, while the block 338 of insulating material is arranged to be engaged by this rocker during the reciprocation thereof to the left, as viewed in Fig. 6, and furthermore the arrangement is such that the spring 326 will have disposed the diaphragm 310 in port-closing position prior to the time the block 338 is engaged. Therefore the contacts 334 and 335 are engaged at a time when communication between the tube 304 and the aforesaid system of predetermined capacity is closed off, and it is in this manner that release of but a predetermined volume of air with a consequent predetermined reduction of the height of the column of mercury in the tube 303 of the manometer 302 is assured.

Reduction of pressure in the closed system including the T-fitting 291 under control of energizations of the relay 328, effected as just described, continues until the systolic blood pressure of the user of the apparatus and the tendency of the radial artery to expand overcomes the pressure impressed by the bulb 294 on such artery and until five systolic effects in the radial artery, as a result of the resumption of the flow of blood therethrough when the effect of the pressure impressed by the bulb 294 is overcome, are detected by the closed system including the bellows 119, Fig. 12, for when the flow of blood past the volar aspect of the wrist of a user of the apparatus is resumed then the bulb 125 and therefore the bellows 119 again becomes responsive to systolic and diastolic effects in the radial artery in the left forearm of the user of the apparatus.

Thus as soon as blood again courses through the radial artery in the left forearm of a user of the apparatus when the effect of the pressure applied from the bulb 294 is overcome, the resulting coursing of the blood through the radial artery will have a systolic effect, wherefore, as hereinabove explained, the bar 136 will engage the contact 143 whereupon circuit is established to the relay 232 through the hereinabove described energizing circuit therefor, and the relay 232 thereupon becomes energized, the contacts 221 and 222 in the aforesaid energized circuit for the relay 232 being closed at this time by reason of the seating of the ear 220 in a notch 219. Energization of the relay 232 establishes the hereinabove described holding circuit for this relay through the contacts 234 and 235 of the relay 236, which stick circuit is broken in response to the first diastolic effect subsequent to the just described resumption of the flow of blood through the radial artery.

As explained hereinabove, circuit to the electromagnet 200 is broken at this time since the contact finger 191 has disengaged the contact strip 183 and therefore an energization of the relay 232, such as that just described, does not retract the ear 220 from a notch 219, wherefore the disc 177 remains in whatever position into which it has been advanced. Such energization of the relay 232, however, is otherwise effective, as will now be explained.

A relay 352, Figs. 5, 24, 25 and 26, is mounted in the apparatus including the ratchet 60, which will be described presently and circuit to this relay is established when the relay 232 is deenergized, subsequent to an energization thereof effected as above described, the circuit for which relay 352 thus established being as follows:

From line wire 51, terminal 58, conductor 65, finger 61, contact strip 63, conductor 66, terminal 67, conductor 151, terminal 152, conductor 242, terminal 262, conductor 354, contact 240 of relay 232, contact 355 of this relay, thence through conductor 356 to one end of the winding of the relay 352 and from the other end of this winding through conductor 353, contact 351, contact 341, when these two contacts are engaged, as will be explained, conductor 342, contact 343 of relay 206, contact 207, it being understood that the relay 206 is energized at this time and that, therefore, the contacts 343 and 207 are engaged, conductor 208, contact 192 which, when the relay 352 is to be energized, will be engaged by the contact finger 191, and therefrom circuit is extended through contact arm 189, conductor strip 184, conductor 209, terminal 210, conductor 211, terminal 162, conductor 163, terminal 164, conductor 165, terminal 166, conductor 167, terminal 71, conductor 72 to terminal 73, conductor 50b and terminal 50a to line wire 50.

Energizations of relay or electromagnet 352 effected through the just described circuit when the contacts 343 and 207 and 341 and 351 are engaged are correlated to energizations of the electromagnet or relay 56, effected through a circuit now to be described and are utilized in a manner explained in full detail presently.

The engagement of the contacts 47 and 48 effected by the passage of a coin through the coin chute 40, Fig. 4, effects energization of the relay 56 for a period of time sufficient to so retract the armature 59, Figs. 24 and 25, and the pawl 357 associated therewith that the contact fingers 61 and 62 move into the hereinabove described positions thereof in engagement with the conductor strips 63 and 64. The electromagnet 56 thereafter becomes deenergized, wherefore the pawl 357, under the influence of the spring 358a, returns into engagement with the ratchet 60. However, as will be explained presently, this retaining pawl 357 is adapted to be retracted from and restored to retaining position in timed relation with energizations of the relay 352 and as an incident to the reduction of the mercury column in the tube 303 of the manometer 302. To this end another energizing circuit for the electromagnet or relay 56 is afforded, such energizing circuit being as follows:

From line wire 51 to terminal 58, through conductor 57 to one end of the winding of the electromagnet 56 and from the other end of this winding through conductor 55 to terminal 54, and thence through conductor 339 to contact 340 which, in a manner to be explained presently, is alternately engaged and disengaged by a contact 341, and when contact 340 is engaged by contact 341, circuit is continued through conductor 342 to contact 343 of relay 206 which, since the relay 206 at this time is energized, is engaged by the contact 207, wherefore circuit is extended from the contact 207 through conductor 208 to contact 192 which, when the electromagnet 56 is to be energized through this circuit, will be engaged by the contact finger 191, wherefore circuit is extended through the contact arm 189 to the conductor strip 184, and thence through conductor 209, terminal 210, conductor 211, terminal 162, conductor 163, terminal 164, conductor 165, terminal 166, conductor 167, terminal 71, conductor 72 and terminal 73, conductor 50b and terminal 50a to line wire 50. Thus this circuit to the electromagnet 56 cannot be closed until the contact finger 191 attains its normal at rest position subsequent to disengagement thereof from the contact 254, wherefore energization of electromagnet 56 is suspended for a short time after the start of an operation to ascertain the systolic blood pressure and entirely throughout the operation in which the pulse is ascertained.

The contacts 340, 341 and 351, Figs. 4, 19 and 33, are clamped between blocks of insulating material 344, Fig. 19, supported on a bracket 345, Figs. 17 and 19, fast to the gear housing 168. By referring to Figs. 19 and 26 it will be seen that the contact 341 is elongated and that a block 346 of insulating material is fast thereto adjacent the free end thereof. The block 346 extends between this contact and a leaf spring 347 also supported by the bracket 345. The leaf spring 347 has a rider 348 thereon that is adapted to either ride on the periphery of the disc 349 or to seat in one of the notches 350 therein. The disc 349 is fast on the shaft 173 and rotates therewith and hence this disc is driven by the timing motor 160.

The contacts 341 engages the contact 340 to establish the just described energizing circuit for the electromagnet 56 whenever the rider 348 passes into a notch 350, but when the rider 348 is in engagement with the periphery of the disc 349 the above described circuit to the electromagnet or relay 352 is established. It will therefore be seen that the alternate engagement of the contact 341 with the contacts 340 and 351, provided the contact finger 191 is in engagement with the contact 192, controls alternate energization of the relays 56 and 352, and the periodic energization of relay 352 during an interval when relay 56 is deenergized effects return of the step-up device, of which the ratchet 60, the contact fingers 61 and 62 and the conductor strips 63 and 64 are a part, to its at rest position in which the fingers 61 and 62 are disengaged from the contact strips 63 and 64. Such step-up device is utilized under control of the relay 56 to insure that five systolic effects of the aforesaid radial artery will occur before the reduction of the mercury column in the tube 303 is finally arrested, for this insures accurate ascertainment of the systolic blood pressure as will be explained in further detail presently.

The step-up device, to which reference has just been made, is shown best in Figs. 4, 5, 23, 24 and 25 and includes a substantially U-shaped frame 360 that is mounted in the casing 30 adjacent the coin box 49 in the present instance. The frame 360 has a wall 359 on which the aforesaid retaining pawl 357, Figs. 24 and 25, is pivotally mounted, as indicated at 358. A spring 358a is effective on the pawl 357 to urge it into engagement with the teeth of the ratchet 60. When the armature 354 of relay 56, Fig. 24, is attracted into engagement with the finger 356 on the pawl 357, the finger is thereupon, against the effect of the spring 358a, withdrawn from engagement with the ratchet 60, the spring 355 is effective on the armature 59 to hold said armature out of such engagement with the finger 356 when the relay or electromagnet 56 is deenergized.

A shaft 362 is journaled in the wall 359 and a plate of insulating material 363 supported from but forwardly of the wall 359 by the screws 364 passed through the spacing collars 365, Fig. 5. The ratchet 60 is fast on the shaft 362 rearwardly of the wall 359 and inwardly of the U-shaped frame 360. A coil spring 366 has one end thereof fast to the ratchet 60, the other end of this spring being fast to the wall 359, the spring 366 being effective on the ratchet 60 to urge it in a clockwise direction as viewed in Fig. 25, such effect of the spring 366 being resisted by the retaining pawl 357 when it is seated in the teeth of the ratchet 60. However, when the retaining pawl 357 is withdrawn from engagement with the teeth of the ratchet 60, upon energization of the relay 56 and the engagement of the armature 59 thereof with the finger 356, then the ratchet 60 rotates clockwise, as viewed in Fig. 25, under the influence of the spring 366 until the pin 367 thereon seats on the toe portion of the clip 368 fast to the inner face of the wall 359, Fig. 5.

As best shown in Fig. 23, the contact fingers 61 and 62 are fast to the shaft 362 forwardly of the plate 363 to thereby be engageable with the contact strips 63 and 64 which, together with the contact strips 369 and 370, Fig. 23, are fast to the face of the plate 363 and which are arranged in circumferential relation about the shaft 362, but in spaced relation with each other, on said plate 363, the contact fingers 61 and 62 also being respectively engageable with the contact strips 369 and 370. In the present form of the apparatus the contact strip 370 is not utilized. At the time the pin 367 is engaging the toe portion 368, the contact fingers 61 and 62 are arranged in the full-line position thereof in Fig. 23 and respectively in engagement with the contact strips 63 and 64, this being the effect, as hereinabove described, in the illustrated form of the apparatus, of the engagement of the contacts 47 and 48 and the resulting closing of circuit to the relay 56. However, once the pin 367 is seated on the toe portion 368 and the contact fingers 61 and 62 have attained the full-line position thereof shown in Fig. 23, the relay 56 is deenergized to permit the retaining pawl 357 to seat in engagement with the teeth of the ratchet 60, where it remains until the relay 56 is energized through the circuit including the contacts 340 and 341, above described.

The electromagnet 352, to which reference has been made hereinabove, is carried by a bracket 371, Figs. 5, 24 and 25, in the frame 360 and includes an armature 372 pivotally mounted as indicated at 373 and which is adapted to be drawn downwardly upon energization of the electromagnet 352. A pawl 374 projects from the armature 372 and extends across the teeth of the ratchet 60, Fig. 5, but so long as the relay 352 is deenergized a spring 375, extended between this finger and a spring anchor 375a on the wall 359, holds the pawl 374 out of engagement with the teeth of the ratchet 60. When, however, the electromagnet 352 is energized, the pawl 374 so engages the teeth of the ratchet 60 that one tooth on this ratchet is moved past the retaining pawl 357, wherefore the ratchet 60 is advanced one step, the contact fingers 61 and 62 being similarly advanced in such an event.

The arrangement of the contact strips 63 and 64 with respect to the advanced position of the contact fingers 61 and 62, shown in full lines in Fig. 23, and the normal at rest position of these fingers, shown in broken lines in Fig. 23, is such that when the contact finger 62 has been retracted two steps from the advanced position thereof, by reason of two energizations of the relay 352 having a deenergization of said relay intermediate thereof, then this finger will have been moved from engagement with the contact strip 64 into engagement with the contact strip 370, this latter engagement being ineffective in the present form of the invention. Furthermore, when the contact finger 61 is retracted five steps from the advanced position thereof, in which event this finger and the finger 62 will be in the broken-line positions thereof in Fig. 23, then this finger 61 will have moved from engagement with the contact strip 63 into engagement with the contact strip 369, this latter engagement having an effect hereinafter described. Thus when the electromagnet 352 is energized twice, the contact finger 62 is advanced from engagement with the contact strip 64 and circuit between the conductors 65 and 333 is broken, and likewise when the contact finger 62, and therefore the contact finger 61, is subsequently advanced three more steps, circuit is broken between the conductor 65 and the conductor 66. This first breaking of the circuit between the conductor 65 and the conductor 333 and subsequently between the conductor 65 and the conductor 66 is utilized to interrupt the step by step reduction of the air pressure effective on the manometer 302 and the resulting reduction of the mercury column in the tube 303 when the systolic blood pressure of a person using the apparatus is being ascertained, the manner in which this is effective being described presently.

In the time interval between engagement of the contact finger 191 with the contact 254 and the reengagement of this contact finger with the contact 192 in the course of movement of the contact arm 189 with the shaft 173 from the time the contact finger 191 disengages the remote end of the contact strip 183 and until this finger reaches its normal at rest position, the closure of the outlet 278 by the seating of the valve member 279 thereover as a result of the energization of the relay or electromagnet 256 upon engagement of the contact finger 191 with the contact 254 enables the pump P' to be effective to establish a column of mercury of approximately two hundred millimeters in the tube 303 of the manometer 302, wherefore sufficient pressure is built up in the bulb 294 to collapse the radial artery leading past the volar aspect of the arm held against the bulb 294. Thus by the time the radial artery is collapsed the contact finger 191 will have engaged the contact 192 and thereby, through the circuits above traced, circuit is established to the relays 56 and 352, for once the contact finger 191 disengages the contact 192 at the initiation of an operation to ascertain the pulse of a user of the apparatus, circuit to the relays 56 and 352 is broken and these relays remain deenergized, such deenergization therefore being suspended during the operation of ascertaining the pulse and also while air is being supplied to the manometer 302 and the bulb 294 in the operation of ascertaining the systolic blood pressure, and it is for this reason that any energizations and deenergizations of the relays 232 and 236 that may accrue while pressure is being built up in the bulb 294 are ineffective so far as effecting operation of the apparatus is concerned.

When, however, the contact finger 191 reseats on the contact 192, then circuit is established to the relays 56 and 352 and depending upon whether the contact 341 is engaged with the contact 351 or the contact 340, circuit is at this time closed to either the relay 56 or the relay 352 for at this time the relay 232 will be deenergized, since collapsing of the radial artery in the manner above described is in the nature of a diastolic effect and therefore the relay 232 is deenergized by reason of the energization of the relay 236 which occurs in response to a diastolic effect, as has been explained. The contact 341 will be engaged with either the contact 340 or the contact 351 dependent upon whether the rider 348 is seated in a notch 350 or is riding on the periphery of the disc 349 fast to and rotatable with the shaft 173, as has been explained, the shaft 173 continuing in operation throughout an operation of the machine.

Assuming that the rider 348 is in engagement with the periphery of the disc 349 at the time the contact arm 191 engages the contact 192, the circuit is established to the relay 352 which thereupon becomes energized and attracts the armature 372 thereof and thereupon the pawl 374 is moved downwardly, as it is viewed in Fig. 25, into engagement with a tooth of the ratchet 60 with the effect of advancing one tooth of this ratchet 60 past the retaining pawl 357, wherefore the pin 367 is retracted one step away from the toe portion of the clip 368, the contact fingers 61 and 62 also being retracted one step away from the full-line position thereof shown in Fig. 23 toward the broken-line position of these fingers shown in Fig. 23.

During the time air under pressure is being supplied to the manometer 302 and the bulb 294, as above explained, the link 317 will be in operation and thus by the time the column of mercury of substantially two hundred millimeters is established in the tube 303 and the air pressure has been effective on the bellows 285a, Fig. 26, to close off communication between the tubes 287 and 290, the closed system of predetermined capacity controlled by the valve of which the stem 316 is a part will be filled with air. Hence once sufficient pressure has been impressed on the bellows 285a to close off communication between the tubes 287 and 290, a closed system of which the fitting 291 is a part is established as hereinabove described, and therefore when the link 317 next engages the block 338 of insulating material to thereby engage the contacts 334 and 335 the closed system of predetermined capacity will be filled and the energization of the relay 328 which accrues upon engagement of the contacts 334 and 335 causes the armature 329 to engage the stem 316 whereupon air is discharged from the aforesaid system of predetermined capacity. The first discharge of air from this system following the closing off of communication between the tubes 287 and 290 is without effect, in so far as the air pressure impressed on the mercury column in the manometer 302 is concerned, for the aforesaid system of predetermined capacity will have been filled during the time air was being supplied to establish the aforesaid column of two hundred millimeters of mercury in the tube 303 of the manometer 302.

The relay 328 becomes deenergized as soon as the link 317 disengages the block 338 of insulating material and therefore the armature 329 disengages the stem 316 and therefore escape of air from the aforesaid system of predetermined capacity is closed off.

Subsequent to the time the link 317 has disengaged the block 338 of insulating material, it moves into engagement with the pin 327 and thereupon the head 325 is attracted against the effect of the spring 326 away from the diaphragm 310 and thereupon air from the closed system of which the fitting 291 is a part flows into the aforesaid system of predetermined capacity so that equal pressures are established in the two such systems. As soon as this has been effected the link 317 disengages the pin 327 and thereupon the spring 326 is effective to reseat the diaphragm 310 in port-closing position and thereby the system of predetermined capacity is isolated from the system of which the fitting 291 is a part. In the present instance the system of predetermined capacity is so sized that when air is admitted thereinto from the system of which the fitting 291 is a part, in the manner just described, there is such a resulting decrease of pressure in the system of which the fitting 291 is a part that the mercury column in the tube 303 is reduced in the amount of about two millimeters.

Subsequent to such filling of the aforesaid system of predetermined capacity, the link 317 again engages the block 338 of insulating material and thereupon the relay 328 is again energized so that the stem 316 is again depressed whereupon air again escapes from the aforesaid system of predetermined capacity. However, as soon as pressure in the aforesaid system of predetermined capacity has again been reduced to atmospheric pressure, the link 317 again disengages the block 338 of insulating material and therefore, as explained above, escape of air from this system past the valve of which the stem 316 is a part is again closed off. Then the link 317 again engages the pin 327 and there is a further reduction of the pressure in the system of which the fitting 291 is a part and air so admitted to the aforesaid system of predetermined capacity is again permitted to escape therefrom in the manner above described.

Thus it will be seen that the mercury column in the tube 302 is reduced in a step by step manner and it will be understood that each time the mercury column is so reduced there is a resulting decrease in the pressure in the bulb 294. Such step by step reduction of the mercury column and reduction of pressure in the bulb 294 continues until the pressure in the bulb 294 equals the systolic blood pressure whereupon, as has been explained, blood again courses through the radial artery past the volar aspect of the wrist so as to effect compression of the bellows 119, as has been explained. It is to be noted that, while the mercury column in the tube 303 is being reduced in the above described manner, the disc 349 continues in rotation and if, as explained above, the rider 348 has been in engagement with the periphery of the disc 349, the disc will so advance in the course of the aforesaid reduction of the mercury column that a notch 350 will move into alignment with the rider 348 and resultingly the contact 341 will disengage the contact 351 and will move into engagement with the contact 340. When this occurs the relay 56 is energized and thereupon, in the manner above explained, the retaining pawl 357 is retracted from engagement with the ratchet 60 which therefore, under the influence of the spring 366, moves to engage the pin 367 with the toe portion of the clip 368 so as to thereby dispose the contact fingers 61 or 62 in the full-line position thereof shown in Fig. 23.

It will be understood that if the rider 348 had been seated in a notch 350 at the time the contact finger 191 reengaged the contact 192, then the electromagnet 56 would have been energized, but this would have been without effect since the pin 367 would at this time have been in engagement with the toe portion of the clip 368. Further in this regard it is to be noted that the spacing between the notches 350 in the periphery of the disc 348 and the speed of rotation of this disc is such that a predetermined time interval intervenes between each seating of the rider 348 in a notch 350 with the resulting engagement of the contact 341 with the contact 340 and consequent energization of the relay 56. The time interval which is thus established is of sufficient duration so that the relay 352 may be energized and deenergized five times in response to systolic and diastolic effects, sensed in the radial artery leading past the volar aspect of the wrist with which the bulb 125 is engaged, intermediate the time the contact 341 moves from engagement with the contact 340 and again moves back into engagement with such contact 340, this being utilized in a manner that will now be explained.

In any event the arrangement is such that when the bellows 119 is compressed in response to the coursing of blood through the radial artery when the systolic pressure in such artery overcomes the pressure applied thereto by the bulb 294, with the resulting energization of the relay 232, the contact 240 of this relay is withdrawn from engagement with the contact 355 thereof. Such disengagement of the contact 240 from the contact 355 results in deenergization of the relay 352, if the rider 348 is engaged with the periphery of the disc 349 so that the contact 341 is engaged with the contact 351. The relay 236 becomes energized in response to the diastolic effect succeeding the aforesaid coursing of the blood through the radial artery when the pressure applied by the bulb 294 is overcome whereby both the energizing circuit and the holding circuit for the relay 232 are broken with the result that the contact 240 thereof returns into engagement with the contact 355 and therefore, if the contact 341 is still in engagement with the contact 351, circuit is again closed to the relay 352, whereby the pawl 374 again engages the ratchet 60 with the result that this ratchet is retracted one step.

It will be understood that during the time the mercury column in the tube 303 is being reduced in the step by step manner above explained the relay 232 is deenergized. Therefore, each time the rider 348 moves out of a notch 350 and the contact 341 resultingly engages the contact 351, the relay 352 is energized to effect retraction of the ratchet 60 one step as above explained. Thus if the rider 348 is in engagement with the periphery of the disc 349 at the time blood again courses through the radial artery when the pressure applied by the bulb 294 is overcome, then the relay 232 will become energized and the relay 352 will become deenergized. Hence, if the rider 348 is still in engagement with the periphery of the disc 349 when a diastolic effect is sensed following the aforesaid coursing of the blood through the radial artery, with the resultant deenergization of the relay 232, the relay 352 becomes energized and the ratchet 60 is retracted another step. It will thus be seen that if the rider 348 has been in engagement with the periphery of the disc 349 at the time blood again courses through the radial artery, when the pressure applied by the bulb 294 is overcome, and if the rider 348 is still engaged with the periphery of the disc 349 when a diastolic effect is sensed in the radial artery subsequent to the aforesaid coursing of the blood through the radial artery, the ratchet 60 and therefore the contact fingers 61 and 62 are retracted two steps and consequently circuit is broken to the contacts 334 and 335 and therefore to the relay 328, and, resultingly, escape of air from the aforesaid system of predetermined capacity past the valve of which the stem 316 is a part, is interrupted.

If retraction of the ratchet 60 and the contact finger 62 two steps in the manner just described is the result of blood coursing through the radial artery, as a result of the pressure applied by the bulb 294 having been overcome, and also in response to a diastolic effect subsequent to such coursing of the blood, and if the rider 348 had just passed onto the periphery of the disc 349 to have energized the relay 352 immediately prior to the time this relay was deenergized in response to energization of the relay 232 attendant to the aforesaid coursing of the blood through the radial artery, then if three further systolic effects are impressed on the bulb 125 and resultingly on the bellows 119, with, of course, intervening diastolic effects, then the ratchet 60 and the contact fingers 61 and 62 are retracted three steps further from the aforesaid advanced position thereof, and these contact fingers therefore move into the broken-line position thereof in Fig. 23 wherefore the contact finger 61 disengages the contact strip 63, and this interrupts further operation of the machine with an effect that will be described more fully hereinafter.

Thus while the contact finger 62 may be retracted from engagement with the contact strip 64 in response to the coursing of the blood through the artery when the pressure applied by the bulb 294 is overcome, operation of the machine is not interrupted until three further systolic effects, with intervening diastolic effects, are sensed by the bulb 125 from the radial artery, for it has been found that this arrangement is conducive to accurate ascertainment of the systolic blood pressure of a user of the apparatus.

In explanation of this, it will be recognized that the user of the apparatus, and particularly the left arm of the user of the apparatus, may tolic blood pressure is proceeding, and such movement might be effective on the bulb 125 to compress the bellows 119 and thereby bring about an energization of the relay 232 with the effect of retracting the contact finger 62 from engagement with the contact strip 64, in the manner just explained, and if this alone could result in interruption of the operation of the machine, the mercury column in the tube 303 would be, in such an event, arrested in a position much higher than that in which it would be arrested if the height thereof was determined from the systolic blood pressure of the user of the apparatus as is done where the arrangement is such that as many as five compressions of the bellows 119, in response to systolic effects in the radial artery, intervene before interruption of operation of the machine is brought about.

Further it will be recognized that the coursing of the blood through the radial artery when the pressure applied from the bulb 294 is overcome may arise at a time when the rider 348 is near and about to enter a notch 350, and it will be recalled that each time the rider 348 enters a notch 350 the relay 56 is energized. Each energization of the relay 56 results in the ratchet 60 and the contact fingers 61 and 62 riding to their full advanced position of the fingers shown in full lines in Fig. 23. However, if this occurs about simultaneously with the resumption of the flow of blood through the radial artery, when the pressure applied by the bulb 294 is overcome, the systolic blood pressure of the user of the apparatus will nevertheless be ascertained with a high degree of accuracy, for if blood is at this time again flowing through the radial artery, five systolic effects, with intervening diastolic effects, will cause five compressions and expansions of the bellows 119, wherefore the relay 352 will be energized and deenergized five times, for the reason that the rider 348 will quickly move out of the notch 350 in which it is so seated and will thereafter engage and remain in engagement with the periphery of the disc 349 for a sufficient period of time to permit the aforesaid five effects to be impressed upon the bellows 119.

While it is possible that return of contact finger 62 to engagement with the contact strip 64, as an incident to a seating of the rider 348 in the notch 350, may enable circuit to be established to the relay 328, the apparatus is so arranged and timed that this likelihood is quite remote and moreover, if it does occur, there will be no more than a reduction of approximately two millimeters in the height of the mercury column in the tube 303 of the manometer 302. Therefore accurate ascertainment of the systolic blood pressure of a user of the apparatus will result in an operation of the apparatus which proceeds to ascertain the same and in this regard a machine constructed in accordance with the present disclosure of this invention has in repeated operations under control of the same user caused the mercury column to be arrested at the same height which is obviously demonstrative of the fact that irrespective of the contingencies just mentioned accurate ascertainment of the systolic blood pressure is effected by the apparatus.

The mercury column is arrested at a predetermined height for the reason that as soon as the contact finger 62 is retracted from engagement with the contact strip 64, the energizing circuit for the relay 328 is broken and therefore the depression of the stem 316, which results from energization of the relay 328 and in escape of air from the aforesaid system of predetermined capacity, is interrupted as consequently are reductions in the height of the mercury column. Moreover, it is to be noted that the contact finger 62 disengages the contact strip 64 quite promptly after blood again courses through the radial artery when pressure applied by the bulb 294 is overcome, so that therefore the height of the mercury column, when reduction in the height thereof is arrested, is directly related to the systolic blood pressure of the user of the apparatus.

It will be understood that if three systolic effects are not impressed on the bellows 119 immediately following the retraction of the contact finger 62 from the contact strip 64, the rider 348 will again pass into a notch 350, wherefore the relay 58 will be energized with the result that the contact fingers 61 and 62 return to the full-line positions thereof shown in Fig. 23 and further reductions in the height of the mercury column ensue until the hereinabove described operation effective to arrest reduction in the height of this column takes place.

However, once the height of the mercury column has been established to be indicative of the systolic blood pressure of a user of the apparatus, the mercury column is maintained at this height for when no further reductions of the height of the mercury column are to be effected the contact finger 61 rides off the contact strip 63 and as a result of this the diaphragm 382, Fig. 5, returns to closing position with respect to the ports 383 and 384, and therefore communication between the tubes 298 and 300 is closed off and consequently whatever pressure is established in the tube 300, and consequently the manometer 302, is maintained which resultantly maintains the mercury column at whatever height it has been arrested.

The energizing circuit which is broken by the disengagement of the contact finger 61 from the contact strip 63 which results in the just described return of the diaphragm 382 to closing position with respect to the ports 383 and 384, is that for the electromagnet 391 and this circuit is established and maintained by the engagement of the contact finger 61 with the contact strip 63, such circuit being as follows:

From line wire 51, through the hereinabove traced circuit to terminal 67 and then through conductor 151, terminal 152, conductor 153, terminal 154, conductor 155, terminal 156, conductor 157, terminal 158, conductor 227, terminal 228, and through conductor 390 to one end of the winding of the electromagnet 391 and from the other end of this winding through conductor 392, terminal 210, conductor 211, terminal 162, conductor 163, terminal 164, conductor 165, terminal 166, conductor 167, to terminal 71, and thence through the circuit hereinabove traced to line 50.

Thus, it will be seen that when the contact finger 61 engages the contact strip 63 at the initiation of an operation of the machine the electromagnet 391, Figs. 5 and 26, is energized and thereupon the armature 393 thereof is attracted. A pin 394 is connected to the armature 393 and leads into a chamber 395 in the main body of the valve housing 299. A head 396 is provided on the pin 394 and is urged against the diaphragm 382, when the electromagnet 391 is deenergized, by a spring 395' to maintain said diaphragm in closing position with respect to the ports 383 and 384. However, when the electromagnet 391 is energized upon engagement of the contact finger 61 with the contact strip 63 at the initiation of an operation of the machine, the head 396 is retracted against the effect of the spring 395' and thereupon the diaphragm 382 moves away from closing position with respect to the ports 383 and 384 and thus communication is established between the tubes 298 and 300, that respectively communicate with these ports, during the operations of ascertaining the pulse and systolic blood pressure.

However, when the contact finger 61 disengages the contact strip 63 as an incident to such finger being retracted through five steps from the advanced position thereof shown in full lines in Fig. 23 into the retracted position thereof shown in broken lines in Fig. 23, in the manner hereinabove explained, circuit between the contact finger 61 and the contact strip 63 is broken and thereupon the electromagnet 391 is deenergized. Upon such deenergization of the electromagnet 391, the pin 394 is freed to the effect of the spring 395' and the head 396 reseats the diaphragm 382 in closing position with respect to the ports 383 and 384 and communication is therefore closed off between the tubes 298 and 300. Consequently, whatever pressure has been established in the tube 300 and therefore the reservoir 301 of the manometer 302 is maintained and thereby the column of mercury in the tube 303 is maintained at the height it has assumed at the time of interruption of the above described step by step reduction of the pressure effective thereon.

In the present form of the apparatus, as may be ascertained by reference to Figs. 1 and 4, the tube 303 is arranged immediately behind the panel 34 and, as in the case of the disc 177, a slight opening 397 is afforded in the panel 34 forwardly of the tube 303 so that said tube 303 may be viewed through such sight opening. A scale 398 is etched in or otherwise associated with the panel 34 adjacent the sight opening 397, and this scale preferably has indicia associated therewith relating to the height of the column of mercury in the tube 303 to express this height in terms of millimeters of mercury. Thus when the operation of ascertaining the systolic blood pressure ceases and communication is closed off between the tubes 298 and 300 and the mercury column is held at whatever height it has attained as a result of the aforesaid step by step reduction in the height hereof, the top of such mercury column will be so related to a graduation of the scale 398 and indicia associated with such graduation that the height of the mercury column may be easily ascertained in terms of millimeters of mercury which, as explained hereinabove, is the customary manner in which systolic blood pressure is expressed. It will be understood that, while a manometer 302 and a scale 398 are employed in the present instance for registering a systolic blood pressure, resort might be had to other means for so registering such pressure without departing from the purview of our invention and furthermore, as will be explained more fully hereinafter, recording means may be used in place of or along with such registering means.

When the contact finger 61 is retracted from engagement with the contact strip 63 as a result of the step by step retraction thereof through five steps in the manner hereinabove explained, circuit is broken between the contact finger 61 and the contact strip 63 and thereupon the cycle of operation of the machine initiated, in this instance, by the passage of a coin through the coin slot 40 to effect engagement of the contacts 47 and 48, is interrupted.

Thus when the contact finger 61 disengages the contact strip 63, circuit is broken to the electromagnet 391 and, as hereinabove explained, the head 396 on the pin 394 connected to the armature 393 of this electromagnet reengages the diaphragm 382 to dispose this diaphragm in closing position with respect to the ports 383 and 384 with the effect hereinabove explained. Such deenergization of the relay 391 has a still further effect for the finger 399, Fig. 5, extended from the armature 393 of the electromagnet 391 engages the stem 400 of a valve in the housing 401 when the electromagnet is deenergized. The valve housing 401 is fast in position adjacent the relief valves 132 and 175 and a tube 402 leads thereto from the tube 91. It will be understood that when the machine is initially set in operation and the electromagnet 391 is energized, the finger 399 is retracted from engagement with the stem 400 and thus escape of air through the valve in the valve housing 401 is closed off. When, however, the finger 399 engages the stem 400 upon deenergization of the electromagnet 391, in the manner just explained, then the valve in the housing 401 is open whereupon air may escape from the tube 91.

It will also be understood that when the contact finger 61 disengages the contact strip 63, circuit to the pump motor 68 and the timing motor 160 is broken and thus by the time the finger 399 engages the stem 400 the pump P has ceased operation and therefore, as can best be ascertained by referring to Fig. 26, opening of the valve in the housing 401 permits air to escape from the tube 91 and the container 92.

Therefore, when the strap 38 is subsequently disengaged from the pin 127 and the volar aspect of the wrist is disengaged from the bulb 125, there will be an expansion of this bulb and such expansion will result in a reduction of the pressure effective on the bellows 112, Fig. 22. Such reduction of the pressure effective on this bellows will enable it to expand and resultantly the diaphragm 105 will unseat from closing position with respect to the ports 102 and 103 and liquid will thereupon drain from the above-described closed hydraulic system with a consequent deflation of the bulb 125.

Additionally, the pump P' ceases operation when operation of the motor 68 is interrupted by the aforesaid disengagement of the contact finger 61 from the contact strip 63, this latter also having the effect of opening circuit to the relay 206 which thereupon becomes deenergized with the result that the holding circuit for the relay 256 is opened whereupon the valve member 279 is withdrawn from closing position over the opening 278 and therefore air escapes through this opening with the result that the bellows 285a is freed of pressure and consequently the closed system of which the fitting 291 is a part is freed of pressure and resultingly the bulb 294 deflates.

In those instances where the panel 34, Fig. 1, is arranged to be translucent and in similar instances it may be advantageous to include suitable indicia on this panel explanatory of the operation of the machine and the like but it has been found that if the attention of the user of the apparatus is focused solely on the means for registering the pulse and systolic blood pressure, more accurate operation of the machine will result. It is for this reason that it is preferred to render the panel 34 translucent and to incorporate instructions and the like thereon in such a way that when illumination is afforded behind the panel such instructions and the like will be visible but the arrangement is preferably also such that when the machine is in operation such instructions will be invisible. The foregoing may be conveniently accomplished by shutting off illumination behind the panel 34 while the machine is in operation, and it is for this reason that the contact strip 369 is included in the hereinabove described set-up device, Figs. 23, 24 and 26.

It will be noted that when the contact finger 61 is in its normal at rest position shown in broken lines in Fig. 23, this finger is in engagement with the contact strip 369 and, when this finger is engaged with this contact strip, circuit is closed to the lamps L, Figs. 4 and 26. In the present instance the lamps L are mounted in suitable sockets 540, Fig. 4, which are carried by brackets 541 fast to the sides of the housing 33 behind the panel 34. When the panel is arranged in the manner herein described, the lamps L, when operating, will enable indicia on the panel 34 to be read but when the lamps are extinguished this indicia will become invisible.

By referring to Fig. 26 it will be seen that when the contact finger 61 is retracted into engagement with the contact strip 369, circuit is then closed from line wire 51, through terminal 58, conductor 65, contact finger 61, contact strip 369, conductor 542 to terminal 543 and thence respectively through conductors 544 and 545 to corresponding terminals of the lamps L and then respectively through conductors 546 and 547 from the other corresponding terminals of these lamps to terminal 548 and then through conductor 549 to line wire 50. Thus so long as the machine is inoperative and current is supplied through the line wires 50 and 51, the lamps L will be operative. However, when the machine is set in operation as by the passage of a coin through the coin chute 40 to effect engagement of the contacts 47 and 48 and the contact fingers 61 and 62 are moved into the advanced positions thereof so that the contact finger 61 is out of engagement with the contact strip 369, then circuit to the lamps L is broken, and these lamps are extinguished and, since the contact finger 61 remains in engagement with the contact strip 63 and therefore out of engagement with the contact strip 369, these lamps will be maintained extinguished throughout a cycle of operation of the machine but when the contact finger 61 disengages the contact strip 63, as an incident to the completion of a cycle of operation of the machine, this contact finger reengages the contact strip 369 and thereupon the lamps L will again be rendered operative.

The apparatus as thus far described is operable to manifest, by registering, the pulse and systolic blood pressure of a user thereof, but in some instances it may be desirable to manifest the force and magnitude of the systolic and diastolic effects sensed at the volar aspect of the wrist of a user of the apparatus, and a form of the apparatus operable to manifest such aspects of the systolic and diastolic effects is shown in Figs. 27 to 32, inclusive, wherein those parts which correspond to parts included in the apparatus as hereinabove described are indicated by the same reference characters hereinabove employed but the suffix "y" is added to such reference characters where they appear in Figs. 27 to 32, inclusive.

Thus in the form of the apparatus shown in Figs. 27 to 32, inclusive, a panel 34y similar to the panel 34 hereinabove described affords the front wall of the housing 33y and in this instance a substantially U-shaped sight opening 550 is afforded in the panel 34y behind which a U-tube 551 is arranged, the lower portion of the bight of the U-tube 551 being visible through the sight opening 550. Suitable index marks 552 or the like are etched or otherwise provided on the face of the panel 34y to lie above the level of the liquid in the bight of the U-tube 551 when the liquid is at rest.

As best shown in Figs. 28, 29 and 30, the U-tube 551 has enlargements 553 and 554 in the branches thereof above that part of the bight therein where liquid is to be stored, such liquid preferably being colored water or other light liquid. That part of the branch of the U-tube 551 above the enlargement 554 and which is indicated by 555 opens to the atmosphere and is preferably restricted so as to retard the discharge of liquid therethrough. That part of the other branch of the U-tube 551 beyond the enlargement 553 and which is indicated by 556, is formed to be substantially U-shaped so as to afford a downwardly extending terminal portion 557 which, as best shown in Fig. 28 is engaged by a clamp 558 at the free end of a brace 559 secured to the side wall of the housing 33y and extended across the inner face of the panel 34, such brace and clamp therefor serving to support the U-tube 551 in the aforesaid relation with the sight opening 550.

It has been found to be desirable to arrest the attention of a user of the apparatus and while the movement of the indicating means or pointer 252, visible through the sight opening 250, and the movement of the mercury column in the tube 303 of the manometer 302, visible through the sight opening 397, will serve to arrest the attention of the user of the apparatus, it has been found that the attention of the user may be further arrested by manifesting the force and magnitude of the systolic and diastolic effects sensed at the volar aspect of the wrist of the user, in the present instance by the bulb 125, and this is done by causing the liquid in the U-tube 551 to take motion in response to systolic and diastolic effects so sensed. This is accomplished in the present instance in the manner now to be described.

Thus a tube 123y which corresponds to the tube 123, Fig. 14, leads from a bulb similar to the bulb 125, which is engaged with the volar aspect of the wrist of a user of the apparatus, to the bellows housing 118y supported from a plate 120y and having a bellows therein corresponding to the bellows 119. Thus when a closed hydraulic system is afforded, in the manner hereinabove explained, systolic and diastolic effects sensed by a bulb as 125 effect compression and expansion of the bellows in the bellows housing 118y whereupon the pin 135y, that corresponds to the pin 135, is reciprocated. This arrangement may be part of a switch such as that shown in Figs. 11, 12 and 13, such switch parts being shown in broken lines in Figs. 28, 31 and 32, but in event it is not desired to utilize these switch parts they may be eliminated and it is for this reason that such parts are shown in broken lines as aforesaid.

In the present instance a bracket 560 is connected to the bracket 121y which supports the plate 120y, and one end of a bellows 561 is fast to this bracket to be supported forwardly of the plate 120y and in such position that the end of the bellows opposite that connected to the bracket 560 will be aligned with the pin 135y which may be connected to such end of the bellows 561. The bellows 561 is similar to the bellows as 119 hereinabove described, which is to say, it is a corrugated sheet metal extendible expansion vessel, but the bellows 561 is preferably formed of relatively light and highly flexible material for the reason that the force applied thereto by the pin 135y will be relatively light, and by so arranging the bellows 561 it will be rendered responsive to movements of the pin 135y.

In the present instance an outlet 562 leads through the bracket 560 to communicate with the interior of the bellows 561 and a tube 563 leads from the outlet 562 to the free end of the portion 557 of the U-tube 551, and thus when compression and expansion of the bellows 561 ensues it serves as a pump whereupon the liquid in the U-tube 551 is set in motion, this being brought about in the following manner:

A systolic effect impressed on the closed system including the bellows housing 118y is effective to move the pin 135y forwardly (to the left as viewed in Fig. 32) whereupon the bellows 561 is compressed and air is forced therefrom through the outlet 562 and tube 563 to be impressed on liquid in the bight of the U-tube 551 below the enlargement 553 therein whereupon the liquid is forced through the other branch of the U-tube 551 toward the enlargement 554.

A diastolic effect subsequent to such a systolic effect permits the expansion of the bellows in the bellows housing 118y and thereupon the pin 135y moves rearwardly (to the right as viewed in Fig. 32) permitting expansion of the bellows 561, and such expansion of the bellows 561 tends to draw a vacuum therein and in the tube 563 and in the enlargement 553 of the U-tube 551 and associated parts, and thereupon air pressure effective through the part 555 and the enlargement 554 is effective through the part 555 and the enlargement 554 is effective to force liquid in the bight of the U-tube 551 toward the enlargement 553.

It will thus be seen that in response to each systolic and diastolic effect sensed by a bulb as 125 and impressed on a closed hydraulic system including a bellows housing as 118y, in the arrangement herein shown and described, brings about movement of the liquid in the U-tube 551. The degree of such movement will be directly responsive to the force and magnitude of the sensed systolic and resulting diastolic effects, but slight movement of the liquid in the bight of the U-tube 551 accruing from sensed slight systolic and diastolic effects and material movement of the liquid in the bight of the U-tube 551 accruing from sensed systolic and diastolic effects of relatively great force and magnitude. Thus the user of the apparatus, by noting the relative position of the liquid in the bight of the U-tube 551 with respect to the index marks 552, will be able to observe the force and magnitude of systolic and diastolic effects sensed by the apparatus.

It will be understood that the liquid in the U-tube 551 will be in motion during the time the pulse is being ascertained but when pressure is built up in a bulb as 294 and the flow of blood through the radial artery past the volar aspect of the wrist with which a bulb 125 is engaged is interrupted, movement of liquid in the bight of the U-tube 551 will cease until pressure applied by the bulb 294 is reduced, in the manner hereinabove explained, so as to permit resumption of the blood through the radial artery past the volar aspect of the wrist, whereupon the ensuing systolic and diastolic effects will again be sensed and movement of the liquid in the bight of the tube 551 will again resume in response to such effects. It will thus be seen that the attention of the user of the apparatus may be arrested by inducing the user to observe the movement of the liquid in the U-tube 551. Furthermore, the operation of the apparatus, in the course of ascertaining the pulse and systolic blood pressure, as it is effective on the flow of blood past the left wrist of the user of the apparatus is also made apparent to such user.

While the various devices included in the apparatus are so arranged that improper operation thereof will be avoided and while, in the main, the apparatus is protected against improper operation, it may nevertheless be desirable to limit the time a particular operation of the machine may proceed once such an operation has been initiated. To this end the arrangement shown in Figs. 33 to 35 may be employed although it will be understood that resort might be had to other arrangements for limiting the period of operation of the machine without departing from the spirit and scope of the present invention.

In the present instance however we have provided a bracket 700, Figs. 33 and 34, that is secured to the gear housing 168 and which provides a bearing 701 in which a shaft 702 is journaled. A disc 703 is fast on the shaft 702 and in the present instance a gear 704 is fast to the shaft 702 intermediate the disc 703 and the adjacent end of the bearing 701. The gear 704 meshes with a gear 705 which, in the present instance, is fast to the shaft 173. The shaft 173, as has been explained hereinabove, is driven from the timing motor 160 which, as has also been explained, is set in operation at the initiation of operation of the apparatus and which, as has also been explained, remains in operation until the end of an operation of the apparatus. Thus it will be seen that the disc 703 is set in rotation each time an operation of the machine is initiated and such disc is utilized in the present instance to limit the length of time such an operation of the machine may proceed.

To this end a bracket 706 is secured to the bracket 700 and blocks of insulating material 707 are supported by this bracket. A leaf spring 708 is clamped between certain of the blocks 707 and has a rider 709 thereon that is adapted to ride on the periphery of the disc 703 or to seat in the notch 710 formed in the disc of the periphery thereof. A block of insulating material 711 extends between the free end of the leaf spring 708 and a contact 712 that is mounted between the contacts 713 and 714, such contacts being clamped between, to be carried by, blocks of insulating material 707. The arrangement including the leaf spring 708 and the contacts 712, 713 and 714 and the block of insulating material 711 is so arranged that the contacts are make-before-break contacts. Thus, as the rider 709 rides into the notch 710, the contact 712 engages the contact 714 prior to the time it disengages the contact 713 and likewise, as the rider 709 rides out of the notch 710, the contact 712 engages the contact 713 prior to the time it disengages the contact 714, and this make-before-break arrangement of the contacts is utilized to control the period during which the apparatus may remain in operation.

By referring to Figs. 26 and 35 it will be seen that the line wires 50 and 51 respectively lead to terminals 50a and 58, a conductor 50b leading from the terminal 50a to terminal 73. In the arrangement shown in Fig. 26 a conductor 72 leads from the terminal 73 to a terminal 71 but in the form of the apparatus shown in Fig. 53 a somewhat different connection is afforded between the line wire 50 and the terminal 71, as will be explained in further detail hereinafter.

In the form of the apparatus shown in Fig. 35, as in the form of the apparatus shown in Fig. 26, a conductor 50' leads from the terminal 63 to a contact 48 while a conductor 53 leads from the contact 47 to a terminal 54. It will be recalled that the contacts 47 and 48 are included in the coin-operated switch and that such contacts are engaged to effect energization of the electromagnet 56 and bring about retraction of the pawl 357 to permit the contact fingers 61 and 62 to move into the advanced and operative positions thereof hereinabove explained, and this same operation ensues when the contacts 47 and 48 are engaged in the form of the apparatus shown in Fig. 35. However, in this latter form of this apparatus an additional operation is brought about by engagement of the contacts 47 and 48 as will now be explained.

A conductor 715 leads from the terminal 54 to terminal 716 from whence a conductor 717 leads to one end of the winding of a relay 718. A conductor 719 leads from the other end of the winding of this relay to terminal 58. Thus upon engagement of the contacts 47 and 48 circuit is closed from line wire 50 through terminal 50a, conductor 50b, terminal 73, conductor 50', contact 48, contact 47, conductor 53, terminal 54, conductor 715, terminal 716, conductor 717, through the winding of the relay 718 and conductor 719 to terminal 58 and thence to line wire 51 and thereupon the relay 718 becomes energized.

It will be noted that in the present instance a conductor 720 leads from the terminal 50a to contact 721 of relay 718, which contact is engageable with the contact 722 of this relay upon energization of the relay. A conductor 723 leads from the contact 722 to terminal 71. Thus upon energization of the relay 718 and the consequent engagement of the contact 721 with the contact 722 thereof, circuit is closed from line wire 50 to terminal 71 to which, in the manner hereinabove explained, various electrically-operated mechanisms in the apparatus are connected.

In order that circuit will be maintained to the terminal 71 once circuit is established thereto by the engagement of the contact 721 with the contact 722 upon energization of the relay 718, a stick or holding circuit for this relay is established through the contacts 712 and 713, which holding circuit is closed so long as the rider 709 is engaged with the periphery of the disc 703, such holding circuit being as follows:

A conductor 724 leads from terminal 73 to terminal 725 and a conductor 726 leads from this terminal to contact 712. A conductor 727 leads from contact 713 to contact 728 of the relay 718, which contact is engaged by the contact 729 of relay 718 upon energization of said relay, and the contact 729 is connected to the terminal 716 through conductor 730.

Thus it will be seen that once the contacts 47 and 48 are engaged, circuit is established and maintained to the terminal 71 unless and until the rider 709 enters the notch 710 in which event the contact 712 is separated from the contact 713 whereupon the stick or holding circuit for the relay 718 is broken and thereupon said relay becomes deenergized since the contacts 47 and 48 are only closed for a short time as an incident to the passage of a coin thereby. The rider 709 enters the notch 710 a predetermined time after the machine has initially been set in operation, as will now be explained.

In Fig. 33 the parts are shown in their normal at rest position and it will be noted that the rider 709 engages the periphery of the disc 703 a short distance away from the notch 710. In the course of operation of the apparatus the disc 703 is rotated clockwise, as viewed in Figs. 33 and 35, and thus the disc 703 will make substantially a complete revolution prior to the time the rider 709 enters the notch 710 to break the stick or holding circuit for the relay 718. The ratio between the gears 704 and 705 and the speed of rotation of the shaft 173 are so arranged that the disc 703 will not make a complete revolution in less time than that which will be required to enable the hereinabove described operations of ascertaining and manifesting the pulse and systolic blood pressure to be completed, and preferably a safety factor is included in this arrangement so as to insure that there will always be sufficient time to enable the desired operations of the machine to be brought about.

However, it will be appreciated that some arrangement must be provided for keeping the machine in operation for a sufficient period of time to insure that the rider 709 will ride out of the notch 710, for otherwise circuit would be broken to the relay 718 and the contact 721 would disengage the contact 722 and the timing motor 160 would cease functioning. This would leave the rider 709 in the notch 710 and consequently the relay 718 could not be maintained energized to enable an operation of the apparatus to proceed as intended. It is for this reason that the contacts are arranged to be make-before-break contacts and this is utilized in the following manner:

As an incident to the passage of the rider 709 into the notch 710, the contact 712 engages the contact 714 prior to the time it disengages the contact 713. When the contact 712 engages the contact 714, the following circuit is established: from terminal 73 through conductor 724, terminal 725, conductor 726, contact 712, contact 714, conductor 731 to one end of the winding of a relay 732 and from the other end of the winding of this relay through conductor 733 to terminal 58 and thereupon the relay 732 energizes.

Energization of the relay 732 in the manner just described engages the contact 734 thereof with the contact 735 thereof, and this occurs prior to the time the contact 712 disengages the contact 713 and so breaks the circuit to the relay 718 that the contact 721 disengages the contact 722 of this relay 718 to open the circuit between the terminals 50a and 71. Hence prior to the time the contact 721 disengages the contact 722, the contact 734 will engage the contact 735 and thereupon the circuit is closed from terminal 725 through conductor 736, contact 734, contact 735 and conductor 737 to terminal 71. The closing of this circuit prior to the opening of the circuit through the contacts 721 and 722 maintains circuit to the motor 160 and therefore the disc 703 remains in operation.

As the disc 703 continues rotation after the time the rider 709 is passed into the notch 710, it will cause the rider 709 to move out of the notch 710 and in the course of such movement the contact 712 will engage the contact 713 prior to the time it disengages the contact 714 and thereby the above described stick or holding circuit for the relay 718 will be established prior to the time the contact 712 disengages the contact 713 to open circuit to the relay 732, for when circuit is opened to the relay 732, this relay becomes deenergized and the contact 734 disengages the contact 735 thereof and this breaks circuit to the terminal 71 whereupon the circuit to the motor 160 and other devices electrically connected to the terminal 71 is broken to interrupt operation of the machine.

However, by the time the rider 709 reengages the contacts 712 and 713, the contacts 728 and 729 will be separated and therefore such engagement of the contacts 712 and 713 does not bring about energization of the relay 718. At this time, however, since the contacts 712 and 713 are engaged, the parts are conditioned to enable a new cycle of operation of the machine to be brought about by reengagement of the contacts 47 and 48.

It will be understood that the hereinabove explained speed of rotation of the disc 703 will be sufficient to insure that all of the desired operation of the machine will take place prior to the time the rider 709 enters the notch 710, but it will be apparent that any cycle of operation of the apparatus initiated will be interrupted at the lapse of such period of time by reason of the entry of the rider 709 into the notch 710 in the manner hereinabove explained.

*Operation of the apparatus*

When the machine is at rest, the ratchet 60 and the contact fingers 61 and 62 associated therewith are held in a retracted position against the effect of the spring 366 by the engagement of the retaining pawl 357 with this ratchet. In the illustrated form of the apparatus, this retaining pawl is retracted, at the initiation of a cycle of operation of the apparatus, by energization of the electromagnet 56 which, in the present instance, is brought about by the engagement of the contacts 47 and 48 with each other as an incident to the passage of a coin inserted through the coin slot 41 through the coin chute 40. Energization of the relay 56 effected in this manner is sufficiently prolonged to enable the ratchet 60 and the contact fingers 61 and 62 to move into the position in which these parts are shown, for example, in Fig. 26, where the contact finger 61 is shown in engagement with the contact strip 63 and the contact finger 62 is shown in engagement with the contact strip 64.

The engagement of the contact finger 62 with the contact strip 64 at this time is without effect since the relay 206 is deenergized and therefore whether or not the contacts 334 or 335 are engaged, circuit will not be closed to the electromagnet or relay 328 for the reason that when the relay 206 is deenergized the contacts 267 and 268 thereof are disengaged, and therefore the energizing circuit for the relay 328 is only established when the contacts 267 and 268 are engaged as an incident to the energization of the relay 206 at a time and in a manner to be explained. It should be noted, however, that the relay 206 is not energized until the completion of an operation which proceeds to ascertain the pulse of a user of the apparatus and such an operation is now to be explained.

Prior to the time the relay 56 is energized in the manner just explained the bulb 125 will be clamped against the volar aspect of the left wrist of a user of the apparatus and the bulb 294 will be clamped against the volar aspect to the left arm of such user. Therefore, when the contact finger 61 moves into engagement with the contact strip 63 and the pump motor 68 is set in operation, this may be effective to force liquid into the bulb 125 and inflate the same so as to thereby urge it tightly against the volar aspect of the left wrist of the user of the apparatus and this is brought about in the following manner:

When the pump motor 68 is set in operation, the pump P is effective to supply air under pressure to the container 96 through the tube 91 past the check valve 92 and, as air pressure is thus built up in the container 96, liquid stored therein is forced therefrom through the tube 97 past the diaphragm 105 to the tube 115 and thence through the bellows housing 111, tube 116, bellows housing 118 and tube 123 to the bulb 125. The liquid thus supplied to the bulb 125 causes pressure to be built up in the system between the valve housing 99 and the bulb 125, and such pressure is effective on the bellows 112 to seat the diaphragm 105 in such position as to close off communication between the tubes 97 and 115 and thereby a closed hydraulic system beyond the valve housing 99 and including the bulb 125 and the bellows housing 118 is established.

During the time the pump P is thus effective to establish such closed hydraulic system, the disc 177 will be rotating toward the zero position thereof, for when the contact finger 61 engaged the contact strip 63, as above described, circut was closed to the electromagnet 200 through the initial energizing circuit for this electromagnet. This circuit is established by the engagement of the contact finger 191 with the contact 192 and the engagemen of the contacts 205 and 207 of the relay 206 with each other, these contacts being so engaged so long as the relay 206 is deenergized, which condition prevails at the start of an operation of the apparatus. The energization of the electromagnet 200 through the aforesaid initial energizing circuit therefor and the resulting attraction of the armature 212 thereof retracts the ear 220 from the notch 219 in which it has been seated and thereupon the disc 177 is freed to rotate with the shaft 173. The disc 177 will then rotate at least ninety degrees for at the time the ear 220 is retracted from a notch 219 by the just referred to energization of the electromagnet 200, the disc 177 will be in an advanced position representative of the pulse of the previous user of the apparatus, and it is during the time that the disc 177 is so rotating that the pump P is effective to establish the aforesaid closed hydraulic system.

However, when the disc 177 attains its zero or at rest position the stop finger 196, Fig. 17, is retracted from engagement with the contact finger 191 and thereupon the contact arm 189 starts to rotate with the shaft 173. As an incident to the initiation of such movement of the contact arm 189 with the shaft 173, the contact finger 191 is withdrawn from engagement with the contact 192 and thereupon the initial energizing circuit to the electromagnet 200 is broken wherefore the armature 212 of this electromagnet is freed to the effect of the spring 217, and thereupon the ear 220 seats in the next notch 219 to move into alignment therewith and this arrests the disc 177 in such position that the pointer 252 thereon is aligned with zero position on the scale 251, this being the zero position of the disc 177. Such seating of the ear 220 in a notch 219 effects engagement of the contacts 221 and 222 and thereupon the energizing circuit for the relay 232 is established. This energizing circuit is closed as soon as a systolic effect in the radial artery, leading past the volar aspect of the wrist with which the bulb 125 is engaged, is impressed on the bulb 125 subsequent to the engagement of the contacts 221 and 222 in the manner just described. A systolic effect so impressed on the bulb 125 compresses the bellows 119 wherefore the pin 135 moves the bar 136 into engagement with the contact 143, and it is this that closes the circuit established by the engagement of the contacts 221 and 222 and the closing of such circuit effects energization of the relay 232.

Energization of the relay 232 engages the contact 240 thereof with the contact 241 thereof and thereupon a holding circuit for this relay is established through the contacts 234 and 235 of the relay 236 which is deenergized at the time the relay 232 is energized in the manner just explained. Furthermore, energization of the relay 232 engages the contact 244 thereof with the contact 245 thereof and thereupon circuit is closed to the electromagnet 200 and consequently the ear 220 is retracted from a notch 219 and thereupon the disc 177 takes motion with the shaft 173.

A diastolic effect in the radial artery leading past the volar aspect of the wrist with which the bulb 125 is engaged will immediately follow the peak of the systolic effect that brings about the aforesaid engagement of the bar 136 with the contact 143, and such diastolic effect will enable the bellows 119 to expand whereupon the pin 135 moves the bar 136 from engagement with the contact 143 (without effect since the aforesaid holding circuit for the relay 232 will have been established by this time and also because circuit to the relay 232 from this source will by this time have been broken by the engagement of the contacts 221 and 222 upon the last-mentioned energization of the electromagnet 200) into engagement with the contact 144 whereupon circuit is closed to the relay 236, which thereupon becomes energized and disengages the contact 235 thereof from the contact 234 thereof. This breaks the aforesaid holding circuit for the relay 232 and this relay thereupon becomes deenergized whereupon the contact 144 thereof disengages the contact 245 and this breaks the energizing circuit established through these contacts to the electromagnet 200 and therefore the electromagnet 200 becomes deenergized.

Such deenergization of the electromagnet 200 frees the armature 212 thereof to the effect of the spring 217 and this urges the ear 220 into engagement with the periphery of the disc 177 intermediate the notch 219 in which this ear was seated at the time the electromagnet was energized in the manner last explained and the succeeding notch 219 in the direction of rotation of the disc 177. During the time the ear 220 is so riding on the periphery of the disc 177, the contacts 221 and 222 are maintained disengaged and therefore the energizing circuit to the relay 232 is open and thus, even though an effect in the nature of a systolic effect is impressed on the bulb 125, there is no resulting energization of the relay 232. An effect in the nature of a systolic effect might be impressed on the bulb 125 during the time the ear 220 is riding on the periphery of the disc 177 in the dicrotic phase of a pulse beat and, if such effect could bring about an energization of the relay 232 with the consequent closing of circuit to the electromagnet 200, it might result in improper operation of the apparatus which is designed to count only true systolic effects in the radial artery leading past the volar aspect of the wrist with which the bulb 125 is engaged.

To this end the spacing between the notches 219 and the speed of rotation of the disc 177 are so correlated that once the ear 220 is retracted from a notch 219 it will not seat in the succeeding notch in the direction of rotation of the disc 177 until after the elapse of a predetermined time period which is determined to be slightly less than the rapidity with which peaks of systoles may be discerned in a particular pulse, and in the present instance a pulse of one hundred and five has been selected, this being, as will be understood one hundred and five systoles per minute. Thus during the aforesaid time period the ear 220 continues to ride on the periphery of the disc 177 but upon the elapse of such time period the ear 220 seats in the aforesaid succeeding notch and thereupon rotation of this disc 177 with the shaft 173 is interrupted. At this same time the contacts 221 and 222 are reengaged and hence in response to the peak of the systolic effect subsequent to the peak of the effect which brought about the last-mentioned energization of the relay 232, said relay is again energized and the above described operation resulting in the advance of the disc 177 in an amount equal to the spacing between the next succeeding notches 219 results in response to this last-sensed systolic effect.

It will be understood that by the time a systolic effect is impressed on the bulb 125 to bring about the first above described energization of the relay 232 the contact finger 191 will have moved into engagement with the contact strip 183 and will be riding therealong. The speed of movement of the contact finger 191 along the strip 183 and the length of said strip 183 are so correlated that a predetermined period of time will be set up and in the present instance this time interval is twenty seconds. It will also be understood that the circuit to the electromagnet 200 that is established by the engagement of the contact 244 of the relay 232 with the contact 245 thereof is established through the contact strip 183 and the contact finger 191 and therefore when the contact finger 191 rides off of the end of the contact strip 183 remote from the end thereof first engaged by said contact finger, further energization of the electromagnet 200 in response to systolic effects impressed on the bulb 125 will be prevented.

It will be seen from the foregoing that the disc 177 may be advanced in a step by step manner for a predetermined period of time, and it will also be understood that each step in such advance of the disc 177 is in response to a systolic effect in a pulse of less than a predetermined frequency and therefore in a given period of time the disc 177 is advanced a selected distance. In the present instance the given period of time is twenty seconds and since each step in the advance of the disc 177 is in response to a systolic effect it will be seen that the disc 177 is advanced in an amount representative of the number of systolic effects impressed on the bulb 125 in twenty seconds. Since twenty seconds is one-third of a minute and since the scale 251, in the present instance, is calibrated in a ratio of three-to-one and since the pointer 252 will be aligned with a graduation and associated indicia on the scale 251 at a point determined by the advance of the disc 177, it will be seen that the graduation and indicia with which the pointer 252 is associated at the end of an advance of the disc 177, effected in the manner just described, expresses the pulse of the user of the apparatus in terms of beats per minute.

In further explanation of the foregoing, if, during the time interval the contact finger 191 is riding along the contact strip 183, twenty-seven systolic effects are impressed on the bulb 125 with a consequent and resulting twenty-seven energizations of the relay 232 and the electromagnet. 200 and twenty-seven energizations of the relay 236 in response to diastolic effects attendant to the aforesaid twenty-seven systolic effects, then the disc 177 will be advanced in the amount of twenty-seven steps from its zero position, the length of each of such steps being determined by the spacing between the notches 219. Thus in this instance the pointer 252 will move into alignment with graduations and indicia pertaining to a pulse of eighty-one beats per minute.

The operation of ascertaining the pulse is completed at the time the contact finger 191 rides off of the aforesaid remote end of the contact strip 183 and shortly after this the contact finger 191 moves into engagement with the contact 254 and thereupon circuit is closed to the relays 206 and 256. These relays thereupon becomes energized, and such energization of the relay 206 establishes holding circuits for these relays 206 and 256, these holding circuits being established through the contacts 267 and 268 of the relay 206, which contacts engage when the relay 206 is energized.

During the time the operation is proceeding to ascertain the pulse, the pump P' will be operating but during this operation the valve member 279 is held from closing position with respect to the opening 278 by reason of the fact that the relay 256 is deenergized. Hence air from the pump P' freely flows out through the opening 278 until the valve member 279 seats over the opening 278. However, the relay 256 is energized and locked up, in the manner just explained, at the start of an operation which proceeds to ascertain the systolic blood pressure of a user of the apparatus and when the valve member 279 seats in closing position with respect to the opening 278 and prevents further escape of air through this opening, air supplied from the pump P' flows into the bellows housing 285 and out through the tube 287 past the diaphragm 289 and out through the tube 290 to the fitting 291. Such flow of air continues until a predetermined pressure is impressed on the bellows 285a in the bellows housing 285, whereupon the diaphragm 289 seats to close off communication between the tubes 287 and 290 and subsequent to this the relief valve 275 becomes operative to so discharge air supplied from the pump P' that only the aforesaid predetermined pressure is maintained on the bellows 285a.

At the time the apparatus is initially set in operation the electromagnet 391 is energized whereupon the diaphragm 382 is retracted from closing position and communication is established between the tubes 300 and 298. Until this occurs, sufficient pressure is maintained in the tube 300, and consequently the reservoir 301 of the manometer 302, to maintain the mercury column in the tube 303 of the manometer 302 at whatever height it has assumed as a result of the preceding operation to determine the systolic blood pressure of the preceding user of the apparatus, such an operation being initiated by engagement of the contact finger 191 with the contact 254 in the manner just described. The retraction of the diaphragm 282 from the position in which it closes off communication between the tubes 300 and 298 results in discharge of air from the reservoir 301 and the tube 300 whereupon the mercury column in the tube 303 falls to a height equal to the height of the mercury in the reservoir 301.

However, air supplied from the pump P' flows through the tube 298 and past the diaphragm 382 (which is held out of the position thereof which closes off communication between the tubes 298 and 300 until the end of a cycle of operation of the apparatus) into the tube 300 and as the pressure increases as a result of air being so supplied, mercury is forced from the reservoir 301 of the manometer 302 up into the tube 303 until a column of mercury of substantially two hundred millimeters is established in the tube 303. It is immediately after the establishment of such a column of mercury that the pressure impressed on the bellows 285a becomes sufficient to close off communication between the tubes 287 and 290 by seating the diaphragm 289 in position to close off such communication. Thus the pressure established in the fitting 291 and the parts associated therewith corresponds to the height of the mercury column in the tube 303 of the manometer 302, and it is this pressure that is built up in the bulb 294 which, as explained hereinabove, is engaged with the volar aspect of the left arm of a user of the apparatus. A pressure corresponding to that indicated by a column of two hundred millimeters of mercury is sufficient to be effective through the bulb 294 to collapse the radial artery of those patrons whose systolic blood pressure is not in excess of this value, and while it would be merely a matter of adjustment to condition the apparatus for a higher range of pressures, it has been found desirable in the present embodiment to limit the pressure to approximately 200 millimeters as aforesaid. Such collapsing of such radial artery interrupts the flow of blood through the radial artery and hence the impression of systolic effects on the bulb 125.

In order to determine the systolic blood pressure of the user of the apparatus the pressure built up in response to the column of mercury established in the tube 303 of the manometer 302 is reduced in a step by step manner until the pressure so established is equal to the systolic blood pressure of a user of the apparatus for, when this condition prevails, such systolic blood pressure and the tendency of the radial artery to expand causes blood to again course through the radial artery leading past the volar aspect of the wrist with which the bulb 125 is engaged with the result that systolic effects, with attending diastolic effects, will again be sensed by the bulb 125 and when a predetermined number of systolic effects have been sensed, reduction of the mercury column and the pressure established thereby is interrupted.

In order to effect such step by step reduction of the mercury column and the pressure established thereby, a tube 304 leads from the system of which the fitting 291 is a part, and with which the reservoir 301 is in communication, to a valve housing 307 in which there is a diaphragm 310 that controls communication between the tube 304 and the tube 312 that is part of a system of predetermined capacity. In the present instance, the arrangement is such that each time the system of predetermined capacity is filled with air from the system of which the fitting 291 is a part there will be a reduction of substantially two millimeters in the height of the mercury column in the tube 303 of the manometer 302. The diaphragm 310 is moved to and from the position in which it closes off communication between the tubes 304 and 312 under control of the link 317 which engages a pin 327 provided on a stem 323. The link 317 is reciprocated when the pump motor 68 is in operation and as the link 317 moves to one side of an intermediate position thereof it engages the pin 327 and so retracts the diaphragm 310 that communication is established between the tubes 304 and 312 and thereupon air is released from the system of which the fitting 291 is a part into the system of predetermined capacity. Then as the link 317 moves back toward the aforesaid intermediate position the spring 326, Fig. 6, reseats the diaphragm 310 so as to close off communication between the tubes 304 and 312 and thereafter the link 317 moves into a position on the opposite side of the aforesaid intermediate position thereof and in the course of such movement it effects engagement of the contacts 334 and 335. Engagement of the contacts 334 and 335, when the relay 206 is energized to engage the contact 207 with the contact 343 thereof, effects energization of the relay 328 whereupon the armature 329 of this relay is attracted into engagement with the stem 316 of a valve in the valve housing 315, that is part of the aforesaid system of predetermined capacity, and thereupon air is discharged from this system of predetermined capacity. Since at this time the diaphragm 310 will be in closing position, the aforesaid system of predetermined capacity is out of communication with the system of which the fitting 291 is a part when the contacts 334 and 335 are engaged and therefore only air in the system of predetermined capacity is discharged.

It may be that during the time the pump P' is acting to supply air to the system of which the fitting 291 is a part the stem 316 will be engaged as just described, but this will not impair the building up of pressure in the system of which the fitting 291 is a part since at this time there will be an ample supply of air to this system. However, as soon as pressure is effective on the bellows 285a to interrupt communication between the tubes 287 and 290, then when the diaphragm 310 is retracted from its aforesaid closing position and air flows into the aforesaid system of predetermined capacity, there is a reduction in the height of the mercury column in the tube 303 of the manometer 302 with a consequent reduction in the pressure established by this mercury column which, of course, means a reduction of the pressure in the bulb 294. Once air has so flowed into the system of predetermined capacity it may be immediately thereafter discharged therefrom by reason of the fact that the contacts 334 and 335 will be engaged shortly after the diaphragm 310 has returned to position to close off communication between the tubes 304 and 312. However, the armature 329, which is under the influence of the spring 331, engages the stem 316 for but a short time by reason of the fact that the link 317 permits the contacts 334 and 335 to disengage shortly after the engagement thereof, and this disengagement occurs well prior to the time the link 317 so engages the pin 327 that the diaphragm 310 is moved from the position in which it closes off communication between the tubes 304 and 312.

Once the pressure on the bellows 285a is sufficient to close off communication between the tubes 287 and 290 in the manner hereinabove explained, then the just described step by step reduction of the mercury column in the tube 303 proceeds until the pressure established under the influence of the height of this mercury column is reduced sufficiently to be equal to the systolic blood pressure of a user of the apparatus.

It will be recalled that the maximum height to which the mercury column of the tube 303 of the manometer 302 is extended is substantially two hundred millimeters and, as has been explained, such height is sufficient to establish such pressure in the bulb 294 that the radial artery, leading past the volar aspect of the arm with which the bulb 294 is engaged, is collapsed. However, when the reduction of the mercury column in the tube 303 has proceeded to such an extent that the pressure established under the effect thereof is equal to the systolic blood pressure in the aforesaid radial artery, then by reason of such systolic pressure and the tendency of such artery to expand, the artery is expanded from the collapsed state thereof and blood again flows through the radial artery past the volar aspect of the wrist with which the bulb 125 is engaged. Such coursing of the blood through the radial artery, when the effect of the extraneous pressure applied by the bulb 294 is overcome, is in the nature of a systolic effect in the radial artery and therefore the bellows 119 is compressed as an incident to such flow of blood through the artery. This results in engagement of the bar 136 with the contact 143 wherefore the relay 232 is energized.

By the time the relay 232 is energized in the just-mentioned manner the contact finger 191 will be out of engagement with the contact strip 183 and therefore the engagement of the contact 244 of the relay 232 with the contact 245 thereof upon such energization of the relay 232 is without effect on the electromagnet 200 wherefore the ear 220 remains seated in the notch 219 in which it was seated at the end of the operation which proceeded to ascertain the pulse of the user of the apparatus. Furthermore, by the time the bellows 119 is collapsed in the manner just explained, the contact finger 191 will have returned into engagement with the stop finger 196 and will therefore be in engagement with the contact 192, but this does not establish the above referred to initial energizing circuit to the electromagnet 200 for at this time the contact 207 of the relay 206 will have been withdrawn from engagement with the contact 205, which opens the aforesaid initial energizing circuit to the relay 200.

The contact 207 engages the contact 343 upon energization of the relay 206 and the engagement of these contacts and the engagement of the contact finger 191 with the contact 192 tentatively establishes circuits to the relays of electromagnets 56 and 352, which circuits are alternately closed to alternately energize the relays 56 and 352, as will now be explained. So long as the relay 232 is deenergized, the contact 240 thereof is engaged with the contact 355 thereof and this establishes, but does not necessarily close, circuit to the relay 352 inasmuch as such circuit is under further control of the contacts 341 and 351. Likewise, circuit to the electromagnet 56 from a source other than the contacts 47 and 48 is under control of the contacts 340 and 341 and since the contact 341 is alternately engageable with the contacts 340 and 351 it will be seen that this contact alternately establishes circuit to either the relay 56 or the relay 352.

Assuming that the rider 348 on the leaf spring 347, which is connected to the contact 341 by the block of insulating material 346, is riding on the periphery of the disc 349 at the time the bellows 119 is collapsed when blood courses through the radial artery at the time the extraneous pressure applied by the bulb 294 is overcome, then circuit to the electromagnet or relay 352 will not be closed, inasmuch as the contacts 240 and 355 of relay 232 are not now engaged, this being the condition which prevails when relay 232 is energized in response to the last-mentioned compression of the bellows 119 and the consequent engagement of the bar 136 with the contact 143; and hence, under the effect of the spring 375, the pawl 374 is retracted from or maintained out of engagement with the ratchet 60.

Energization of the relay 232 in the manner just described establishes a holding circuit therefor through the contacts 234 and 235 of the relay 236. However, as soon as a diastolic effect is sensed by the bulb 125, subsequent to the coursing of the blood through the radial artery when the pressure applied by the bulb 294 is overcome, then the relay 236 becomes energized wherefore the holding circuit for the relay 232 is broken since the contact 235 of the relay 236 disengages the contact 234 thereof upon energization of this relay. Such deenergization of the relay 232 permits the contact 240 thereof to engage the contact 355 thereof and if at this time the rider 348 is still engaged with the periphery of the disc 349 that is driven by the timing motor 160, then circuit is established to the electromagnet 352 and the pawl 374 thereof engages the ratchet 60 and causes a tooth of this ratchet to be moved past the restaining pawl 352 wherefore the contact fingers 61 and 62 are retracted a step away from the advanced position thereof shown in full lines in Fig. 23, and toward the retracted position of these fingers shown in broken lines in Fig. 23.

Thus, each time a systolic effect is sensed, the magnet 352 is deenergized and the pawl 374 is retracted from engagement with the ratchet 60, but whenever a diastolic effect is sensed, the magnet 352 is energized and the pawl 374 engages the ratchet 60 and moves it the distance of one tooth past the retaining pawl 357, and in this manner the contact fingers 61 and 62 are progressively retracted in a counterclockwise direction, as viewed in Fig. 26, in response to the sensing of systolic and diastolic effects by the bulb 125.

When the contact finger 62 is retracted two steps, in the manner just described, it moves from engagement with the contact strip 64 into engagement with the contact strip 370, and such disengagement of the contact finger 62 from the contact strip 64 opens the circuit to the relay 328 and engagement of the contacts 334 and 335 by the link 317, when the contact finger 62 is retracted from the contact strip 64, does not result in energization of the relay 328 wherefore the armature 329 thereof does not engage the stem 316 to release air from the aforesaid system of predetermined capacity, and therefore whatever pressure is at this time established in the system of which the fitting 291 is a part is maintained unless the contact finger 62 again engages the contact strip 64.

The spacing between the notches 350 in the disc 349 is such that, during the time interval between the time at which the rider 348 rides out of a notch 350 and the time it seats in the succeeding notch 350 in the direction of rotation of the disc 349, five pulse beats may be impressed on the bulb 125. Hence, if at the time the bellows 119 was compressed when blood coursed through the radial artery at the time the extraneous pressure applied by the bulb 294 was overcome as hereinabove explained, then at the time the contact finger 62 is retracted from engagement with the contact finger 64, the rider 348 will still be spaced from the notch 350 succeeding that out of which it is previously moved. Therefore, if blood is at this time flowing through the radial artery, three more systolic effects may be impressed on the bulb 125, attendant to which systolic effects there will, of course, be diastolic effects, and the relay 232, and also the relay 236, will be energized and deenergized three times, wherefore the pawl 374 will advance the ratchet 60 and therefore the contact fingers 62 and 61 three steps further away from the full advanced position thereof shown in full lines in Fig. 23, and these contact fingers will therefore be retracted five steps back into the broken-line position thereof shown in Fig. 23. When the contact fingers 61 and 62 are retracted five steps back into the broken-line positions thereof shown in Fig. 23, then the contact finger 61 disengages the contact strip 63 and this interrupts the cycle of operation of the machine, as will be explained more fully presently.

It will be appreciated that the rider 348 may be brought to seat in a notch 350 at the time blood again courses through the radial artery when the extraneous pressure applied by the bulb 294 is overcome and if under such conditions the rider 348 enters a notch 350, the contact 341 will move into engagement with the contact 340. Whenever the contact 341 engages the contact 340 it disengages the contact 351 and opens circuit to the relay 352, but such engagement of the contact 341 with the contact 340 opens circuit to the electromagnet or relay 56. When circuit is so closed to the electromagnet 56, the retaining pawl 357 is withdrawn from engagement with the teeth of the ratchet 60 and thereupon this ratchet is freed to the effect of the spring 366 and this causes the contact fingers 61 and 62 to be returned back into the full-line position thereof shown in Fig. 23, the pin 367 engaging the toe portion of a braket 368 to arrest the ratchet 60 and the contact fingers 61 and 62 in such advanced positions.

If the ratchet 60 and the contact fingers 61 and 62 are returned to their full advanced position because of energization of the relay 56, as aforesaid, and this occurs subsequent to the time the extraneous pressure applied by the bulb 294 is overcome, the rider 348 will thereafter quickly move out of the notch 350 in which it has been seated back onto the periphery of the disc 349, thus breaking circuit to the relay 56 and thereupon the retaining pawl 357 reengages the teeth of the ratchet 60. Likewise, engagement of the rider 348 with the periphery of the disc 349 engages the contact 341 with the contact 351 and therefore as systolic and diastolic effects are sensed by the bulb 125, as blood flows through the radial artery past the volar aspect of the wrist with which such bulb is engaged, the relay 232 is energized and deenergized in the manner hereinabove explained and five such energizations will intervene prior to the time the rider 348 again seats in a notch 350. Consequently the fingers 61 and 62 will be moved back into the retracted positions thereof shown in broken lines in Fig. 23 to interrupt the cycle of operation of the apparatus in which this return occurred.

The bellows 119 must compress and expand five times before a cycle of operation of the machine is interrupted and resort is had to this for the reason that the bellows 125 might be inadvertently compressed, as by movement of the user of the apparatus that would be sensed by the bulb 125. There are other conditions which make it advisable to insure that the bellows 119 be compressed and expanded five times before a cycle of operation of the machine is interrupted. Furthermore, it will be noted that as soon as the relay 352 is energized and deenergized twice, the contact finger 62 is retracted from engagement with the contact strip 64 and this interrupts reduction of pressure in the system of which the fitting 291 is a part, and therefore the column of mercury in the tube 303 of the manometer 302 is retained at whatever height has been attained thereby as a result of the aforesaid step by step reduction of this column, for when the contact finger 62 disengages the contact strip 64 further reduction of the height of the mercury column is prevented.

When the contact finger 61 is retracted back into the broken-line position thereof shown in Fig. 23, which disengages this contact finger from the contact strip 63, circuit is broken to the electromagnet 391 whereupon the diaphragm 382 moves into position to close off communication between the tubes 298 and 300 and therefore whatever pressure is at this time established in the tube 300 is maintained. The result of this is that the mercury column in the tube 303 of the manometer 302 is retained at whatever height it had assumed at the time the step by step reduction thereof was interrupted and by referring to the scale 298, Fig. 1, and observing the height of the mercury column through the sight opening 397 with reference to this scale, the systolic blood pressure in terms of millimeters of mercury, the customary manner in which such pressure is expressed, may be determined since the indicia associated with the scale 398 is arranged to enable this to be accomplished.

Furthermore, when the contact finger 61 disengages the contact strip 63, circuit is broken to the pump motor 68 and the timing motor 160 and this interrupts operation of the pumps P and P' and rotation of the shaft 173. When the electromagnet 391 deenergizes, as just explained, a finger 399 thereon engages the stem of a valve in the valve housing 401 to which a tube 402 leads from the tube 91. Such engagement of the finger 399 with the stem 400 opens the valve in the valve housing 401 and therefore whatever pressure has been established in the tube 91 and the container 96 is relieved. Hence when the volar aspect of the wrist of the user is subsequently disengaged from the bulb 125 upon loosening of the straps 38, which permits expansion of the bulb 125, the pressure that has been effective on the bellows 112 to establish the above-described closed hydraulic system will be reduced and the diaphragm 105 will move into such position that communication will be established between the tubes 115 and 97. By this time the container 96 will be relieved of pressure and consequently liquid will drain from the parts affording the aforesaid closed hydraulic system and the bulb 125 will deflate.

Disengagement of the contact finger 61 from the contact strip 63 has the further effect of breaking the holding circuit for the relay 206 and this relay therefore becomes deenergized and, as this relay becomes energized, the contacts 267 and 268 separate, wherefore circuit is broken to the relay 256 and thereupon the armature 280 of this relay is freed to the effect of the spring 282. The valve member 279 is thereupon withdrawn from closing position with respect to the opening 278 wherefore air may again escape through the opening 278 and in this way the pressure effective on the bellows 285a is relieved, and as a result of this the diaphragm 289 moves into position to open communication between the tubes 287 and 290 and thereupon the bulb 294 deflates. However, since at this time the diaphragm 382 will be closing off communication between the tubes 300 and 298, pressure is maintained in the tube 300 with the effect hereinabove described.

It will therefore be seen that when the contact finger 61 disengages the contact strip 63, a cycle of operation of the apparatus is interrupted and at this time the pulse and systolic blood pressure are registered as has hereinabove been explained. Furthermore, when contact finger 61 is retracted from engagement with the contact strip 63, it engages the contact 369, wherefore the lamps L are again rendered operative, such lamps having been extinguished by disengagement of the contact finger 61 from the contact strip 369 as an incident to initiation of a cycle of operation of the apparatus.

It will be understood that if the form of the apparatus shown in Figs. 27 to 32, inclusive, is utilized, liquid in a U-tube as 551, visible through a sight opening as 550 in a panel as 34y which, of course, corresponds to the panel 34, will be set in motion as an incident to the establishment of the above described closed hydraulic system. The liquid in such U-tube will take motion in response to systolic and diastolic effects sensed by the bulb 125 for in such an instance the bellows as 561 will be connected to a pin as 135y which, as explained, corresponds to the pin as 135 and the resulting compression and expansion of the bellows as 561 in response to systolic and diastolic effects sensed by the bulb as 125 will, in the manner hereinabove explained, set the liquid in the tube 551 in motion, the bellows 561 serving as an air pump in such an instance.

The degree of movement of the liquid in the bight of the U-tube 551 will be directly responsive to the force and magnitude of systolic and resultantly diastolic effects sensed by the bulb 125 for, as explained hereinabove, the degree of movement of the pin as 135 is determined by the force and magnitude of such effects, the greater the force and magnitude of the systolic and resultantly of the diastolic effects, the greater the degree of movement of the pin 135 and resultantly the compression and expansion of the bellows 561.

Thus in the present instance, as soon as the aforesaid closed hydraulic system is established the liquid in the tube 561 will take motion in response to systolic and diastolic effects of the user of the apparatus impressed upon the bulb 125, and such motion will continue until, in the course of ascertaining the systolic blood pressure, the pressure in the bulb 294, in response to the height of the mercury column in the tube 303 of the manometer 302, is sufficient to collapse the radial artery in the left arm of a user of the apparatus. When the radial artery is so collapsed, the flow of blood past the volar aspect of the wrist is interrupted and consequently systolic and resultantly diastolic, effects are not sensed by the bulb 125 and this condition prevails until the pressure in the bulb 294 is so reduced, in the manner hereinabove explained, that the flow of blood past the volar aspect of the wrist against which the bulb 125 is engaged will resume and thereupon, since at this time systolic, and resultantly diastolic, effects will again be sensed by the bulb as 125, the liquid in the U-tube 551 will again take motion and such will continue until the strap 38 is loosened and the volar aspect of the wrist is disengaged from the bulb 125.

If the devices shown in Figs. 33 to 35, inclusive, are employed in the machine, the hereinabove described operations arising upon engagement of the contact fingers 61 and 62 with the contact strips 63 and 64 respectively will need await energization of the relay 718. It will be understood that the relay 718 will be energized as an incident to the engagement of the contacts 47 and 48 for the engagement of these contacts closes the energizing circuit to this relay. At the time of the closing of the energizing circuit to this relay the contact 729 thereof engages the contact 728 thereof, and at this time the rider 709 will be engaged with the periphery of the disc 703 wherefore the contact 712 will be engaged with the contact 713 and thus, as an incident to the energization of the relay 718, a holding circuit for this relay is established through the contacts 728 and 729 and 712 and 713. The establishment of such a holding circuit enables a cycle of operation of the apparatus to proceed for a predetermined time determined by the speed of rotation of the disc 703. Such predetermined period of time will be of sufficient duration to insure that all of the hereinabove described operations may be carried out but near the end of such predetermined period of time the rider 709 will pass into the notch 710 whereupon the contact 712 engages the contact 714 prior to the time it disengages the contact 713.

Disengagement of the contact 712 from the contact 713 breaks the holding circuit for the relay 718, which relay thereupon becomes deenergized and opens circuit to the terminal 71 established through the contacts 721 and 722 thereof, but prior to the time the contacts 721 and 722 so disengage the contacts 734 and 735 of the relay 732 will disengage, this ensuing upon energization of the relay 732 as an incident to engagement of the contact 712 with the contact 714. However, as the rider 709 rides out of the notch 710, the contact 712 engages the contact 713 prior to the time it disengages the contact 714, thus establishing, but not closing, the holding circuit for the relay 718 for by this time the contacts 728 and 729 of the relay 718 will be separated. The energization of the relay 732 and the engagement of the contact 734 with the contact 735 thereof establishes circuit to the terminal 71 so that the opening of circuit to this terminal through the contacts 721 and 722 upon deenergization of the relay 718 does not free this terminal 71 of a source of current. The disengagement of the contact 734 from the contact 735 however, upon deenergization of the relay 732 as an incident to the disengagement of the contact 712 from the contact 714, does free the terminal 71 of a source of current and therefore further operation of the apparatus is prevented until the contacts 47 and 48 are reengaged to initiate a new cycle of operation.

It will be understood that a switch afforded by a bar as 136 and contacts as 143 and 144 is of such nature that irrespective of the force and magnitude of systolic effects impressed on the bellows 119, and resultantly of diastolic effects sensed by the bulb 125, accurate functioning of the switch will result for the reason that the bar as 136 is moved from engagement with one of the aforesaid contacts and into engagement with the other of such contacts as an incident to initiation of movement of a pin as 135 in either direction. Once the bar 136 has so engaged one of such contacts the pin as 135 thereafter moves relative to the bar as 136 without effect in so far as operative functions of the switch are concerned. Such an arrangement enables only slightly perceptible systolic effects to be discerned at the volar aspect of the wrist with which a bulb 125 or the like is engaged, and likewise enables proper functioning of the apparatus, as just explained, when the force and magnitude of such systolic effects are material.

It will also be apparent from the foregoing description that the establishment of a closed hydraulic system to enable the sensing of systolic and resulting diastolic effects at the volar aspect of the left wrist of a user of the apparatus insures accurate sensing of such effects and additionally enables the results of such sensing to be utilized to afford a visual manifestation of the force and magnitude of systolic and diastolic effects so sensed.

Likewise the use of a closed pneumatic system is an advantageous manner in which to ascertain the systolic blood pressure of a user of the apparatus for such a system may be expeditiously established and the pressure thus established in such a system may be expeditiously reduced so as to enable ascertainment of the systolic blood pressure.

Still another important advantageous aspect of this invention is the timing apparatus afforded by the parts driven by the motor 160 for the apparatus thus provided not only enables an operation, such as the ascertainment of the pulse of a user of the apparatus to be initiated and carried on for a predetermined period of time, but it also insures that an operation, such as the ascertainment of the pulse of a user of the apparatus, will be completed before the initiation of another operation of the apparatus, such as that in which the systolic blood pressure of a user of the apparatus is ascertained. Furthermore, this timing apparatus enables operations of the character hereinabove explained to be suspended for such a period of time as to insure that the parts entailed in effecting such operations are in operative condition prior to the actual initiation of such operations. It will be manifest that a device of this character will have a wide variety of uses other than in a machine of the character hereinabove described. Furthermore, it will be understood that by resorting to an arrangement such as that shown in Figs. 33 to 35, the timing apparatus may be utilized to limit the time during which an operation of the apparatus may proceed so as to thereby prevent sabotage of the machine by causing it to be set in operation under circumstances other than those intended.

In those instances where an apparatus of the herein described character is used for ascertaining the pulse, it will be appreciated that only true systolic effects should be counted for if effects in the nature of systolic effects, such as accrue in the dicrotic phase of a heart beat, are counted as systolic effects, proper count of the heart beats will not be effected, and it will be manifest from the foregoing description that the apparatus herein described is admirably suited for attaining this desirable result for the reason that operation of the means responsive to systolic effects is prevented once a systolic effect has been sensed as well as the initiation of the ensuing diastolic effect, and by preventing initiation of such an operation for a predetermined period of time it is insured that a true and accurate count of the pulse will be effected.

Furthermore, it will be understood that while the herein illustrated apparatus has been described as particularly applicable for ascertaining the pulse and systolic blood pressure in a human body, the mechanism as a whole and many of the devices herein described may be utilized for purposes other than the ascertainment of the pulse and systolic blood pressure in a human body and therefore, while we have illustrated and described selected embodiments of our invention, it is to be understood that these are capable of variation and modification and we therefore do not wish to be limited to the precise details set forth, but desire to avail ourselves of such changes and alterations as fall within the ambit of the following claims.

We claim:

1. In a device of the class described including means for sensing systolic and diastolic arterial pulses, a pulse rate indicating register, means for actuating said register in indicating operation, electrically operable means for effecting indicating movements of said register by said actuating means, and means under control of said sensing means for effecting operation of said last mentioned electrically operable means whereby to effect indicating movement of said register in response to the sensing of a systolic pulse by the sensing means, and means including an electrical supervisory circuit connected with said electrically operable means and operably controlled by said sensing means in response to diastolic pulses sensed thereby for preventing operation of said electrically operable means by the sensing means except in response to a systolic pulse following a diastolic pulse sensed thereby.

2. In an apparatus for counting the pulse rate of the user thereof, means for manifesting such pulse rate, means for sensing systolic and diastolic arterial pulses, means conditioning said manifesting means for operation for a predetermined period of time, means controlled by the sensing means responsive to the sensing thereby of a systolic pulse effect for effecting a predetermined operation of said manifesting means, and means controlled by said sensing means responsive to the sensing thereby of each systolic effect for preventing further operation of the aforesaid means for effecting predetermined operation of the manifesting means by any systolic effect until there has been a succeeding diastolic effect.

3. In a device of the class described, means for sensing arterial pulsations including systolic and diastolic pulse effects, pulse rate registering means, and means operably controlled by said sensing means responsive to the sensing thereby of a pulse effect of one kind as aforesaid for effecting operation of said registering means, and for preventing further operation of said registering means by another pulse effect of the same kind until there has been an intervening pulse effect of the opposite kind sensed by said sensing means.

4. In apparatus of the class described including indicating means and actuating means cooperable therewith and operably controlled by means which detects systolic and diastolic pulsations and which is also sensitive to intervening pulse effects in an artery of the user of said apparatus, the combination of mechanism for preventing operation of said actuating means by any of the aforesaid intervening pulse effects which includes means for effecting operation of said actuating means by a pulse effect of one kind and for rendering said actuating means ineffective for further operation by a pulse effect of the same kind until said detecting means has detected a pulse effect of opposite kind.

5. In an apparatus of the class described, in combination with means for detecting arterial pulsations, indicating means and mechanism for actuating the same under control of said detecting means, means cooperable with said detecting means and actuating mechanism for controlling operation of the latter by systolic and diastolic arterial pulsations and for preventing actuation of said indicating means by any pulse effects which may occur in the time intervening between a true systolic and its accompanying diastolic pulse effect.

6. In an apparatus for counting the pulse rate of a user thereof, means for manifesting such pulse rate, means for sensing systolic and diastolic effects in the arteries of the user of the apparatus, means conditioning the pulse rate manifesting means for operation for a predetermined period of time, means operative to effect a predetermined operation of the manifesting means, means under control of the sensing means and operable responsive to the sensing of a systolic effect by the sensing means for initiating an operation of the aforesaid means for effecting predetermined operation of the manifesting means, and other means under control of the sensing means for interrupting operation of the aforesaid initiating means upon the sensing by said sensing means of a diastolic effect attendant to the systolic effect sensed to initiate such operation, whereby the manifesting means, at the end of the predetermined period of time it is conditioned for operation, manifests only the number of true systolic effects that accrue in such period of time and thereby manifests the pulse rate of the user.

7. In an apparatus for counting the pulse rate of a user thereof, means for manifesting such pulse rate, means for sensing systolic and diastolic effects in the arteries of the user of the apparatus, means conditioning the pulse rate manifesting means for operation for a predetermined period of time, means operative to effect a predetermined operation of the manifesting means, means under control of the sensing means and actuated responsive to the sensing of a systolic effect by said sensing means for initiating an operation of the aforesaid means for effecting predetermined operation of the manifesting means, other means under control of the sensing means for interrupting the operation of the aforesaid initiating means upon the sensing by said sensing means of a diastolic effect attendant to the systolic effect which has caused initiation of such operation, together with means for maintaining the aforesaid initiating means inoperative for a limited predetermined period of time once operation thereof has been interrupted, whereby the manifesting means, at the end of the predetermined period of time it is conditioned for operation, manifests only the number of true systolic effects that accrue in such period of time and thereby manifests the pulse rate of the user.

8. In an apparatus for ascertaining the pulse of a user thereof, means for manifesting such pulse, means for sensing systolic and diastolic effects in the arteries of the user of the apparatus, means conditioning the pulse manifesting means for operation for a predetermined period of time, actuating means operable responsive to the sensing of a systolic effect by the sensing means for effecting a predetermined operation of the manifesting means, and means for maintaining said actuating means inoperative for a measured period of time subsequent to an operation thereof which sets the manifesting means in operation as aforesaid, whereby the manifesting means, at the end of the predetermined period of time it is conditioned for operation, manifests only the number of true systolic effects that accrue in such period of time as distinguished from pulsations occurring in the dicrotic phase of the sensed pulsations and thereby manifests the pulse of the user.

9. In an apparatus for ascertaining the pulse rate of a user thereof, electrically controlled means for manifesting such pulse rate, means for sensing systolic and diastolic effects in the arteries of the user of the apparatus, timing means operative to condition the manifesting means for operation for but a predetermined period of time, means operative to cause a predetermined operation of the manifesting means, actuating means under control of the sensing means operative, in response to the sensing thereby of a systolic and attendant diastolic effect to effect an operation of the aforesaid means for causing a predetermined operation of said manifesting means, and means including a locking circuit operable for maintaining the manifesting means operative to insure completion of each predetermined operation thereof initiated as aforesaid, together with means cooperable with said sensing means for controlling operation of said locking circuit for the purpose aforesaid thereby to prevent operation of said actuating means by false systolic and diastolic pulse effects occurring during the dicrotic phase, so that the manifesting means, at the end of the predetermined period of time for which it is conditioned for operation, manifests only the number of true systolic effects that accrue in such period of time and thereby manifests the pulse of the user.

10. In an apparatus for ascertaining the pulse of a user thereof, means for manifesting such pulse, means for sensing systolic and diastolic effects in the arteries of the user of the apparatus, timing means operative to condition the manifesting means for operation for but a predetermined period of time, means operative to cause a predetermined operation of the manifesting means, means under control of the sensing means that are rendered operative to initiate an operation of the means operative to cause a predetermined operation of the manifesting means upon the sensing by said sensing means of a systolic effect, means under control of the sensing means and operative to interrupt operation of the first named means under control of the sensing means upon the sensing by said sensing means of a diastolic effect attendant to the systolic effect sensed to render such means operative, and means for maintaining the manifesting means operative to insure completion of each predetermined operation thereof that is initiated once such operation is initiated, whereby the manifesting means, at the end of the predetermined period of time it is conditioned for operation, manifests only the number of true systolic effects that accrue in such period of time and thereby manifests the pulse of the user.

11. In apparatus for ascertaining the pulse of a user thereof, means for manifesting such pulse, means for sensing systolic and diastolic effects in the arteries of the user of the apparatus, timing means operative to condition the manifesting means for operation for but a predetermined period of time, clutch means operative to bring about a predetermined operation of the manifesting means, means under control of the sensing means that are rendered operative to initiate operation of the clutch means upon the sensing by said sensing means of a systolic effect, means under control of the sensing means and operative to interrupt operation of the first named means under control of the sensing means upon the sensing by said sensing means of a diastolic effect attendant to the systolic effect sensed to render such means operative, and means operative to insure completion of a predetermined operation of the manifesting means brought about by operation of the clutch means, whereby the manifesting means, at the end of the predetermined period of time it is conditioned for operation, manifests only the number of true systolic effects that accrue in such period of time and thereby manifests the pulse of the user.

12. In an apparatus for ascertaining the pulse of a user thereof, means for manifesting such pulse, means for sensing systolic and diastolic effects in the arteries of the user of the apparatus, timing means operative to condition the manifesting means for operation for but a predetermined period of time, clutch means operative to bring about a predetermined operation of the manifesting means, means operative to insure completion of a predetermined operation of the manifesting means brought about by an operation of the clutch means, electrically-operated means for rendering and maintaining said clutch means operative, second electrically-operated means operative until rendered inoperative to maintain the first named electrically-operated means operative, and switch means under control of said sensing means and operative in response to the sensing of a systolic effect to close circuit to the first named electrically-operated means and also operative in response to the sensing of a diastolic effect attendant to such a sensed systolic effect to close circuit to the second electrically-operated means, whereby the manifesting means, at the end of the predetermined period of time it is conditioned for operation, manifests only the number of true systolic effects that accrue in such period of time and thereby manifests the pulse of the user.

13. In an apparatus for ascertaining the pulse of a user thereof, means for manifesting such pulse, means for sensing systolic and diastolic effects in the arteries of the user of the apparatus, timing means operative to condition the manifesting means for operation for but a predetermined period of time, clutch means operative to bring about a predetermined operation of the manifesting means, means operative to insure completion of a predetermined operation of the manifesting means brought about by an operation of the clutch means, electrically-operated means for rendering and maintaining said clutch means operative, second electrically-operated means operative until rendered inoperative to maintain the first named electrically-operated means operative, switch means under control of said sensing means and operative in response to the sensing of a systolic effect to close circuit to the first named electrically-operated means and also operative in response to the sensing of a diastolic effect attendant to such a sensed systolic effect to close circuit to the second electrically-operated means, and means associated with said clutch means and operative to prevent closing of the circuit between said switch means and said first named electrically-operated means after operation of the second electrically-operated means until completion of a predetermined operation of the manifesting means initiated by an operation of the first named electrically-operated means, whereby the manifesting means, at the end of the predetermined period of time it is conditioned for operation, manifests only the number of true systolic effects that accrue in such period of time and thereby manifests the pulse of the user.

14. In an apparatus for ascertaining the pulse of a user thereof, means for sensing systolic and diastolic effects in the arteries of the user of the apparatus, means for manifesting the pulse of the user of the apparatus and including a movable part, driving means for said movable part, means for holding said movable part against movement with the driving means therefor, control means for regulating operation of the holding means and operable to insure predetermined movement of the movable part each time the holding means is operated to release said movable part for movement with the driving means therefor, means under control of the sensing means and operable, in response to the sensing of a true systolic effect by the sensing means, to effect such operation of the holding means that the movable part is released to movement with the driving means therefor, and other means under control of the sensing means and operable to maintain the first named means under control of the sensing means operative until the sensing by said sensing means of the diastolic effect attendant to the systolic effect sensed to render said first named means operative whereby the movable part is freed to movement with driving means therefor in response to the sensing of each true systolic effect by the sensing means.

15. In an apparatus as claimed in claim 14, means for conditioning the movable part of the manifesting means for operation for but a predetermined period of time so that the number of operations thereof effected under control of the sensing means during such predetermined period of time is the number of systolic and diastolic effects sensed by the sensing means in such period of time and thereby the manifesting means manifests the pulse of the user of the apparatus during each such predetermined period of time.

16. In an apparatus for ascertaining the pulse of a user thereof, means for sensing systolic and diastolic effects in the arteries of the user of the apparatus, means for manifesting the pulse of the user of the apparatus and including a movable part, driving means for said movable part, means for holding said movable part against movement with the driving means therefor, electrically-operated means for retracting said holding means from holding position to free said movable part for movement with the driving means therefor, means for retaining said holding means out of holding position for a predetermined time period once it has been retracted from holding position by said electrically-operated means, and second electrically-operated means under control of the sensing means and operative, in response to the sensing of a true systolic and attendant diastolic effect, to render the first named electrically-operated means operative and then inoperative to thereby effect advance of said movable part in response to each systolic and attendant diastolic effect sensed by said sensing means.

17. In an apparatus as claimed in claim 16, means for conditioning the movable part of the manifesting means for operation for but a predetermined period of time so that the number of operations thereof effected under control of the sensing means during such predetermined period of time is the number of systolic and diastolic effects sensed by the sensing means in such period of time and thereby the manifesting means manifests the pulse of the user of the apparatus during each such predetermined period of time.

18. In an apparatus for ascertaining the pulse of a user thereof, means for sensing systolic and diastolic effects in the arteries of the user of the apparatus, means for manifesting the pulse of the user of the apparatus and including a movable part, driving means for said movable part, means for holding said movable part against movement with the driving means therefor, electromagnetic means for retracting said holding means from holding position to free said movable part for movement with the driving means therefor, means for retaining said holding means out of holding position for a predetermined time period once it has been retracted from holding position by said electromagnetic means, and relay means under control of said sensing means and operable, in response to the sensing by said sensing means of a systolic and attendant diastolic effect, to render said electromagnetic means operative to thereby effect advance of said movable part in response to each systolic and attendant diastolic effect sensed by said sensing means.

19. In an apparatus as claimed in claim 18, means for conditioning the movable part of the manifesting means for operation for but a predetermined period of time so that the number of operations thereof effected under control of the sensing means during such predetermined period of time is the number of systolic and diastolic effects sensed by the sensing means in such period of time and thereby the manifesting means manifests the pulse of the user of the apparatus during each such predetermined period of time.

20. In an apparatus for ascertaining the pulse of a user thereof, means for sensing systolic and diastolic effects in the arteries of the user of the apparatus, means for manifesting the pulse of the user of the apparatus and including a movable part, driving means for said movable part, means for holding said movable part against movement with the driving means therefor, electromagnetic means for retracting said holding means from holding position to free said movable part for movement with the driving means therefor, means for retaining said holding means out of holding position for a predetermined time period once it has been retracted from holding position by said electromagnetic means, relay means operative to close circuit to said electromagnetic means, second relay means for maintaining the first named relay means operative once such means are rendered operative upon the closing of circuit thereto, said second named relay means also being operative upon the closing of circuit thereto to render the first named relay means inoperative to thereby open circuit to the electromagnetic means, and switch means under control of the sensing means and operative to close circuit to the first named relay means upon the sensing of a systolic effect and to close circuit to the second relay means upon the sensing of the attendant diastolic effect to thereby effect advance of said movable part in response to each systolic and diastolic effect sensed by said sensing means.

21. In an apparatus as claimed in claim 20, means for conditioning the movable part of the manifesting means for operation for but a predetermined period of time so that the number of operations thereof effected under control of the sensing means during such predetermined period of time is the number of systolic and diastolic effects sensed by the sensing means in such period of time and thereby the manifesting means manifests the pulse of the user of the apparatus during each such predetermined period of time.

22. In an apparatus as claimed in claim 18, means for opening the circuit between the switch means and the relay means during the predetermined period the holding means is held out of holding position.

23. In an apparatus as claimed in claim 20, means for opening the circuit between the switch means and the first named relay means during the predetermined period the holding means is held out of holding position.

24. In an apparatus as claimed in claim 18, means associated with the means for holding the holding means out of holding position and operative to open the circuit between the switch means and the relay means during the predetermined period the holding means is held out of holding position.

25. In an apparatus as claimed in claim 20, means associated with the means for holding the holding means out of holding position and operative to open the circuit between the switch means and the first named relay means during the predetermined period the holding means is held out of holding position.

26. In an apparatus for ascertaining the pulse of a user thereof, means for sensing systolic and diastolic effects in the arteries of the user of the apparatus, means for manifesting the pulse of the user of the apparatus and including a rotatable member, driving means for said rotatable member, means for establishing frictional interconnection between said movable member and the driving means therefor, said movable member having a plurality of uniformly spaced openings therein, holding means extendible into said openings to hold said movable member against movement with the driving means therefor, electromagnetic means retracting said holding means from said openings to thereby free said movable member for movement with the driving means therefor, said holding means being engageable with said movable member once it has been retracted from one of said openings upon energization of said electromagnetic means to thereby be free to move into the succeeding opening as said opening moves into alignment with said holding means in the course of said movable part with the driving means therefor, and relay means under control of said sensing means and operable, in response to the sensing by said sensing means of a systolic and diastolic effect, to render said electromagnetic means operative and thereby effect advance of said movable member in response to each systolic and attendant diastolic effect sensed by said sensing means.

27. In an apparatus as claimed in claim 26, means for conditioning the movable member of the manifesting means for operation for but a predetermined period of time so that the number of advances thereof effected under control of the sensing means as aforesaid during such predetermined period of time is the number of systolic and diastolic effects sensed by the sensing means in the predetermined period of time whereby the manifesting means manifests the pulse of the user of the apparatus after the elapse of such predetermined period of time.

28. In an apparatus for ascertaining the pulse of a user thereof, means for sensing systolic and diastolic effects in the arteries of the user of the apparatus, means for manifesting the pulse of the user of the apparatus and including a rotatable member, driving means for said rotatable member, means for establishing frictional interconnection between said movable member and the driving means therefor, said movable member having a plurality of uniformly spaced openings therein, holding means extendible into said openings to hold said movable member against movement with the driving means therefor, electromagnetic means retracting said holding means from said openings to thereby free said movable member for movement with the driving means therefor, said holding means being engageable with said movable member once it has been retracted from one of said openings upon energization of said electromagnetic means to thereby be free to move into the succeeding opening as said opening moves into alignment with said holding means in the course of said movable part with the driving means therefor, relay means operative to close circuit to said electromagnetic means, second relay means for maintaining the first relay means operative once such means are rendered operative upon the closing of circuit thereto, said second relay means also being operative upon the closing of circuit thereto to render the first relay means inoperative to thereby open circuit to the electromognetic means, and switch means under control of the sensing means and operative to close circuit to the first-named relay means upon the sensing of a systolic effect and to close circuit to the second relay means upon the sensing of the attendant diastolic effect to thereby effect advance of said movable member in response to each systolic and attendant diastolic effect sensed by said sensing means.

29. In an apparatus as claimed in claim 28, means for conditioning the movable member of the manifesting means for operation for but a predetermined period of time so that the number of advances thereof effected under control of the sensing means as aforesaid during such predetermined period of time is the number of systolic and diastolic effects sensed by the sensing means in the predetermined period of time whereby the manifesting means manifests the pulse of the user of the apparatus after the elapse of such predetermined period of time.

30. In an apparatus for ascertaining the pulse and systolic blood pressure of a user thereof, means for manifesting such pulse, means for sensing at a selected place systolic and diastolic effects in the arteries of the user of the apparatus, means conditioning the pulse-manifesting means for operation for a predetermined period of time, means for effecting a predetermined operation of the manifesting means in response to each true systolic and attendant diastolic effect sensed by said sensing means during the time the manifesting means is conditioned for operation whereby the manifesting means at the end of said predetermined period of time manifests the number of true systolic effects that accrue in such period of time and thereby manifests the pulse of the user, means for applying sufficient extraneous pressure to shut off flow of blood through the arteries of the user of the apparatus to the selected place at which the sensing means senses systolic and diastolic effects in the arteries of the user to thereby interrupt such sensing, means operable to reduce the extraneous pressure after such interruption of the sensing of systolic and diastolic effects, means under control of said sensing means for interrupting the reduction of the extraneous pressure when such pressure is reduced sufficiently to enable the flow of blood to be resumed to said selected place with predetermined effect on said sensing means, and means for manifesting the degree of extraneous pressure when reduction thereof is interrupted to thereby manifest the systolic blood pressure of the user which equals the extraneous pressure when reduction of such pressure is interrupted as aforesaid.

31. In an apparatus for ascertaining the pulse and systolic blood pressure of a user thereof, means for manifesting such pulse, means for sensing at a selected place systolic and diastolic effects in the arteries of the user of the apparatus, timing means conditioning the pulse manifesting means for operation for a predetermined period of time, means for effecting a predetermined operation of the manifesting means in response to each true systolic and attendant diastolic effect sensed by said sensing means during the time the manifesting means is conditioned for operation whereby the manifesting means at the end of said predetermined period of time manifests the number of true systolic effects that accrue in such period of time and thereby manifests the pulse of the user, means for applying sufficient extraneous pressure to shut off flow of blood through the arteries of the user of the apparatus to the selected place at which the sensing means senses systolic and diastolic effects in the arteries of the user to thereby interrupt such sensing, means under control of said timing means and operative to prevent operation of said manifesting means in a particular cycle of operation of the apparatus after the elapse of said predetermined period of time and also operative to render the means for applying extraneous pressure effective after the elapse of said predetermined period of time, means operable to reduce the extraneous pressure after interruption of the sensing of systolic and diastolic effects by operation of the means for applying sufficient extraneous pressure to effect such interruption, means under control of said sensing means for interrupting the reduction of the extraneous pressure when such pressure is reduced sufficiently to enable the flow of blood to be resumed to said selected place with predetermined effect on said sensing means, and means for manifesting the degree of extraneous pressure when reduction thereof is interrupted to thereby manifest the systolic blood pressure of the user which equals the extraneous pressure when reduction of such pressure is interrupted as aforesaid.

32. In an apparatus for ascertaining the pulse and systolic blood pressure of a user thereof, means for manifesting such pulse, means for sensing at a selected place systolic and diastolic effects in the arteries of the user of the apparatus, means conditioning the pulse-manifesting means for operation for a predetermined period of time, means operative to effect a predetermined operation of the manifesting means, means under control of the sensing means for effecting an operation of the means operative to effect predetermined operation of the manifesting means in response to each true systolic and attendant diastolic effect sensed by said sensing means during the time the manifesting means is conditioned for operation whereby the manifesting means at the end of said predetermined period of time manifests the number of true systolic effects that accrue in such period of time and thereby manifests the pulse of the user, means for applying sufficient extraneous pressure to shut off flow of blood through the arteries of the user of the apparatus to the selected place at which the sensing means senses systolic and diastolic effects in the arteries of the user to thereby interrupt such sensing, means operable to reduce the extraneous pressure after such interruption of the sensing of systolic and diastolic effects, means for interrupting the reduction of the extraneous pressure, means operative to place the interrupting means under control of the means under control of the sensing means after the elapse of said predetermined period of time whereby, when the extraneous pressure is reduced sufficiently to enable the flow of blood to be resumed to said selected place with predetermined effect on said sensing means, the means under control of the sensing means effects such operation of the interrupting means that reduction of the extraneous pressure is interrupted, and means for manifesting the degree of extraneous pressure when reduction thereof is interrupted to thereby manifest the systolic blood pressure of the user which equals the extraneous pressure when such reduction of pressure is interrupted as aforesaid.

33. In an apparatus for ascertaining the pulse and systolic blood pressure of a user thereof, means for manifesting such pulse, means for sensing at a selected place systolic and diastolic effects in the arteries of the user of the apparatus, timing means conditioning the pulse manifesting means for operation for a predetermined period of time, means operative to effect a predetermined operation of the manifesting means, means under control of the sensing means for effecting an operation of the means operative to effect predetermined operation of the manifesting means in response to each true systolic and attendant diastolic effect sensed by said sensing means during the time the manifesting means is conditioned for operation whereby the manifesting means at the end of said predetermined period of time manifests the number of true systolic effects that accrue in such period of time and thereby manifests the pulse of the user, means for applying sufficient extraneous pressure to shut off flow of blood through the arteries of the user of the apparatus to the selected place at which the sensing means senses systolic and diastolic effects in the arteries of the user to thereby interrupt such sensing, means under control of said timing means and operative to prevent operation of said manifesting means in a particular cycle of operation of the apparatus after the elapse of said predetermined period of time and also operative to render the means for applying extraneous pressure effective after the elapse of said predetermined period of time, means operable to reduce the extraneous pressure after interruption of the sensing of systolic and diastolic effects by operation of the means for applying sufficient extraneous pressure to effect such interruption, means for interrupting the reduction of the extraneous pressure, the means under control of timing means being operative to place the interrupting means under control of the means under control of the sensing means after the elapse of said predetermined period of time whereby, when the extraneous pressure is reduced sufficiently to enable the flow of blood to be resumed to said selected place with predetermined effect on said sensing means, the means under control of the sensing means effects such operation of the interrupting means that reduction of the extraneous pressure is interrupted, and means for manifesting the degree of extraneous pressure when reduction thereof is interrupted to thereby manifest the systolic blood pressure of the user which equals the extraneous pressure when reduction of such pressure is interrupted as aforesaid.

34. In an apparatus for ascertaining the pulse and systolic blood pressure of a user thereof, means for initiating and maintaining a cycle of operation of the apparatus, means for manifesting such pulse, means for sensing at a selected place systolic and diastolic effects in the arteries of the user of the apparatus, means conditioning the pulse-manifesting means for operation for a predetermined period of time, means operative to effect a predetermined operation of the manifesting means, means under control of the sensing means for effecting an operation of the means operative to effect predetermined operation of the manifesting means in response to each true systolic and attendant diastolic effect sensed by said sensing means during the time the manifesting means is conditioned for operation whereby the manifesting means at the end of said predetermined period of time manifests the number of true systolic effects that accrue in such period of time and thereby manifests the pulse of the user, means for applying sufficient extraneous pressure to shut off the flow of blood through the arteries of the user of the apparatus to the selected place at which the sensing means senses systolic and diastolic effects in the arteries of the user to thereby interrupt such sensing, means operable to reduce the extraneous pressure after such interruption of the sensing of a systolic and diastolic effects, means for interrupting the reduction of the extraneous pressure and the operation of the means operative to initiate and maintain a cycle of operation of the apparatus, means operative to place the interrupting means under control of the means under control of the sensing means after the elapse of said predetermined period of time whereby, when the extraneous pressure is reduced sufficiently to enable the flow of blood to be resumed to said selected place with predetermined effect on said sensing means, the means under control of the sensing means effects such operation of the interrupting means that reduction of the extraneous pressure is interrupted, and means for manifesting the degree of extraneous pressure when reduction thereof is interrupted to thereby manifest the systolic blood pressure of the user which equals the extraneous pressure when reduction of such pressure is interrupted as aforesaid.

35. In an apparatus for ascertaining the systolic blood pressure of a user thereof, means for sensing at a selected place systolic and diastolic effects in the arteries of a user of the apparatus, means for applying sufficient extraneous pressure to shut off flow of blood through the sensed artery of the user of the apparatus to the selected place at which the sensing means senses systolic and diastolic effects in the arteries of the user to thereby interrupt such sensing, means operable to reduce the extraneous pressure after such interruption of the sensing, means under control of the sensing means for interrupting the reduction of the extraneous pressure when such pressure is reduced sufficiently to enable the flow of blood to be resumed to said selected place with predetermined effect upon the sensing means, and means for manifesting the degree of extraneous pressure when reduction thereof is interrupted to thereby manifest the systolic blood pressure of the user which equals the extraneous pressure when reduction of such pressure is interrupted as aforesaid.

36. In an apparatus for ascertaining the systolic blood pressure of a user thereof, means for sensing at a selected place systolic and diastolic effects in the arteries of a user of the apparatus, means for applying sufficient extraneous pressure to shut off flow of blood through the sensed artery of the user of the apparatus to the selected place at which the sensing means senses systolic and diastolic effects in the arteries of the user to thereby interrupt such sensing, means for supplying fluid under pressure to said pressure-applying means to thereby build up pressure in said pressure-applying means, means for disconnecting said pressure-applying means from the source of fluid under pressure when sufficient extraneous pressure is built up in said pressure-applying means to shut off the flow of blood as aforesaid, means operable to reduce the extraneous pressure after interruption of the sensing by the application of extraneous pressure as aforesaid, means under control of the sensing means for interrupting the reduction of the extraneous pressure when such pressure is reduced sufficiently to enable the flow of blood to be resumed to said selected place with predetermined effect upon the sensing means.

37. In an apparatus for ascertaining the systolic blood pressure of a user thereof, means for sensing at a selected place systolic and diastolic effects in the arteries of a user of the apparatus, means for applying sufficient extraneous pressure to shut off flow of blood through the sensed artery of the user of the apparatus to the selected place at which the sensing means senses systolic and diastolic effects in the arteries of the user to thereby interrupt such sensing, means for supplying fluid under pressure to said pressure-applying means to thereby build up pressure in said pressure-applying means, means for disconnecting said pressure-applying means from the source of fluid under pressure when sufficient extraneous pressure is built up in said pressure-applying means to shut off the flow of blood as aforesaid, means operable to reduce the extraneous pressure after interruption of the sensing by the application of extraneous pressure as aforesaid, means for interrupting the reduction of the extraneous pressure, means under control of the sensing means and including timing means and operable to render the means for interrupting reduction of the extraneous pressure operative when the extraneous pressure is reduced sufficiently to enable the flow of blood to be resumed to said selected place with predetermined effect upon the sensing means in a predetermined period of time, and means for manifesting the degree of extraneous pressure when reduction thereof is interrupted to thereby manifest the systolic blood pressure of the user which equals the extraneous pressure when reduction of such pressure is interrupted as aforesaid.

38. In an apparatus for ascertaining the systolic blood pressure of a user thereof, means for sensing at a selected place systolic and diastolic effects in the arteries of a user of the apparatus, means for applying sufficient extraneous pressure to shut off flow of blood through the arteries of the user of the apparatus to the selected place at which the sensing means senses systolic and diastolic effects in the arteries of the user to thereby interrupt such sensing, means for supplying fluid under pressure to said pressure-applying means to thereby build up pressure in said pressure-applying means, means for disconnecting said pressure-applying means from the source of fluid under pressure when sufficient extraneous pressure is built up in said pressure-applying means to shut off the flow of blood as aforesaid, means operable to reduce the extraneous pressure after interruption of the sensing by the application of extraneous pressure as aforesaid, means under control of the sensing means and operable to interrupt the reduction of the extraneous pressure when such pressure is reduced sufficiently to enable the flow of blood to be resumed to said selected place, timing means for controlling operation of the means under control of the sensing means and operable to permit interruption of the reduction of the extraneous pressure when predetermined effects are sensed by the sensing means in a predetermined period of time, and means for manifesting the degree of extraneous pressure when reduction thereof is interrupted to thereby manifest the systolic blood pressure of the user which equals the extraneous pressure when reduction of such pressure is interrupted as aforesaid.

39. In an apparatus for ascertaining the systolic blood pressure of a user thereof, means for sensing at a selected place systolic and diastolic effects in the arteries of a user of the apparatus, means arranged to afford a closable system and including pressure-operated means positionable and operable to apply sufficient extraneous pressure to shut off flow of blood through an artery of the user of the apparatus to the selected place at which the sensing means senses systolic and diastolic effects in the arteries of the user of the apparatus to thereby interrupt such sensing, means for supplying fluid under pressure to said closable system, means operable to close off said closable system from the means supplying fluid under pressure thereto when the pressure in said closable system and the pressure-operated means thereof is sufficient to shut off flow of blood through the arteries of the user of the apparatus as aforesaid, means operable to reduce the pressure in said closable system and the pressure-operated means thereof, means under control of the sensing means for interrupting the reduction of the pressure in the closed-off closable system and the pressure-operated means thereof when such pressure is reduced sufficiently to enable the flow of blood to be resumed to said selected place with predetermined effect upon the sensing means, and means for manifesting the degree of extraneous pressure when reduction thereof is interrupted to thereby manifest the systolic blood pressure of the user which equals the extraneous pressure when reduction of such pressure is interrupted as aforesaid.

40. In an apparatus for ascertaining the systolic blood pressure of a user thereof, means for sensing at a selected place systolic and diastolic effects in the arteries of a user of the apparatus, means arranged to afford a closable system and including pressure-operated means positionable and operable to apply sufficient extraneous pressure to shut off flow of blood through a sensed artery of the user to thereby interrupt such sensing, means for supplying fluid under pressure to said closable system, means operable to close off said closable system from the means supplying fluid under pressure thereto when the pressure in said closable system is sufficient to shut off flow of blood through the arteries of the user of the apparatus as aforesaid, means operable to reduce the pressure in said closable system, means under control of the sensing means for interrupting the reduction of the pressure in the closed-off closable system when such pressure is reduced sufficiently to enable the flow of blood to be resumed to said selected place with predetermined effect upon the sensing means, a timer the operation of which is initiated as an incident to said interruption of pressure reduction, counting means under the control of said sensing means operable when a predetermined number of systolic effects are sensed during a timing period to cause termination of the cycle of operation of the apparatus, and operable when less than said predetermined number of systolic effects is sensed during said timing period to initiate further operation of said pressure-reducing means, and means for manifesting the degree of extraneous pressure when termination of the cycle is induced under the control of said timer and said counting means as aforesaid.

41. In an apparatus for ascertaining the systolic blood pressure of a user thereof, means for sensing at a selected place systolic and diastolic effects in the arteries of a user of the apparatus, means arranged to afford a closable system and including pressure-operated means positionable and operable to apply sufficient extraneous pressure to shut off flow of blood through a sensed artery of the user to thereby interrupt such sensing, means for supplying fluid under pressure to said closable system, means operable to close off said closable system from the means supplying fluid under pressure thereto when the pressure in said closable system is sufficient to shut off flow of blood through the arteries of the user of the apparatus as aforesaid, means operable to reduce the pressure in said closable system, timing control means for rendering said sensing means effective during a predetermined timing period to govern further operative functions of the apparatus, counting means under the joint control of said sensing means and of said timing control means and operable when a predetermined number of systolic effects is sensed during a timing period to interrupt operation of said pressure-reducing means, and operating when another and greater number of systolic effects is sensed during such timing period to terminate operation of the apparatus, means controlled by said timing control means for normalizing said counting means when less than said greater number of systolic effects is sensed during the timing period to thereby initiate a new sequence of operations of said counting means and thus enable further operation of said pressure-reducing means, and means for manifesting the degree of extraneous pressure when operation of the apparatus has been terminated by said counting means.

42. In an apparatus for ascertaining the systolic blood pressure of a user thereof, means for sensing at a selected place systolic and diastolic effects in an artery of a user, means operable to apply sufficient extraneous pressure to shut off flow of blood through the sensed artery of the user to thereby interrupt such sensing, means operable to gradually reduce the said pressure, timing control means for rendering said sensing means effective during a predetermined timing period to govern further operative functions of the apparatus, counting means comprising a pawl and ratchet mechanism and actuating means therefor responsive to said sensing means for imparting a step of movement to said ratchet for each systolic and attendant diastolic effect sensed when said pressure has been reduced sufficiently to permit resumption of blood flow in the sensed artery, control means operatively associated with said counting means for interrupting operation of said pressure-reducing means when at least a predetermined number of systolic effects is sensed during a timing period and for terminating operation of the apparatus when a predetermined greater number of systolic effects is sensed during such timing period, means controlled by said timing control means and acting upon said pawl to release said ratchet and return the same to its initial position when less than said greater number of systolic effects is sensed during the timing period to thereby recondition said counting means for a new counting sequence, said control means being operable to initiate further operation of said pressure-reducing apparatus as an incident to such reconditioning of said counting means.

43. In an apparatus for ascertaining the systolic blood pressure of a user thereof, means for sensing at a selected place systolic and diastolic effects in the arteries of a user of the apparatus, means arranged to afford a closable system and including pressure-operated means positionable and operable to apply sufficient extraneous pressure to shut off flow of blood through a sensed artery of the user to thereby interrupt such sensing, means for supplying fluid under pressure to said closable system, means operable to close off said closable system from the means supplying fluid under pressure thereto when the pressure in said closable system is sufficient to shut off flow of blood through the arteries of the user of the apparatus as aforesaid, means operable to reduce the pressure in said closable system, timing control means for rendering said sensing means effective during a predetermined timing period to govern further operative functions of the apparatus, counting means comprising a pawl and ratchet mechanism and actuating means responsive to said sensing means for imparting a step of movement to said ratchet for each systolic and attendant diastolic effect sensed, contact means embodied in said counting means for interrupting operation of said pressure-reducing means when at least a predetermined number of systolic effects is sensed during a timing period and for terminating operation of the apparatus when a predetermined greater number of systolic effects is sensed during such timing period, means controlled by said timing control means and acting upon said pawl to release said ratchet and return the same to its initial position when less than said greater number of systolic effects is sensed during the timing period to thereby recondition said counting means for a new counting sequence, said contact means being affected to enable further operation of said pressure-reducing apparatus as an incident to the such reconditioning of said counting means.

44. In a coin-operated apparatus for ascertaining the systolic blood pressure of a user thereof, means for sensing at a selected place systolic and diastolic effects in the arteries of a user of the apparatus, means forming a closable fluid system for applying sufficient extraneous pressure to shut off flow of blood through the arteries of the user of the apparatus to the selected place at which the sensing means senses systolic and diastolic effects in the arteries of the user to thereby interrupt such sensing, means to close said system at a pressure level considerably above the normal systolic blood pressure, means operable to reduce the extraneous pressure after such interruption of the sensing, means under control of the sensing means for interrupting the reduction of the extraneous pressure when such pressure is reduced sufficiently to enable the flow of blood to be resumed to said selected place with predetermined effect upon the sensing means, and means for manifesting the degree of extraneous pressure when reduction thereof is interrupted to thereby manifest the systolic blood pressure of the user, coin-controlled means operable to initiate a cycle of operation which includes the operation of said pressure-applying and reducing means, and means operable to maintain said manifesting means in its previous manifesting condition until the initiation of a succeeding cycle of operation, and means operable as an incident to the initiation of a succeeding cycle to reduce said pressure to a level substantially below the normal systolic blood pressure.

45. An apparatus for ascertaining the systolic blood pressure of a user, comprising, in combination, a closable fluid pressure system including expansible means adapted to be clamped against a body surface over an artery and expansible by fluid pressure in said system to shut off the flow of blood in said artery, means operable to build up fluid pressure in said system to a predetermined pressure level substantially above the normal range of systolic blood pressure thereby to shut off the flow of blood in said artery, means operable to close said system when said predetermined pressure level is attained therein, means operable after such closure of said system to gradually reduce the pressure in said system, sensing means operable to sense resumption of blood flow in said artery, and operable in response to the initially sensed resumption of blood flow to interrupt said reduction of pressure in said system, means for verifying the initially sensed resumption of blood flow in said artery including a timer, the timing operation of which is initiated by said sensing means as an incident to said initially sensed resumption of blood flow, means operable under the control of said timer when the sensed resumption of blood flow does not continue for the predetermined time interval to cause further reduction of pressure in said system until resumption of blood flow is again sensed, and pressure-manifesting means operatively connected to said closable system and operable when such resumption of blood flow is sensed to manifest the pressure in said system.

46. An apparatus for ascertaining the systolic blood pressure of a user, comprising, in combination, a closable fluid pressure system including expansible means adapted to be clamped against a body surface over an artery and expansible by fluid pressure in said system to shut off the flow of blood in said artery, means operable to build up fluid pressure in said system to a predetermined pressure level substantially above the normal range of systolic blood pressure thereby to shut off the flow of blood in said artery, means operable to close said system when said predetermined pressure level is attained therein, means operable after such closure of said system to gradually reduce the pressure in said system, sensing means operable to sense resumption of blood flow in said artery, and operable in response to the initially sensed blood flow to interrupt said reduction of pressure in said system, means for verifying the initially sensed resumption of blood flow in said artery including a timer, the timing operation of which is initiated by said sensing means as an incident to said initially sensed resumption of blood flow, means operable under the control of said timer when the sensed resumption of blood flow does not continue for the predetermined time interval to cause further reduction of pressure in said system until resumption of blood flow is again sensed, pressure-manifesting means operatively connected to said closable system and operable when such resumption of blood flow is sensed to manifest the pressure in said system, and means operable, when said timed vertifying means indicates that said initially sensed resumption of blood flow has continued, to indicate the completion of the blood pressure-measuring operation.

47. In a device for ascertaining the systolic blood pressure of a user thereof, means for applying extraneous pressure to one of the arteries of the user sufficient to shut off the flow of blood through said artery, and including interconnected pressure-manifesting means and a fluid pressure system, means operable to close said fluid pressure system after sufficient pressure has been built up therein to shut off the blood flow, an outlet chamber of predetermined capacity connected to said fluid pressure system, and having an inlet from said system controlled by a normally closed inlet valve and an outlet controlled by an outlet check valve, means operable continuously to periodically open said inlet valve, and means for opening said outlet valve operatively interconnected to the opening means of said inlet valve and capable of opening said outlet valve only during periods of closure of said inlet valve.

48. In a device for ascertaining the systolic blood pressure of a user thereof, means for applying extraneous pressure to one of the arteries of the user sufficient to shut off the flow of blood through said artery, and including interconnected pressure-manifesting means and a fluid pressure system, means operable to close said fluid pressure system after sufficient pressure has been built up therein to shut off the blood flow, an outlet chamber of predetermined capacity connected to said fluid pressure system, and having an inlet from said system controlled by a normally closed inlet valve and an outlet controlled by an outlet check valve, means operable continuously to periodically open said inlet valve, and means for opening said outlet valve comprising electrically-operated actuating means engageable with said outlet check valve and having a control switch closed by the operating means of said inlet valve only during periods of closure of said inlet valve.

49. In a device for ascertaining the systolic blood pressure of a user thereof, means for applying extraneous pressure to one of the arteries of the user sufficient to shut off the flow of blood through said artery, and including interconnected pressure-manifesting means and a fluid pressure system, means operable to close said fluid pressure system after sufficient pressure has been built up therein to shut off the blood flow, an outlet chamber of predetermined capacity connected to said fluid pressure system, and having an inlet from said system controlled by a normally closed inlet valve and an outlet controlled by an outlet check valve, means operable to periodically open said inlet valve, and means for opening said outlet valve comprising electrically-operated actuating means engageable with said outlet check valve and having a control switch closable by the operating means of said inlet valve only during periods of closure of said inlet valve, and means operable to break said circuit when said fluid pressure has been lowered to equal the systolic blood pressure in said artery.

50. In an apparatus of the character described, a hydraulic pressure system including a liquid-expansible member adapted to embrace a portion of the human arm over one of the arteries therein and said liquid-expansible member being sensitive to systolic and diastolic effects in said artery, said hydraulic pressure system including means for forcing liquid under pressure into said liquid-expansible member, and including means responsive to said systolic and diastolic effects for isolating said liquid-expansible member and the adjacent portion of said hydraulic pressure system from the remainder of said hydraulic pressure system after the pressure in said liquid-expansible member has attained a predetermined value, said hydraulic pressure system including a control member embodying a movable element responsive to the systolic and diastolic effects in the isolated portion of said hydraulic pressure system, and a tubular member having liquid therein responsive to movement of and under control of said control member and its aforesaid movable element for manifesting the magnitude of said systolic and diastolic effects to a user of the apparatus.

51. In an apparatus of the character described, a hydraulic pressure system including a liquid-expansible member adapted to embrace a portion of the human arm over one of the arteries therein and said liquid-expansible member being sensitive to systolic and diastolic effects in said artery, said hydraulic pressure system including means for forcing liquid under pressure into said liquid-expansible member, and including means responsive to said systolic and diastolic effects for isolating said liquid-expansible member and the adjacent portion of said hydraulic pressure system from the remainder of said hydraulic pressure system after the pressure in said liquid-expansible member has attained a predetermined value, said hydraulic pressure system including a control member embodying a movable element responsive to the systolic and diastolic effects in the isolated portion of said hydraulic pressure system, and a generally U-shaped tube having liquid therein responsive to movements of and under the control of said control member and its aforesaid movable element for manifesting the magnitude of said systolic and diastolic effects to a user of the apparatus.

52. In an apparatus of the character described, a hydraulic pressure system including a liquid-expansible member adapted to embrace a portion of the human body about an artery and responsive to systolic effects therein, means responsive to systolic pressures in the said hydraulic pressure system for isolating a portion of said hydraulic pressure system including the said liquid-expansible member, a rotatable shaft, means, including a rotatable disc having frictional engagement with said shaft and having a series of equidistantly spaced notches formed in its peripheral edge, for counting the systolic effects in the said isolated portion of said hydraulic pressure system, means for rotating said shaft, a pivotally-mounted latch member having a portion adapted to ride the peripheral edge of said disc and to engage successively in said notches, means normally urging said latch member in a direction to engage the said portion thereof against the peripheral edge of said disc and to seat the same successively in said notches, and means including a device under the control of systolic effects in the said isolated portion of said hydraulic pressure system for retracting the said portion of said latch member out of engagement with the peripheral edge of said disc so as to enable said shaft and said disc to rotate under the action of the said rotating means thereof.

53. In an apparatus of the character described, a hydraulic pressure system including a liquid-expansible member adapted to embrace a portion of the human body about an artery and responsive to systolic effects therein, means responsive to systolic pressures in the said hydraulic pressure system for isolating a portion of said hydraulic pressure system including the said liquid-expansible member, a rotatable shaft, means, including a rotatable disc having frictional engagement with said shaft and having a series of equidistantly spaced notches formed in its peripheral edge, for counting the systolic effects in the said isolated portion of said hydraulic pressure system, means for rotating said shaft, a pivotally-mounted latch member having a portion adapted to ride the peripheral edge of said disc and to engage successively in said notches, means normally urging said latch member in a direction to engage the said portion thereof against the peripheral edge of said disc and to seat the same successively in said notches, and means including an electrical circuit under the control of systolic effects in the said isolated portion of said hydraulic pressure system for retracting the said portion of said latch member out of engagement with the peripheral edge of said disc so as to enable said shaft and said disc to rotate under the action of the said rotating means therefor.

54. In an apparatus of the character described, a hydraulic pressure system including a liquid-expansible member adapted to embrace a portion of the human body about an artery and responsive to systolic effects therein, means responsive to systolic pressures in the said hydraulic pressure system for isolating a portion of said hydraulic pressure system including the said liquid-expansible member, a rotatable shaft, means, including a rotatable disc having frictional engagement with said shaft and having a series of equidistantly spaced notches formed in its peripheral edge, for counting the systolic effects in the said isolated portion of said hydraulic pressure system, means for rotating said shaft, a pivotally-mounted latch member having a portion adapted to ride the peripheral edge of said disc and to engage successively in said notches, means normally urging said latch member in a direction to engage the said portion thereof against the peripheral edge of said disc and to seat the same successively in said notches, and means including an electrical circuit and an electromagnetic device therein under the control of systolic effects in the said isolated portion of said hydraulic pressure system for retracting the said portion of said latch member out of engagement with the peripheral edge of said disc so as to enable said shaft and said disc to rotate under the action of the said rotating means therefor.

55. In an apparatus of the character described, a hydraulic pressure system including a liquid-expansible member adapted to embrace a portion of the human body about an artery and responsive to systolic effects therein, means responsive to systolic pressures in the said hydraulic pressure system for isolating a portion of said hydraulic pressure system including the said liquid-expansible member, a rotatable shaft, means, including a rotatable disc having frictional engagement with said shaft and having a series of equidistantly spaced notches formed in its peripheral edge, for counting the systolic effects in the said isolated portion of said hydraulic pressure system, means for rotating said shaft, a pivotally-mounted latch member having a portion adapted to ride the peripheral edge of said disc and to engage successively in said notches, means normally urging said latch member in a direction to engage the said portion thereof against the peripheral edge of said disc and to seat the same successively in said notches, means including an electrical circuit under the control of systolic effects in the said isolated portion of said hydraulic pressure system for retracting the said portion of said latch member out of engagement with the peripheral edge of said disc so as to enable said shaft and said disc to rotate under the action of the said rotating means therefor, said circuit including a control device arranged therein and said control device including an arcuate-shaped stationary contact strip concentric with said disc, and a movable contact member carried by said shaft and engageable with said segmentally-shaped contact.

56. An apparatus as defined in claim 55 which includes means for manifesting the blood pressure of the user of the apparatus after completion of the pulse-counting operation, means for latching the said movable contact member in its initial position and out of engagement with said arcuate-shaped stationary contact at the end of each blood pressure-manifesting operation, and means under the control of said pulse-counting means for moving the said latching means for said movable contact member into effective position at the initiation of each pulse-counting operation so as to enable said movable contact member again to engage said arcuate-shaped stationary contact strip.

BRADLEE W. WILLIAMS.
HOMER S. WILLIAMS.